United States Patent [19]

Nomura et al.

[11] Patent Number: 5,493,427
[45] Date of Patent: Feb. 20, 1996

[54] THREE-DIMENSIONAL DISPLAY UNIT WITH A VARIABLE LENS

[75] Inventors: Toshio Nomura, Yokkaichi; Masayuki Katagiri, Soraku; Noritoshi Kako, Chiba, all of Japan

[73] Assignee: Sharp Kabushiki Kaisha, Osaka, Japan

[21] Appl. No.: 247,995

[22] Filed: May 23, 1994

[30] Foreign Application Priority Data

| May 25, 1993 | [JP] | Japan | 5-122975 |
|---|---|---|---|
| Sep. 1, 1993 | [JP] | Japan | 5-217372 |
| Sep. 1, 1993 | [JP] | Japan | 5-217374 |
| Sep. 9, 1993 | [JP] | Japan | 5-224349 |

[51] Int. Cl.⁶ ............... G02F 1/1335; G02F 1/13; G09G 3/36
[52] U.S. Cl. ............... 359/40; 359/69; 359/38; 348/59
[58] Field of Search ............... 359/83, 40, 38, 359/846, 865, 292, 295, 69; 348/51, 54, 59

[56] References Cited

U.S. PATENT DOCUMENTS

| 3,912,386 | 10/1975 | Gorog et al. | 359/292 |
|---|---|---|---|
| 4,171,874 | 10/1979 | Bigelow et al. | 359/69 |
| 4,488,786 | 12/1984 | Caramel | 359/69 |
| 4,508,428 | 4/1985 | Harada | 359/69 |
| 4,904,063 | 2/1990 | Okada et al. | 359/40 |
| 4,945,407 | 7/1990 | Winnek | 348/59 |
| 4,959,641 | 9/1990 | Bass et al. | 348/59 |
| 4,987,487 | 1/1991 | Ichinose et al. | 348/59 |
| 5,124,834 | 6/1992 | Cusano et al. | 359/292 |

FOREIGN PATENT DOCUMENTS

| 60-149295 | 8/1985 | Japan . | |
|---|---|---|---|
| 60-149294 | 8/1985 | Japan . | |
| 63-242093 | 10/1988 | Japan . | |
| 2-44995 | 2/1990 | Japan . | |
| 4-127122 | 4/1992 | Japan | 359/40 |

OTHER PUBLICATIONS

Isono et al., NHK Labs., "Autostereoscopic 3–D Display Using LCD–Generated Active Barrier–Strip", Proceedings of the 22nd Image Technology Conference, pp. 103–106, 1991.

*Primary Examiner*—Anita Pellman Gross
*Assistant Examiner*—Charles Miller
*Attorney, Agent, or Firm*—David G. Conlin; Milton Oliver

[57] ABSTRACT

A three-dimensional display unit has a liquid crystal panel for simultaneously displaying a plurality of different parallax images and an optical characteristic variable lens attached to the liquid crystal panel. The optical characteristic variable lens is formed by an array of cylindrical lenses such that a transparent substance having high flexibility is supported by transparent electrodes from both substance sides and optical characteristics of each of the cylindrical lenses can be changed by applying a voltage to the transparent substance to change at least one surface shape of the transparent substance. The three-dimensional display unit may have a head detecting section for detecting a spatial position of an observer's head; and a control section connected to the head detecting section and controlling an operation of the optical characteristic variable lens based on position information of the observer's head detected by the head detecting section such that a stereoscopic image is regenerated in an optimum position of the observer's head. Another three-dimensional display unit is also shown.

18 Claims, 37 Drawing Sheets

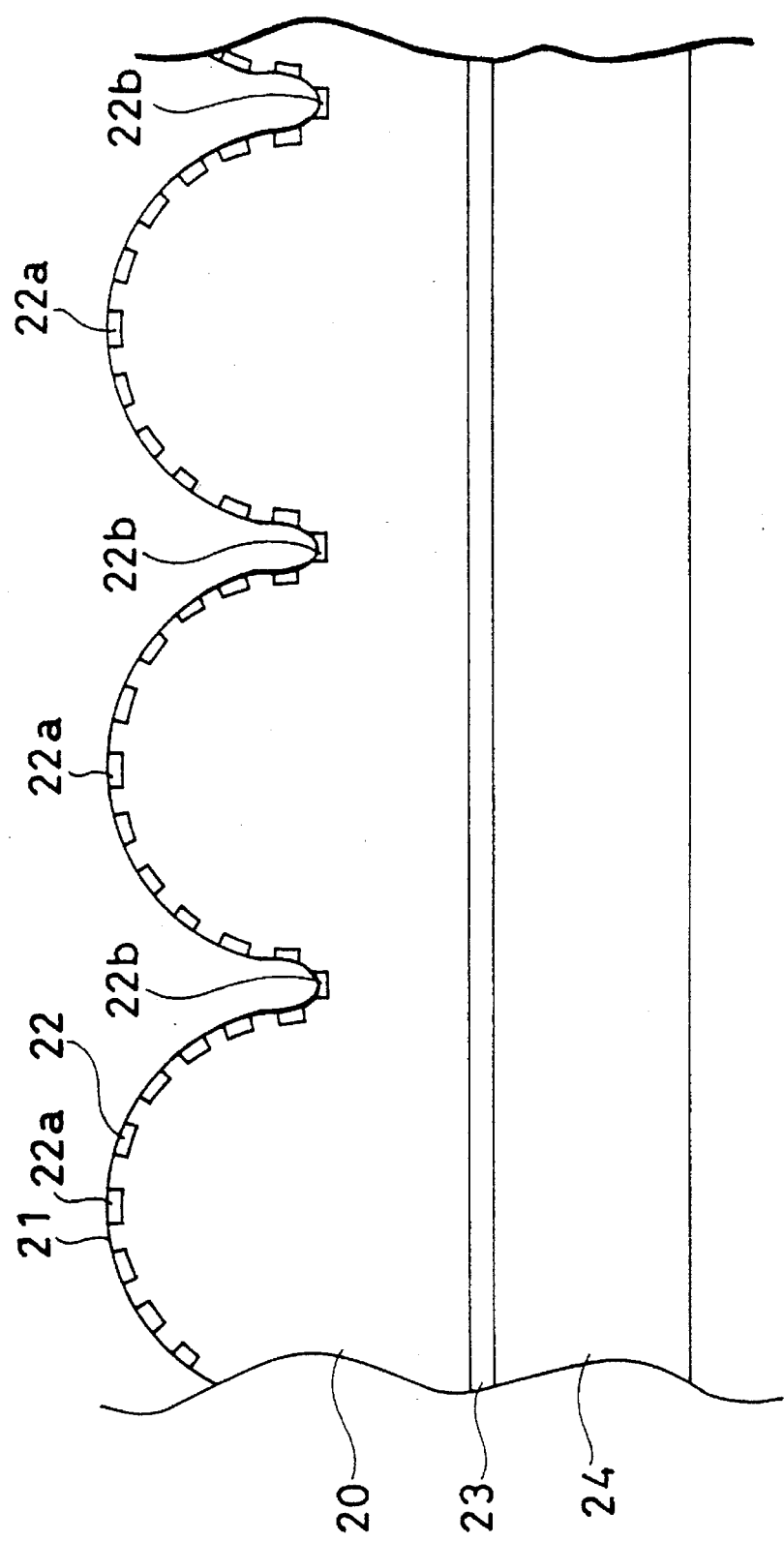

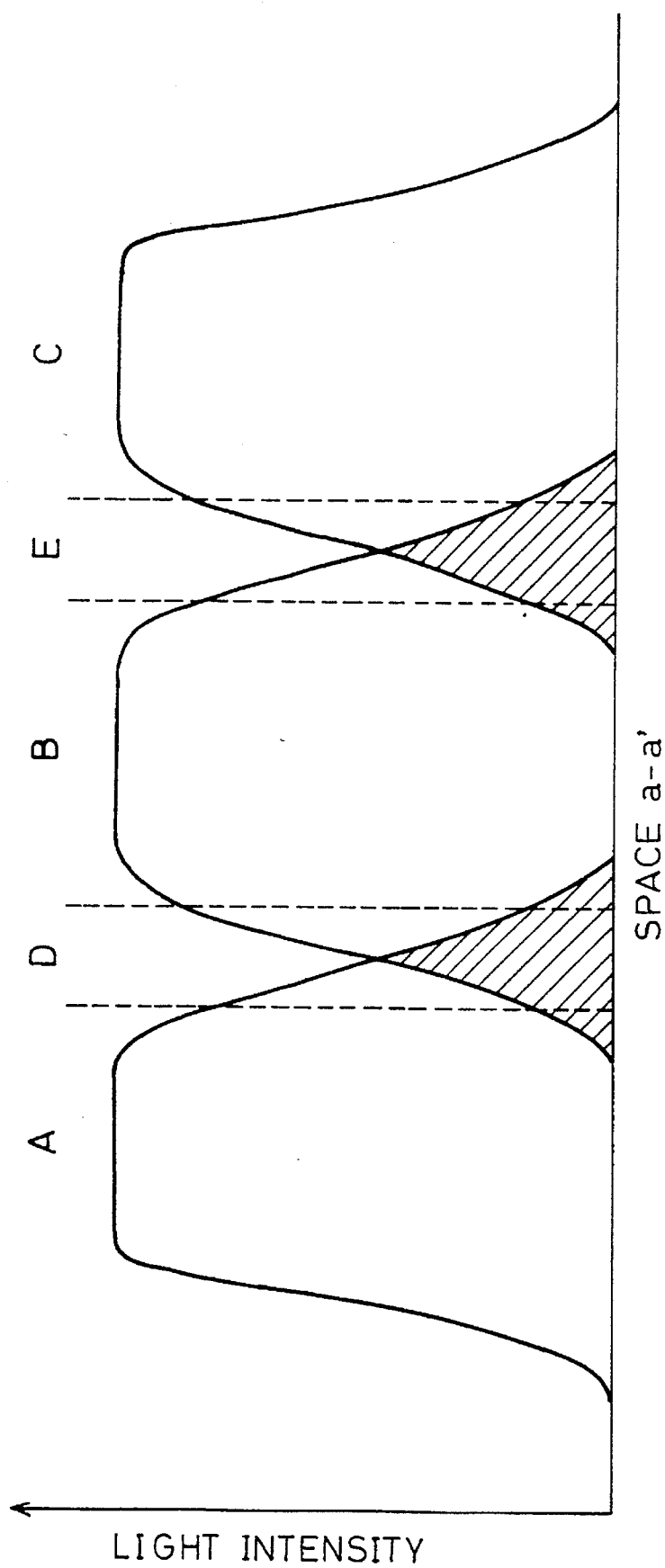

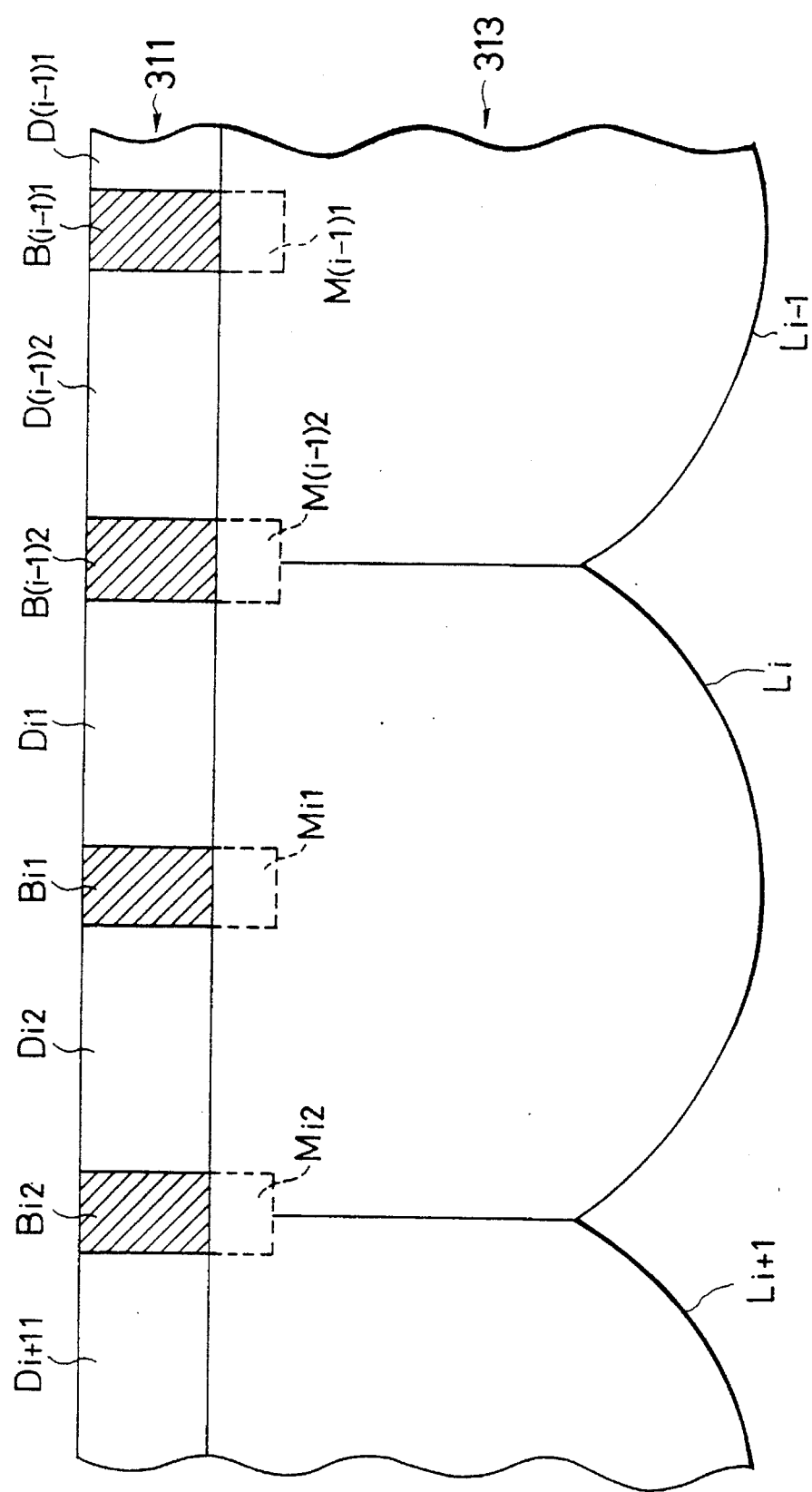

THREE-DIMENSIONAL DISPLAY UNIT WITH A VARIABLE LENS

BACKGROUND OF THE INVENTION

1. Field of the Invention

The present invention relates to a three-dimensional display unit capable of regenerating a stereoscopic image without requiring any special spectacles.

2. Description of the Related Art

In a general display technique, a three-dimensional display unit using a lenticular lens is known as a device for displaying a stereoscopic image without any spectacles. In particular, the three-dimensional display unit is realized in combination with a flat panel display such as a liquid crystal display since positions of the lenticular lens and display pixels are easily aligned with each other and a distance from a display face to the lenticular lens is short.

FIG. 1 shows one general example of the three-dimensional display unit of a direct viewing type in which the lenticular lens is directly stuck to the display face of a liquid crystal panel. The three-dimensional display unit shown in FIG. 1 is of a two-eye type as an example.

One portion of a parallax image for a left-hand eye is displayed in a pixel $DD_{i1}$ of a liquid crystal panel 50. One portion of a parallax image for a right-hand eye is displayed in a pixel $DD_{i2}$ of the liquid crystal panel 50. Index i is set to a value from 1 to n.

Stereoscopic signal sources 52 and 53 are respective sources of these parallax images. The parallax images are synthesized and displayed by a stereoscopic signal synthesizer 54. A lenticular lens 51 is arranged such that the lenticular lens 51 is closely attached onto a front face of the liquid crystal panel 50. A cylindrical lens $LL_i$ corresponds to a pair of pixels $DD_{i1}$ and $DD_{i2}$. Light is transmitted through the pixels $DD_{i1}$ and $DD_{i2}$ and is separated into light portions in display spaces C and D in an observation region by a converging action of the cylindrical lens $LL_i$. An observer can observe a stereoscopic image when left-hand and right-hand eyes of the observer are respectively located in the spaces C and D.

In FIG. 1, the cylindrical lens $LL_i$ has the same lens shape, but a pitch of the pair of pixels $DD_{i1}$ and $DD_{i2}$ is different from that of the cylindrical lens $LL_i$. In this case, the pitch of the cylindrical lens is set to be slightly smaller than the pitch of the pair of pixels $DD_{i1}$ and $DD_{i2}$. Accordingly, a center of the pair of pixels is shifted from that of the corresponding cylindrical lens in a peripheral portion of the liquid crystal panel. An amount of this shift is increased as this shift is caused in the peripheral portion. An incident angle of the transmitted light from each of the pixels to the cylindrical lens in a center of the liquid crystal panel 50 is different from that in the peripheral portion of the liquid crystal panel 50 by this shift. Accordingly, the transmitted light from pixels in the peripheral portion of the liquid crystal panel 50 can be converged into the specified spaces C and D in the observation region.

A three-dimensional display unit using a parallax barrier is known as a device of another display type capable of observing a stereoscopic image without any spectacles. FIG. 2 shows one general example of the three-dimensional display unit in which this parallax barrier is constructed by a liquid crystal panel.

The three-dimensional display unit shown in FIG. 2 is constructed by two liquid crystal panels each having the same performance and composed of a liquid crystal panel 61 for a display and a liquid crystal panel 62 for a slit barrier. The three-dimensional display unit shown in FIG. 2 is also constructed by a Fresnel lens 63 inserted between these liquid crystal panels 61 and 62, a personal computer 64 for generating a three-dimensional image and a slit barrier, etc. In this case, the two liquid crystal panels are laminated with each other in a direction in which polarizing directions of polarizing plates are in conformity with each other. Further, the two liquid crystal panels are arranged such that light from a back light arranged behind the liquid crystal panel 62 for a slit barrier is transmitted through the liquid crystal panels. The liquid crystal panel 62 for a slit barrier displays a slit image having a high contrast ratio. The liquid crystal panel 61 for a display displays multiple visual point images generated by computer graphics in a state in which the multiple visual point images are synthesized in a stripe shape. Thus, a stereoscopic image can be observed according to the principle of the parallax barrier as shown in FIG. 3. Namely, a parallax image 72 for a left-hand eye and a parallax image 73 for a right-hand eye are displayed in a stripe shape on a display panel 70. The left-hand eye can see only the parallax image for a left-hand eye and the right-hand eye can see only the parallax image for a right-hand eye when these parallax images are observed through a slit barrier 71 arranged on a front face of the display panel 70. Thus, a stereoscopic image can be observed.

At this time, a Fresnel lens 63 is used to set an opening pitch to be slightly smaller than an image pitch (see FIG. 2). This structure is similar to the above structure of a lenticular system in which the pitch of the cylindrical lens is slightly smaller than that of a display pixel.

The lenticular lens is fixedly arranged in the three-dimensional display unit of the lenticular system shown in FIG. 1. Therefore, for example, it is necessary to remake the lenticular lens when the two-eye type display is changed to a three-eye type display. Similarly, it is necessary to remake the lenticular lens when observation distances are changed. It is also necessary to remake the lenticular lens when a display panel having a different pixel pitch is used in the two-eye type display.

When a normal two-dimensional image is displayed in this general example, images having reduced resolutions are separately observed by left-hand and right-hand eyes. Accordingly, an observed image is different from an originally displayed two-dimensional image.

When a used display panel and an observation position are determined, the display unit is first simulated to design an optimum lenticular lens for a simulating condition. However, it is difficult to manufacture and attach the lenticular lens to the display unit as simulated since there are problems about a manufacturing technique of the lenticular lens at its manufacturing time, or mechanical problems in attachment of the lenticular lens to the display unit.

In contrast to this, the slit barrier is not fixed, but can be easily moved in the three-dimensional display unit of a liquid crystal parallax barrier system shown in FIG. 2. Accordingly, it is possible to cope with an arbitrary three-dimensional image display from the two-eye type to a multiple-eye type. The three-dimensional display unit can be also used as a normal two-dimensional image display unit in which no resolution is reduced. Further, it is possible to display two-dimensional and three-dimensional images on the same screen in a state in which these images ape mixed with each other.

However, there ape some faults in the three-dimensional display unit shown in FIG. 2. A first fault is a reduction in light amount caused by the slit barrier so that the screen becomes dark. A second fault is that the slit barrier becomes an eyesore obstacle at the observing time of an image. To avoid this second fault, it is necessary to set a pitch of slits of the slit barrier to be very small. However, when the slit barrier is constructed by a liquid crystal panel, the slit pitch is limited by a pixel pitch of the liquid crystal panel when the slit pitch of the slit barrier is reduced. Directivity of light is widened by a diffraction phenomenon even when a sufficiently small slit pitch is obtained. These two faults provide a limit of the parallax barrier system irrespective of a structure in which the slit barrier is constructed by a liquid crystal. Therefore, no parallax barrier system is considered as a practical technique at present so that no parallax barrier system is currently a main stream product current.

A third fault of the three-dimensional display unit shown in FIG. 2 is that the three-dimensional display unit is large-sized in comparison with a screen size. Further, a distance between the two liquid crystal panels must be increased as an observation distance is increased. Further, it is necessary to arrange a mechanical device for moving the liquid crystal panels forward and backward in accordance with a change in observation distance. A fourth fault of the three-dimensional display unit shown in FIG. 2 is that polarizing plates are required on both faces of each of the two liquid crystal panels used in the three-dimensional display unit. Accordingly, light from the back light is transmitted through a total of four polarizing plates. Therefore, an amount of the transmitted light is reduced since no transmittance of each of the polarizing plates is equal to 100%. A strong back light is required to compensate this reduced light amount. Accordingly, there are various kinds of problems about the general technique of the three-dimensional display unit.

FIG. 4 shows another general three-dimensional display unit using a lenticular lens. In this three-dimensional display unit, the lenticular lens is directly stuck onto the display face of a liquid crystal panel 121. This three-dimensional display unit is of a two-eye type in which two different parallax images are simultaneously displayed in the liquid crystal panel. One portion of a parallax image corresponding to a left-hand eye is displayed in a display pixel $D_{i1}$ of the liquid crystal panel 121. One portion of a parallax image corresponding to a right-hand eye is displayed in a display pixel $D_{i2}$ of the liquid crystal panel 121. A cylindrical lens $L_i$ is arranged such that this cylindrical lens corresponds to a pair of display pixels $D_{i1}$ and $D_{i2}$. Light is transmitted through the display pixels $D_{i1}$ and $D_{i2}$ and is separated into light portions in display spaces P and Q within an observation region by a converging operation of the cylindrical lens $L_i$. Light is similarly separated into light portions with respect to index i from 1 to n. Thus, the parallax image for the left-hand eye is converged in the display space P and the parallax image for the right-hand eye is converged in the display space Q. A stereoscopic image can be observed when the left-hand and right-hand eyes are respectively located in the display spaces P and Q.

As mentioned above, in the three-dimensional display unit of a lenticular system, spaces capable of observing the stereoscopic image are limited and are spaced from each other.

A three-dimensional display unit of a multiple-eye type for regenerating many different parallax images is used in a certain case to widen spaces capable of observing a stereoscopic image. However, in this case, many different parallax images such as three parallax images or more must be simultaneously displayed in a liquid crystal panel 121. Accordingly, resolution of one parallax image is greatly reduced since the number of display pixels in the liquid crystal panel 121 is limited.

Therefore, another general three-dimensional display unit of a head tracing type is developed to observe a stereoscopic image having high resolution in a wider space. In this three-dimensional display unit, the position of an observer's head is detected while a stereoscopic image of the two-eye type is regenerated. A position of the regenerated stereoscopic image is conformed to the observer's head position.

For example, the observer's head position is photographed by a video camera at any time. The position of a contour of an observer's face or the position of an observer's eye is detected from an image signal of the video camera. An operation of the three-dimensional display unit is controlled such that the regenerated stereoscopic image is displayed in this detected position.

FIG. 5 is a view for explaining a basic principle of the three-dimensional display unit of the head tracing type. A lenticular lens 132 is arranged on the front face of a liquid crystal panel 131. The regenerating principle of a stereoscopic image is similar to that explained with reference to FIG. 4.

The differences between the regenerating principles shown in FIGS. 4 and 5 are that a lens moving device 133 is connected to the lenticular lens 132 so as to change a relative position of the lenticular lens 132 with respect to the liquid crystal panel 131. When the relative position of the lenticular lens 132 with respect to the liquid crystal panel 131 is changed, an emitting direction of light emitted from each of cylindrical lenses constituting the lenticular lens is changed by a converging action thereof so that display positions P' and Q' in display spaces can be controlled.

The lens moving device 133 is a device for exactly controlling a position of the lenticular lens 132. Accordingly, the lens moving device 133 is constructed by a precise mechanical system.

A regenerating position of the stereoscopic image is controlled by moving the lenticular lens 132 such that this regenerating position is in conformity with a detected observer's head position.

As mentioned above, in the general three-dimensional display unit of the two-eye type, a space capable of observing the stereoscopic image is greatly limited on the basis of the principle of the lenticular system.

In the general three-dimensional display unit of the multiple-eye type, the observation space of the stereoscopic image is widened in accordance with multiple eyes. However, resolution of one parallax image is reduced so that the quality of a regenerated stereoscopic image is reduced.

Further, in the general three-dimensional display unit of the head tracing type, relative positions of the liquid crystal panel and the lenticular lens must be very exactly controlled. Therefore, a precise mechanical system is used so that the three-dimensional display unit is large-sized. Accordingly, a relatively large lenticular lens is moved so that responsibility of position control in a display space is reduced. Further, the lenticular lens is moved only on a face parallel to the display panel so that a head tracing range is also limited on this face.

The general three-dimensional display unit of the head tracing type is of a two-eye type. Accordingly, no observed stereoscopic image is moved even when the observer's head is moved. Therefore, no natural stereoscopic image can be regenerated in this three-dimensional display unit.

In the three-dimensional display unit of a direct viewing type as another general example, a lenticular lens is directly stuck onto a liquid crystal panel display face.

One cylindrical lens corresponding to a plurality of pixels of the liquid crystal panel is prepared in the three-dimensional display unit of the direct viewing type. One portion of different parallax images is displayed in each of the plural pixels. Each of the parallax images is separately formed in a certain space in an observation region by a converging function of the cylindrical lens. An observer can observe a stereoscopic image if the observer sees the different parallax images by his right-hand and left-hand eyes.

When a pitch of the plural pixels of the above liquid crystal panel and a pitch of the cylindrical lens are equal to each other and all cylindrical lenses have the same shape, the size of an observable display screen is a small size about a distance between the observer's eyes.

To increase the size of the display screen, it is necessary to converge light emitted from a peripheral portion of the liquid crystal panel to the observation space prescribed by the distance between the observer's eyes. For example, a method for converging this light to the observation space is shown in FIG. 6.

FIG. 6 shows an example of the three-dimensional display unit of a two-eye type. In this three-dimensional display unit, one portion of a parallax image for a left-hand eye is displayed in a pixel $G_{i1}$ of a liquid crystal panel 30. One portion of a parallax image for a right-hand eye is displayed in a pixel $G_{i2}$ of the liquid crystal panel 30. Index i is set to a value from 1 to n. A cylindrical lens $L_i$ is arranged in accordance with a pair of pixels $G_{i1}$ and $G_{i2}$.

Light is transmitted through the pixels $G_{i1}$ and $G_{i2}$ and is separated into light portions in display spaces I and J in the observation region by a converging operation of the cylindrical lens $L_i$. A stereoscopic image can be observed when the left-hand and right-hand eyes are respectively located in the display spaces I and J.

In FIG. 8, the cylindrical lens $L_i$ has the same shape. However, a pitch of the pair of pixels $G_{i1}$ and $G_{i2}$ is different from a pitch of the cylindrical lens $L_i$. The pitch of the cylindrical lens $L_i$ is set to be slightly smaller than the pitch of the pair of pixels $G_{i1}$ and $G_{i2}$.

A center of the pair of pixels $G_{in}$ is shifted from a center of the corresponding cylindrical lens $L_i$ in a peripheral portion of the liquid crystal panel 30. An amount of this shift is increased as the shift is caused in the peripheral portion of the liquid crystal panel 30. Incident angles of transmitted light of the respective pixels $G_{in}$ incident to the cylindrical lens $L_i$ are different from each other by this shift in central and peripheral portions of the liquid crystal panel 30. Accordingly, the transmitted light from the pixels $G_{in}$ in the peripheral portion of the liquid crystal panel 30 can be converged into the specified spaces I and J in the observation region.

However, the above general three-dimensional display unit as a flat panel display has a wiring portion between pixels. No light is transmitted through this wiring portion. Accordingly, it is considered that black light is transmitted through this wiring portion. In this case, this black light is converged between the display spaces I and J in the specified observation region by a converging principle similar to the above-mentioned converging principle. This means that an unreachable region of the transmitted light from the pixels exists between the display spaces I and J.

FIG. 7 shows one example of the construction of a general flat panel display of a three-eye type.

In the flat panel display shown in FIG. 7, a cylindrical lens $R_i$ is arranged in proximity to display pixels $Q_{i1}$, $Q_{i2}$ and $Q_{i3}$ of a liquid crystal panel 40 such that the cylindrical lens $R_i$ corresponds to these display pixels. The transmitted light is converged and formed as a parallax image in each of display spaces S, T and U within an observation region. No light is transmitted through a wiring portion between pixels of the liquid crystal panel so that this wiring portion forms a non-transmitting portion $P_i$.

This non-transmitting portion $P_i$ causes a space to which no light is almost transmitted within the observation region. Namely, non-display spaces V and W are formed in accordance with non-transmitting portions $P_{i1}$ and $P_{i2}$.

An observer recognizes each of the non-display spaces V and W as a black band. The observer sees the black band as a non-display portion at any time when the observer moves his head and an observed stereoscopic image is changed from a combination of the display spaces S and T to a combination of the display spaces T and U.

FIG. 8 shows a light intensity distribution of a projecting pattern which is obtained by converging the transmitted light of each of the display pixels by the cylindrical lens $R_i$ and is taken along a cutting plane b–b' in FIG. 7.

In FIG. 8, the width of a non-display portion is widened in comparison with an ideal state. Accordingly, there is a problem that this widened non-display portion becomes a great obstacle when a continuous stereoscopic image is observed.

FIG. 9a is a plan view showing a liquid crystal panel 91. FIG. 9b is a cross-sectional view showing a lenticular lens 92 corresponding to the liquid crystal panel 91 shown in FIG. 9a.

FIGS. 9a and 9b show a two-eye type. With respect to the liquid crystal panel 91, a scanning operation is performed in a vertical direction such that a main scanning line is in conformity with the longitudinal direction of a cylindrical lens within the lenticular lens 92. The liquid crystal panel 91 displays images for right-hand and left-hand eyes in a mixing state every other main scanning line. Namely, the image for the right-hand eye is displayed on each of odd horizontal scanning lines such as (1), (3), (5), (7), - - -. The image fop the left-hand eye is displayed on each of even horizontal scanning lines such as (2), (4), (6), (8), - - -.

A projected image of the image for the left-hand eye shown in FIG. 10a is displayed by a converging action of the lenticular lens 92 stuck to a front face of the liquid crystal panel 91 in a certain space in an observation region. A projected image of the image for the right-hand eye shown in FIG. 10b is displayed in a spatial portion adjacent to this certain space.

When a direct current voltage is continuously applied to the liquid crystal panel, electrolysis of liquid crystal molecules is caused so that the liquid crystal panel is finally unoperated. Therefore, an alternating current voltage is normally applied to the liquid crystal panel. A system for applying the alternating current voltage to the liquid crystal panel is constructed by two systems composed of a line inverting system shown in FIG. 11a and a frame inverting system shown in FIG. 11b.

In the line inverting system shown in FIG. 11a, a voltage having positive and negative polarities is applied to the liquid crystal panel every one line (one horizontal period). In contrast to this, in the frame inverting system shown in FIG. 11b, a voltage having positive and negative polarities is applied to the liquid crystal panel every one frame (one vertical period).

As mentioned above, in the general voltage applying technique, the positive and negative polarities are inverted in the frame inverting system or the line inverting system. In the frame inverting system, the images for the left-hand and right-hand eyes respectively shown in FIGS. 10a and 10b and projected in the stereoscopic observation space are displayed by a positive or negative voltage having the same polarity. The images for the left-hand and right-hand eyes are displayed in the next frame by a negative or positive voltage having a polarity inverse to the previous polarity.

The images for the left-hand and right-hand eyes are instantaneously displayed by the same polarity at any time. However, in view of a change in time, the voltage polarities are repeatedly inverted every frame with respect to the images for the left-hand and right-hand eyes. A slight difference in voltage setting is caused by a difference between the voltage polarities so that a flicker phenomenon is caused. In this flicker phenomenon, light and dark portions are periodically repeated.

In the line inverting system, the image for the left-hand eye shown in FIG. 10a and projected in the stereoscopic observation space in a frame at a certain time is displayed by the same voltage polarity with respect to all lines. The image for the right-hand eye shown in FIG. 10b is also displayed by the same voltage polarity with respect to all lines. However, the voltage polarities with respect to the images for the left-hand and right-hand eyes are different from each other. The voltage polarities are inverted in the next frame with respect to each of the images for the left-hand and right-hand eyes. Therefore, the polarities of the applied voltage are also different from each other in the next frame with respect to the images for the left-hand and right-hand eyes.

Accordingly, the polarities of the applied voltage are different from each other in a frame at the same time with respect to the images for the left-hand and right-hand eyes so that a difference in brightness between the images for the left-hand and right-hand eyes is caused. Therefore, when an observer sees a stereoscopic image, images having different brightnesses are observed by the left-hand and right-hand eyes so that fatigue of the observer is increased.

SUMMARY OF THE INVENTION

It is therefore a first object of the present invention to provide a three-dimensional display unit without any spectacles in which it is possible to cope with an arbitrary three-dimensional image display from a two-eye type to a multiple-eye type, and an observation region can be freely moved forward, backward, rightward and leftward, and the three-dimensional display unit can be also used as a normal two-dimensional image display unit reducing no resolution, and two-dimensional and three-dimensional images can be displayed on the same screen in a mixing state, and parallax images can be displayed in a vertical direction in addition to a horizontal direction.

A second object of the present invention is to provide a three-dimensional display unit in which the three-dimensional display unit is of a head tracing type without including any mechanical system and a region for observing a stereoscopic image is greatly widened and the stereoscopic image is regenerated with high resolution and high quality.

A third object of the present invention is to provide a three-dimensional display unit in which a stereoscopic image conforming to the position of an observer's head is regenerated and can be naturally observed in addition to the second object.

A fourth object of the present invention is to provide a three-dimensional display unit in which light reaches a non-display space between display spaces within an observation region, and no black band is seen between parallax images.

A fifth object of the present invention to provide a three-dimensional display unit in which it is possible to generate images for left-hand and right-hand eyes having no change with the passage of time and no change in brightness therebetween, and a stereoscopic image can be observed with high quality and reduced fatigue.

In accordance with a first construction of the present invention, the above first object can be achieved by a three-dimensional display unit comprising display means for simultaneously displaying a plurality of different parallax images; and optical means attached to the display means and formed by an array of cylindrical lenses such that a transparent substance having high flexibility is supported by transparent electrodes from both substance sides, and optical characteristics of each of the cylindrical lenses can be changed by applying a voltage to the transparent substance to change at least one surface shape of the transparent substance.

The optical characteristics include a focal length.

In accordance with a seventh construction of the present invention, the above first object can be also achieved by a three-dimensional display unit comprising display means for simultaneously displaying a plurality of different parallax images; and optical means attached to the display means and formed by an array of cylindrical lenses such that a transparent substance having a refractive index changed by a voltage applied to this transparent substance is supported by transparent electrodes from both substance sides, and optical characteristics of each of the cylindrical lenses can be changed by applying the voltage to the transparent substance to provide a refractive index distribution for the transparent substance.

In accordance with an eighth construction of the present invention, the optical means is constructed by a liquid crystal.

In accordance with a ninth construction of the present invention, the optical means acts as a two-dimensional lens array.

In the first construction of the three-dimensional display unit, the display means simultaneously displays a plurality of different parallax images. The optical means is attached onto a front face of the display means. The optical means is constructed such that a transparent substance having high flexibility is supported by transparent electrodes from both substance sides. In the optical means realizing a cylindrical lens array, optical characteristics of each of the cylindrical lenses can be changed by applying a voltage to the transparent substance to change at least one surface shape of the transparent substance. The plural parallax images displayed by the display means are spatially separated from each other and are projected to a certain observation space by a converging action of this cylindrical lens array. An observer simultaneously sees the different parallax images by different eyes so that a stereoscopic image is observed. The optical characteristics of the optical means can be changed by changing a pattern of the applied voltage. Accordingly, lens parameters such as a lens curvature radius, a lens thickness and a lens pitch are arbitrarily set in a state in which the optical means is mounted to the display means. Further, a region having no lens action is realized by arranging a region in which no voltage is partially applied to the transparent substance.

In the seventh construction of the three-dimensional display unit, the display means simultaneously displays a plurality of different parallax images. The optical means is attached onto a front face of the display means. The optical means is constructed such that a transparent substance having a refractive index changed by a voltage applied to this transparent substance is supported by transparent electrodes from both substance sides. In the optical means realizing a cylindrical lens array, optical characteristics of each of the cylindrical lenses can be changed by applying the voltage to the transparent substance to provide a refractive index distribution for the transparent substance. The plural parallax images displayed by the display means are spatially separated from each other and are projected to a certain observation space by a converging action of this cylindrical lens array. An observer simultaneously sees the different parallax images by different eyes so that a stereoscopic image is observed. The optical characteristics of the optical means can be changed by changing a pattern of the applied voltage. Accordingly, lens parameters such as a lens curvature radius, a lens thickness and a lens pitch are arbitrarily set in a state in which the optical means is mounted to the display means. Further, a region having no lens action is realized by arranging a region in which no voltage is partially applied to the transparent substance.

In the eighth construction of the three-dimensional display unit, the optical means is constructed by a liquid crystal so that the optical characteristics of the optical means can be greatly changed at a smaller voltage by electrooptic effects.

In the ninth construction of the three-dimensional display unit, the optical means acts as a two-dimensional lens array so that it is possible to observe a stereoscopic image having a parallax in a vertical direction in addition to a horizontal direction.

In accordance with a fourteenth construction of the present invention, the above second object can be achieved by a three-dimensional display unit comprising display means for simultaneously displaying a plurality of different parallax images; optical means attached to the display means and constructed by an array of cylindrical lenses such that optical characteristics of each of the cylindrical lenses can be changed; detecting means for detecting a spatial position of an observer's head; and control means connected to the detecting means and controlling an operation of the optical means based on position information of the observer's head detected by the detecting means such that a stereoscopic image is regenerated in an optimum position of the observer's head.

In accordance with a nineteenth construction of the present invention, the above third object can be achieved by a three-dimensional display unit comprising display means for simultaneously displaying a plurality of different parallax images; optical means attached to the display means and constructed by an array of cylindrical lenses such that optical characteristics of each of the cylindrical lenses can be changed; detecting means for detecting a spatial position of an observer's head; control means connected to the detecting means and controlling an operation of the optical means based on position information of the observer's head detected by the detecting means such that a stereoscopic image is regenerated in an optimum position of the observer's head; a plurality of stereoscopic signal sources for performing a multiple-eye display; and selecting means connected to the plural stereoscopic signal sources and the detecting means and selecting a stereoscopic signal displayed to the display means on the basis of the position information of the observer's head detected by the detecting means.

In accordance with a twentieth construction of the present invention, the optical means is constructed by a liquid crystal.

In accordance with a twenty-first construction of the present invention, a projecting lens and a diffusive layer are arranged between the display means and the optical means.

In the three-dimensional display unit having the fourteenth construction, a plurality of different parallax images are simultaneously displayed in the display means in every other array of display pixels arranged in one line. The optical means is attached to an upper face of the display means. The optical means is constructed by an array of cylindrical lenses having optical characteristics electrically controlled. The plural parallax images displayed in the display means are separated from each other by a converging action of the optical means and are projected into a certain observation region. An observer can observe a stereoscopic image if the different parallax images are simultaneously seen by different eyes. The detecting means detects a spatial position of the observer's head. The control means receives position information of the observer's head from the detecting means and controls the optical characteristics of the optical means based on this position information such that the stereoscopic image is regenerated in an optimum position.

In the three-dimensional display unit having the nineteenth construction, a plurality of different parallax images are simultaneously displayed in the display means in every other array of display pixels arranged in one line. The plurality of stereoscopic signal sources are prepared to perform a multiple-eye display. A stereoscopic signal displayed in the display means is selected by the selecting means. The optical means is attached onto an upper face of the display means. The optical means is constructed by an array of cylindrical lenses having optical characteristics electrically controlled. The plural parallax images displayed in the display means are separated from each other by a converging action of the optical means and are projected into a certain observation region. An observer can observe a stereoscopic image if the different parallax images are simultaneously seen by different eyes. The detecting means detects a spatial position of the observer's head. The control means receives position information of the observer's head from the detecting means and controls the optical characteristics of the optical means based on this position information such that the stereoscopic image is regenerated in an optimum position. Further, the selecting means receives the position information of the observer's head from the detecting means and selects a stereoscopic signal conforming to this head position and displays this stereoscopic signal in the display means.

In the three-dimensional display unit having the twentieth construction, the optical means is constructed by a liquid crystal. Accordingly, the refractive index of a cylindrical lens can be greatly changed so that optical characteristics of the cylindrical lens can be changed at a low voltage.

In the three-dimensional display unit having the twenty-first construction, a projecting lens and a diffusive layer are arranged between the display means and the optical means. Accordingly, it is possible to provide a three-dimensional display unit of a projecting type for enabling a large-sized screen display.

In accordance with a third construction of the present invention, the above fourth object can be achieved by a three-dimensional display unit comprising display means having a plurality of pixels and a non-transmitting portion and simultaneously displaying a plurality of parallax images and emitting light from each of the pixels; masking means attached to a surface of the display means and arranged at the same pitch as a pitch of the respective pixels in accordance with the non-transmitting portion of the display means; the masking means having an unopen portion constructed such that one portion of light emitted from each of the pixels is incident to the unopen portion and is emitted from the unopen portion by changing an optical path of the incident light by the unopen portion; and lens means constructed by an array of cylindrical lenses each having the same shape and attached to a surface of the masking means.

In accordance with a fourth construction of the present invention, the unopen portion of the masking means has a light interrupting film for reducing the size of a non-display space corresponding to the non-transmitting portion of the display means.

In the third construction of the three-dimensional display unit, the display means has a plurality of pixels and a non-transmitting portion and simultaneously displays a plurality of parallax images and emits light from each of the pixels. The masking means is attached to a surface of the display means and is arranged at the same pitch as a pitch of the respective pixels in accordance with the non-transmitting portion of the display means. An unopen portion of the masking means is constructed such that one portion of light emitted from each of the pixels is incident to the unopen portion and is emitted from the unopen portion by changing an optical path of the incident light by the unopen portion. The lens means is constructed by an array of cylindrical lenses each having the same shape and attached to a surface of the masking means. The lens means allocates emitted lights from adjacent display pixels to different display spaces.

In the fourth construction of the three-dimensional display unit, a light interrupting film arranged in the unopen portion of the masking means reduces the size of a non-display space corresponding to the non-transmitting portion of the display means.

In accordance with a fifth construction of the present invention, the above fifth object can be achieved by a three-dimensional display unit comprising display means for simultaneously displaying a predetermined number of different parallax images; and optical means constructed by an array of cylindrical lenses such that a longitudinal direction of each of the cylindrical lenses is equal to a vertical direction; the three-dimensional display unit being constructed such that the display means scans a main scanning line thereof in the vertical direction such that this main scanning line is in conformity with the longitudinal direction of each of the cylindrical lenses; the polarities of a voltage applied to the display means are inverted on the main scanning line every predetermined number of parallax images; and the voltage having a polarity inverse to that in the previous frame is repeatedly applied to the display means in the next frame every main scanning line.

In accordance with a sixth construction of the present invention, the display means inverts the voltage polarities every one main scanning line when the number of different parallax images is equal to an odd number, and the voltage having a polarity inverse to that in the previous frame is repeatedly applied to the display means in the next frame every main scanning line.

In the fifth construction of the three-dimensional display unit, the display means and the optical means are arranged such that a main scanning line of the display means is in conformity with the longitudinal direction of a cylindrical lens within the optical means. The display means simultaneously displays a predetermined number of different parallax images every other main scanning line. One cylindrical lens within the optical means corresponds to one set of the predetermined number of main scanning lines. The polarities of a voltage applied to the display means are inverted on the main scanning line every predetermined number of parallax images. Light emitted from the display means is separated into light portions by a converging operation of the optical means every parallax image. Thus, different parallax images are projected into different spaces. Each of the projected images is formed as an image having a polarity inverting pattern every one main scanning line. Further, an image provided by a voltage polarity inverse to that provided in the previous pattern is formed in the next frame.

When the number of parallax images is equal to an odd number, the voltage polarities are inverted every one main scanning line of the display means. An image separated and projected by the optical means has a polarity inverting pattern every one main scanning line. Further, an image provided by a voltage polarity inverse to that provided in the previous pattern is formed in the next frame.

Further objects and advantages of the present invention will be apparent from the following description of the preferred embodiments of the present invention as illustrated in the accompanying drawings.

BRIEF DESCRIPTION OF THE DRAWINGS

FIG. 13 is an enlarged cross-sectional view showing one constructional example of an optical characteristic variable lens used in the three-dimensional display unit shown in FIG. 12;

FIG. 18 is an explanatory view showing another electrode arrangement used for the optical characteristic variable lens shown in FIG. 15;

FIG. 29b is a view enlargedly showing one portion of the three-dimensional display unit shown in FIG. 29a;

FIG. 30 is a view for explaining light intensity of the three-dimensional display unit shown in FIGS. 29a and 29b;

FIG. 34 is an enlarged cross-sectional view showing the construction of a three-dimensional display unit in accordance with another embodiment of the present invention;

FIG. 35b is a view enlargedly showing one portion of the three-dimensional display unit shown in FIG. 35a;

DESCRIPTION OF THE PREFERRED EMBODIMENTS

The preferred embodiments of a three-dimensional display unit in the present invention will next be described in detail with reference to the accompanying drawings.

Figure 1:
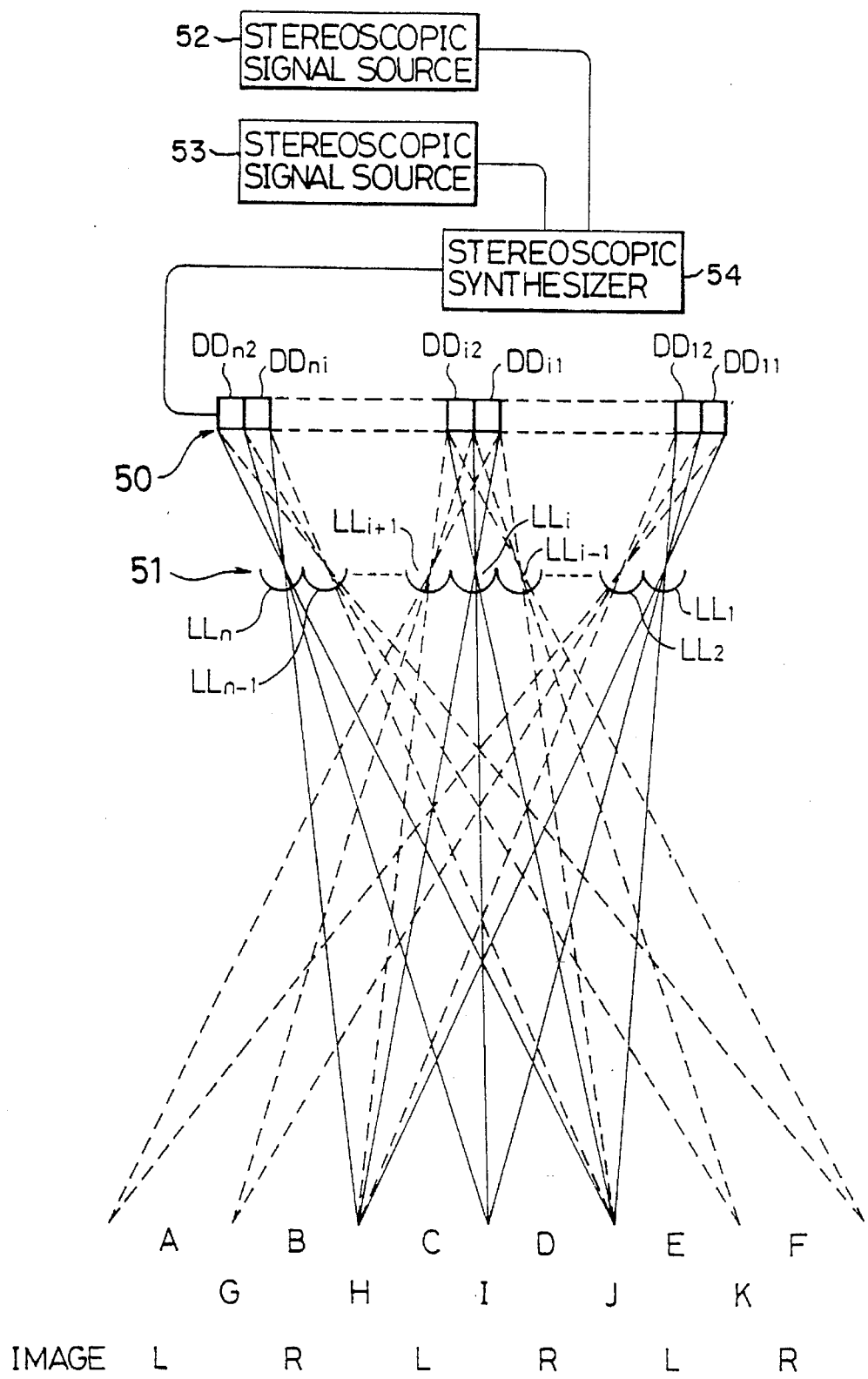
FIG. 1 is a cross-sectional view showing the structure of a general three-dimensional display unit of a lenticular system as one constructional example.
Figure 2:
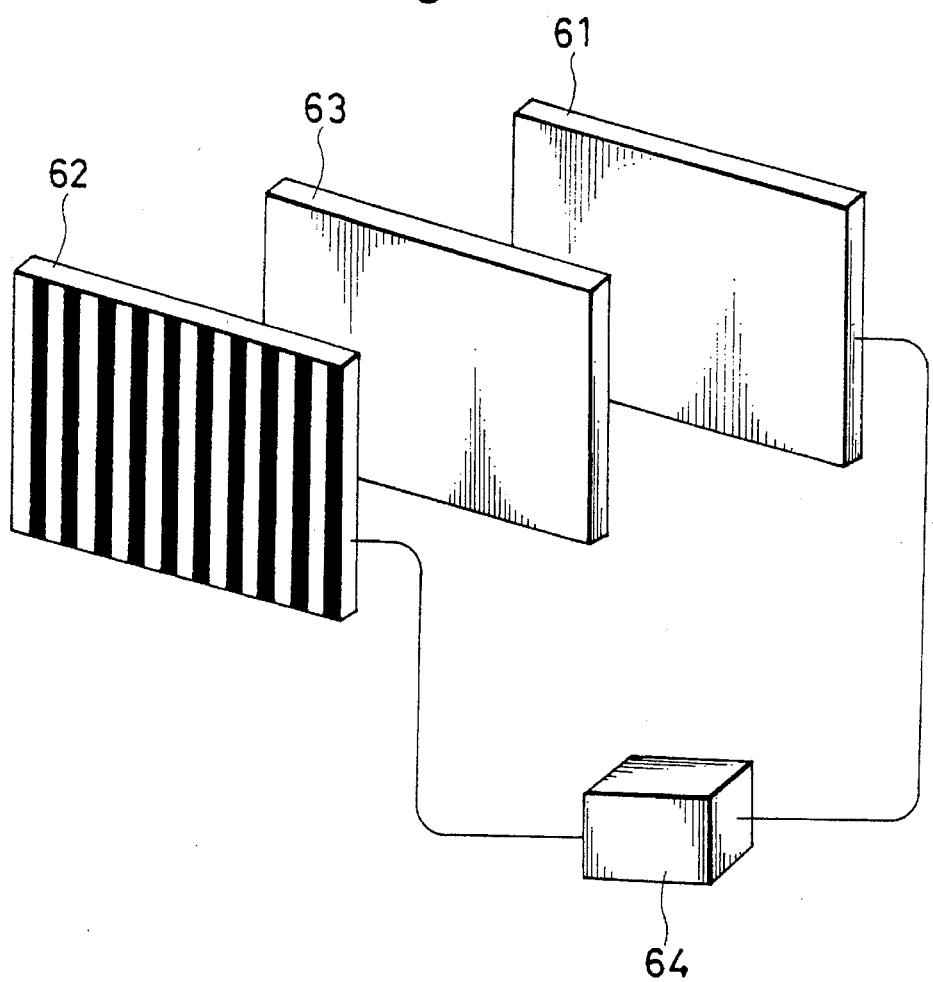
FIG. 2 is a schematic view showing one constructional example of a general three-dimensional display unit of a liquid crystal parallax barrier system.
Figure 3:
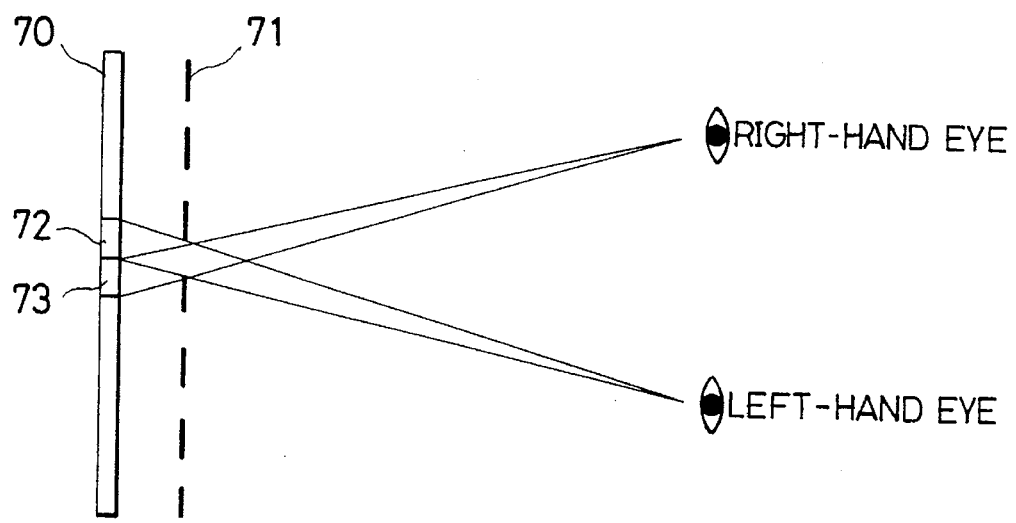
FIG. 3 is a view for illustrating the principle of the parallax barrier system.
Figure 4:
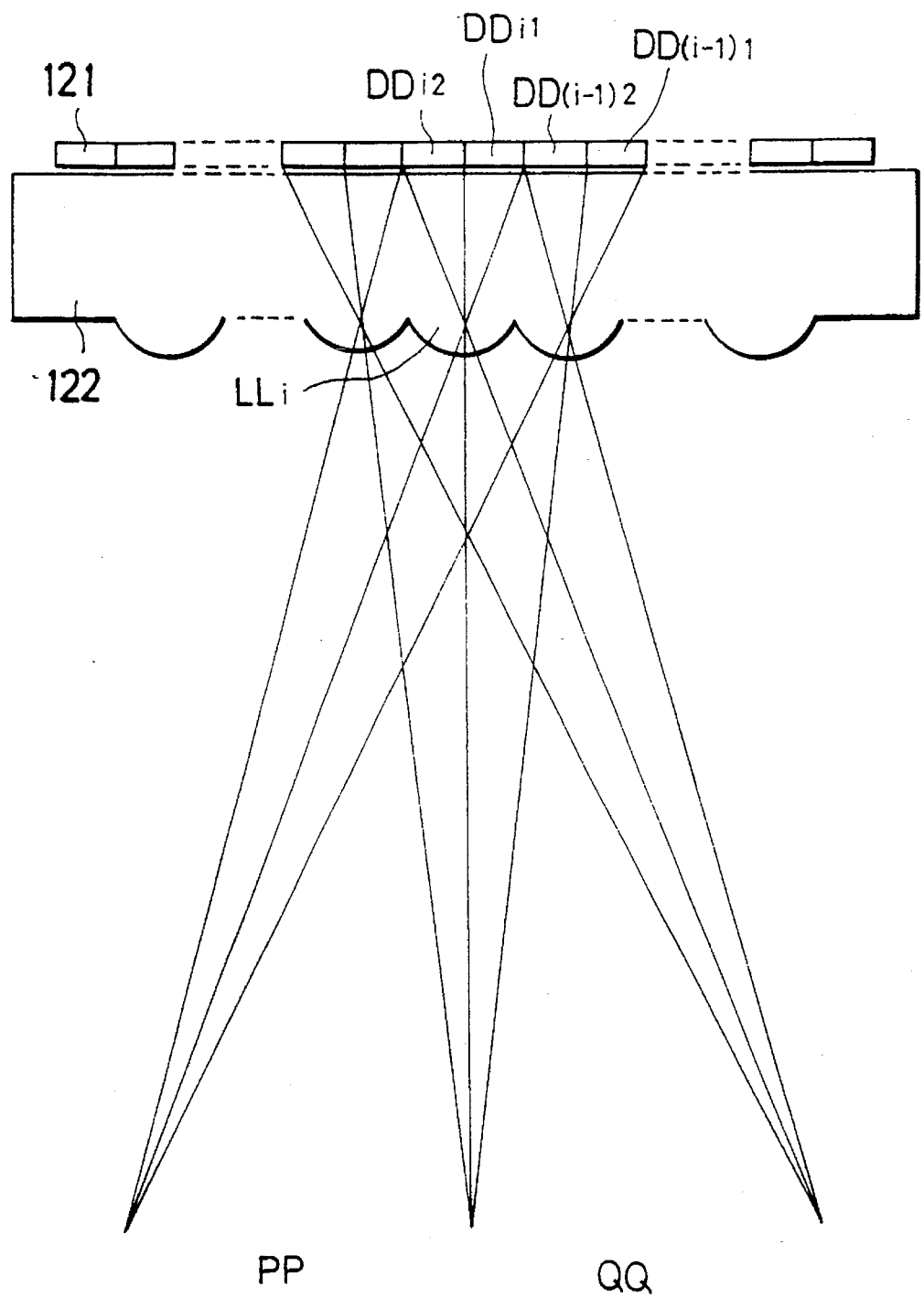
FIG. 4 is a cross-sectional view showing the structure of another general three-dimensional display unit.
Figure 5:
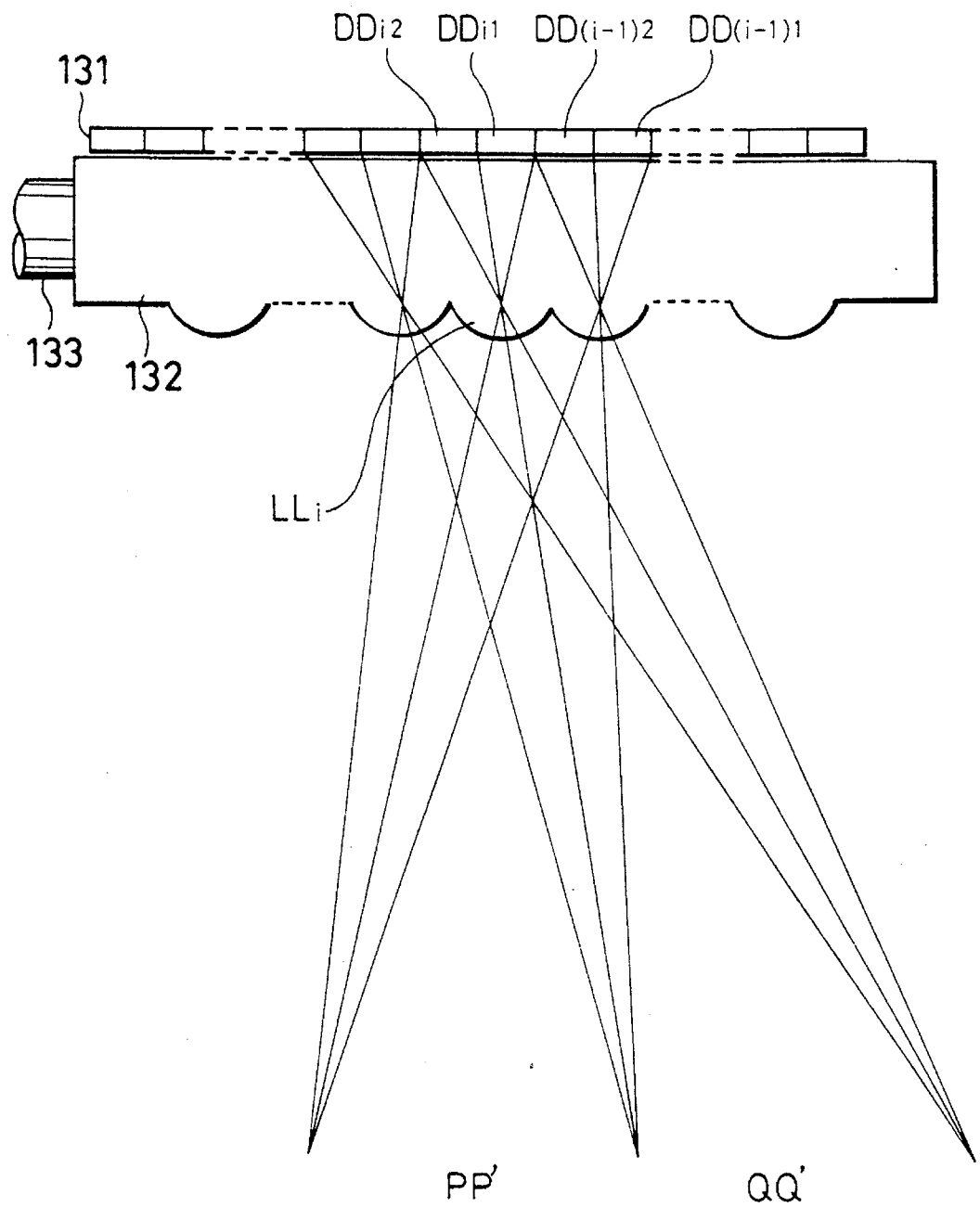
FIG. 5 is a cross-sectional view showing the structure of a general three-dimensional display unit of a head tracing type.
Figure 6:
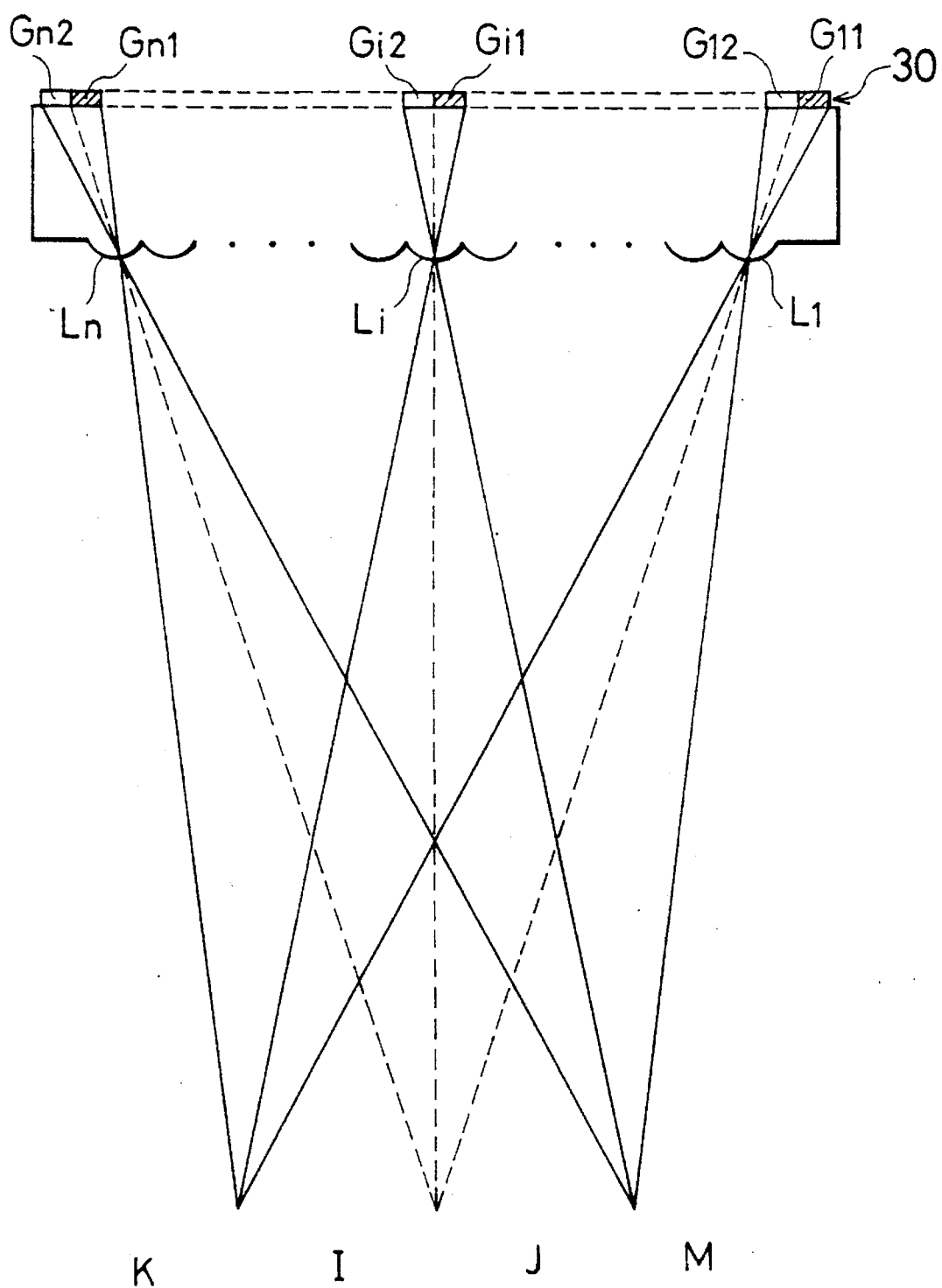
FIG. 6 is a cross-sectional view showing one constructional example of a general three-dimensional display unit of a two-eye type.
Figure 7:
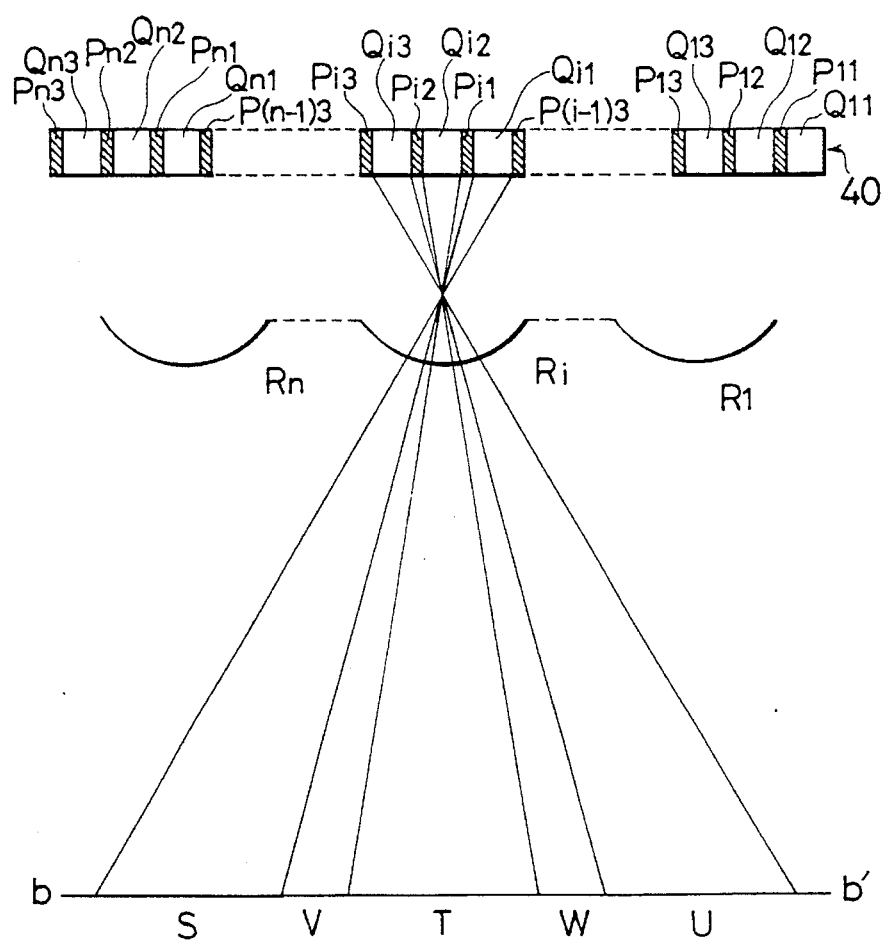
FIG. 7 is a cross-sectional view showing one constructional example of a general three-dimensional display unit of a three-eye type.
Figure 8:
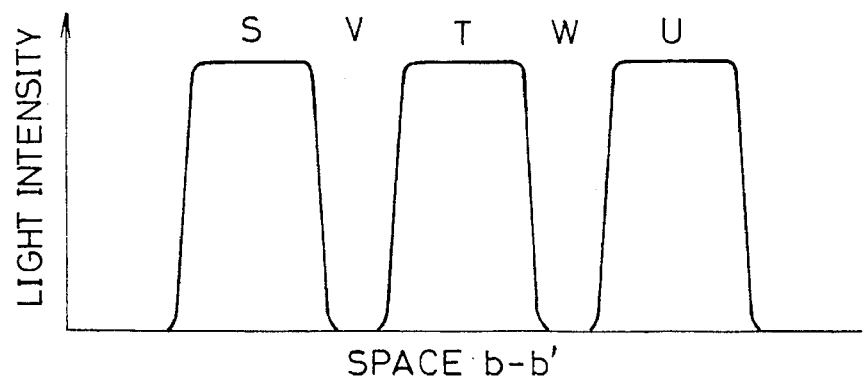
FIG. 8 is a view for explaining light intensity of the general three-dimensional display unit of the three-eye type shown in FIG. 7.
Figure 9A:
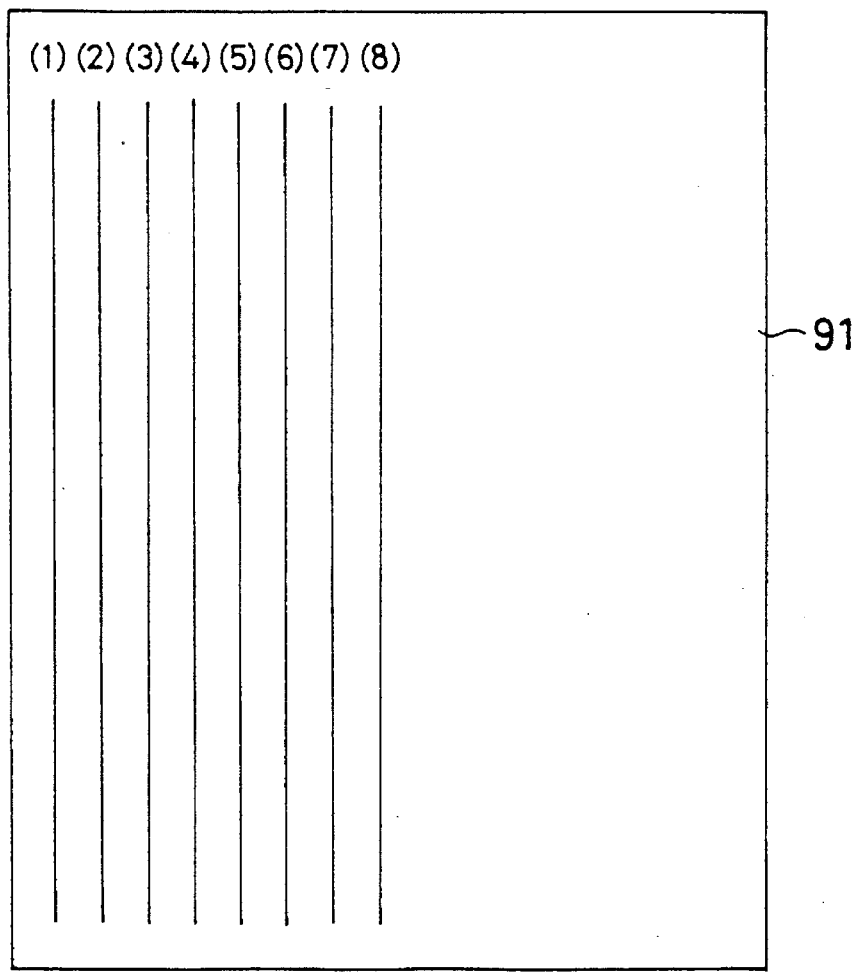
FIGS. 9a and 9b are schematic views showing another constructional example of the general three-dimensional display unit of a two-eye type.
Figure 9B:
Figure 10A:
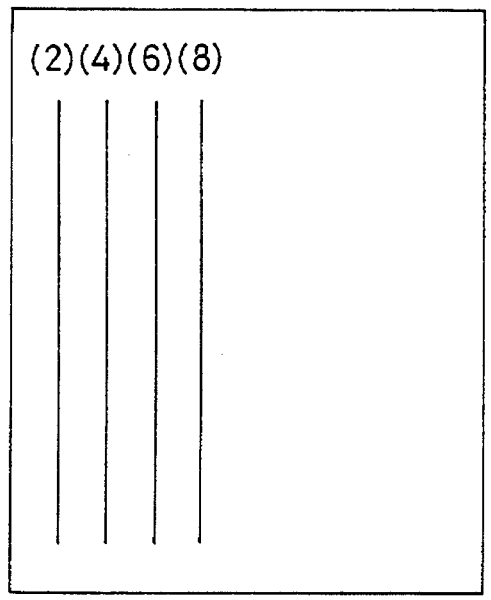
FIGS. 10a and 10b are views for explaining images for left-hand and right-hand eyes respectively projected to the left-hand and right-hand eyes of an observer from a liquid crystal panel shown in FIGS. 9a and 9b.
Figure 10B:
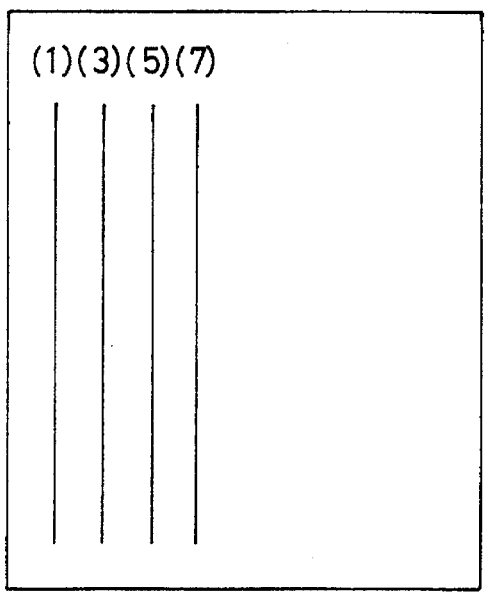
Figure 11A:
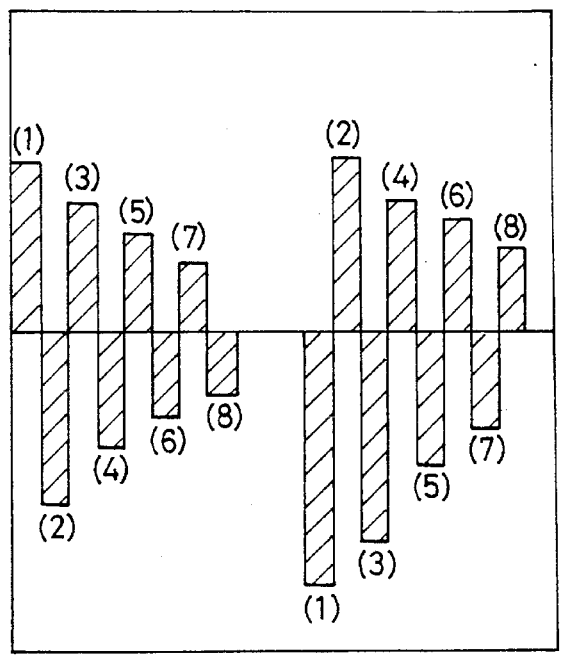
FIGS. 11a and 11b are views for explaining a general line inverting system and a general frame inverting system.
Figure 11B:
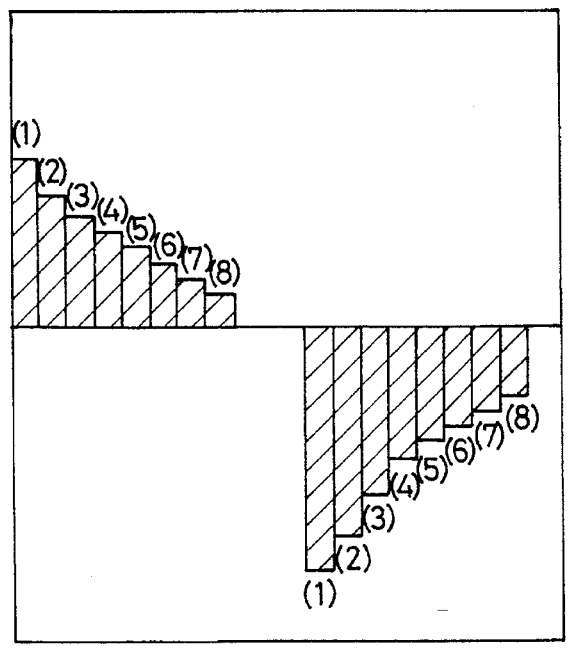
Figure 12:
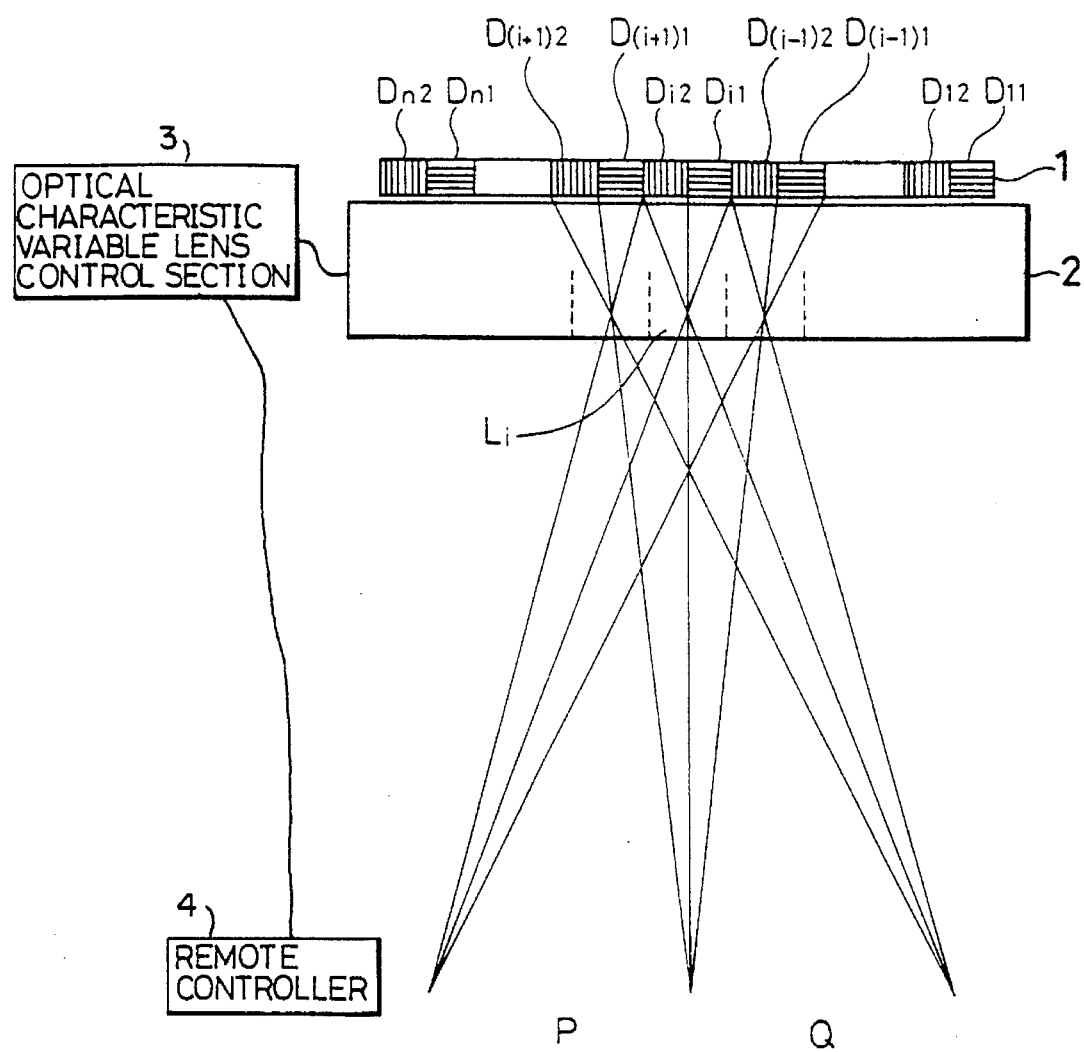
FIG. 12 is a cross-sectional view showing the basic structure of a three-dimensional display unit in accordance with one embodiment of the present invention.

FIG. 12 is a cross-sectional view showing the basic structure of a three-dimensional display unit in accordance with a first embodiment of the present invention.

The three-dimensional display unit shown in FIG. 12 is of a two-eye type and is of a direct viewing type in which an optical characteristic variable lens is arranged on the front face of a flat display panel. The three-dimensional display unit is constructed such that a regenerating space of a stereoscopic image can be electrically controlled.

The three-dimensional display unit shown in FIG. 12 is constructed by a liquid crystal panel 1 as a display means, an optical characteristic variable lens 2 as an optical means, an optical characteristic variable lens control section 3 and a remote controller 4. The optical characteristic variable lens 2 is arranged such that the optical characteristic variable lens 2 is closely attached to the liquid crystal panel 1. The optical characteristic variable lens control section 3 is connected to the optical characteristic variable lens 2. The remote controller 4 is connected to the optical characteristic variable lens control section 3. In the real three-dimensional display unit, an illuminating light source for a display is arranged on a rear face of the liquid crystal panel 1, but is omitted in FIG. 12.

A color liquid crystal panel is normally used as the liquid crystal panel 1. In this case, an array of color filters in the liquid crystal panel is set such that red, green and blue (RGB) are arranged in a vertical direction (up-and-down direction) on the screen so as not to separate color images from each other by a lens action.

In the liquid crystal panel 1, two different parallax images are displayed in a stripe shape every other pixel. One portion of a parallax image (for a left-hand eye) corresponding to a left-hand eye is displayed in a pixel $D_{i1}$ of the liquid crystal panel 1 and one portion of a parallax image (for a right-hand eye) corresponding to a right-hand eye is displayed in a pixel $D_{i2}$ of the liquid crystal panel 1. Index i is set to a value from 1 to n.

In the first embodiment shown in FIG. 12, the liquid crystal panel is used as an image display panel. However, the three-dimensional display unit can be constructed by using an electroluminescence (EL) panel, a plasma display, a flat panel display of a light emitting diode (LED) array, etc. In this case, it is not necessary to arrange an illuminating light source for a display.

The optical characteristic variable lens 2 is a lens having the same converging action as a lenticular lens. Optical characteristics of the optical characteristic variable lens 2 can be electrically controlled. The optical characteristic variable lens 2 is constructed by an array of cylindrical lenses $L_i$. A cross section of a cylindrical lens $L_i$ is shown in FIG. 12 and a longitudinal direction of the cylindrical lens $L_i$ is in conformity with a direction perpendicular to a paper face. The longitudinal direction of the cylindrical lens $L_i$ is set such that this longitudinal direction is in conformity with an array direction of pixels displaying the same parallax images in the liquid crystal panel 1. The optical characteristic variable lens 2 will be described later in detail.

The cylindrical lens $L_i$ within the optical characteristic variable lens 2 corresponds to a pair of pixels $D_{i1}$ and $D_{i2}$ within the liquid crystal panel 1. The cylindrical lens $L_i$ is arranged such that the cylindrical lens $L_i$ is closely attached to the pixels $D_{i1}$ and $D_{i2}$. Light is transmitted through the pixels $D_{i1}$ and $D_{i2}$ and is separated into light portions by a converging operation of the cylindrical lens $L_i$. These light portions are projected into display spaces P and Q in an observation region. Light is similarly separated and projected with respect to all the pixels from 1 to n. Thus, the display space P for projecting the parallax image for the left-hand eye and the display space Q for projecting the parallax image for the right-hand eye are formed. An observer can observe a stereoscopic image when the left-hand and right-hand eyes are respectively located in the display spaces P and Q. Positions of the display spaces P and Q can be controlled by changing the relation in relative position between the pixels $D_{i1}$, $D_{i2}$ and the cylindrical lens $L_i$.

FIG. 13 shows one constructional example of the above optical characteristic variable lens.

In FIG. 13, a transparent entire face electrode 23 is formed on a glass substrate 24. The entire face electrode 23 is constructed by a transparent film made of indium tin oxide (ITO), etc.

A transparent object 20 having high flexibility is laminated and formed on the entire face electrode 23. When the transparent object 20 is fluidized, a transparent film 21 is formed on the transparent object 20 such that no transparent object 20 flows out of the entire face electrode 23. The transparent film 21 is thin and flexible. For example, the transparent object 20 is constructed by using silicon rubber or oil.

Many strip-shaped electrodes 22 are arranged between the transparent object 20 and the transparent film 21. FIG. 13 shows a cross section of each of the strip-shaped electrodes Each of the strip-shaped electrodes 22 longitudinally extends in a direction perpendicular to a paper face. Each of the strip-shaped electrodes 22 is also formed by a transparent film made of ITO, etc. Each of the strip-shaped electrodes 22 is connected to an unillustrated driving circuit. The entire face electrode 23 is also connected to the driving circuit.

A surface of the transparent object 20 is initially set to be planar. A voltage is partially applied to the strip-shaped electrodes 22 so that the surface of the transparent object 20 or a surface of the transparent film 21 is formed in convex and concave shapes by electrostatic force applied between the entire face electrode 25 and the strip-shaped electrodes 22. Namely, a voltage having a polarity inverse to the polarity of a voltage applied to the entire face electrode 23 is applied to strip-shaped electrodes 22b spaced from each other at a constant distance. Then, a voltage having the same polarity as the voltage applied to the entire face electrode 23 is applied to a strip-shaped electrode 22a located in an intermediate position of this constant distance. Electrostatic attractive force is applied between one strip-shaped electrode 22b and the entire face electrode 23 so that a distance between the strip-shaped electrode 22b and the entire face electrode 23 is reduced. Conversely, electrostatic repulsive force is applied between the strip-shaped electrode 22a and the entire face electrode 23 so that a distance between the strip-shaped electrode 22a and the entire face electrode 23 is increased. The flexible transparent object 20 is deformed by changes in these distances. Thus, a cylindrical face is periodically formed in the optical characteristic variable lens so that a lenticular lens is constructed.

Convex and concave portions (or irregularities) of the cylindrical face required for the lenticular lens are set to about 1 mm in length. When the transparent object 20 is deformed at a low voltage, it is effective to increase the strength of an electric field caused between one strip-shaped electrode 22 and the entire face electrode 25. The distance between the strip-shaped electrode 22 and the entire face electrode 23 is preferably set to about 1.5 mm in an initial planar state. It is necessary to set an entire thickness of the optical characteristic variable lens to a certain thickness to form the lenticular lens, but this thickness is adjusted by a thickness of the glass substrate 24.

No strip-shaped electrode 22 applying a voltage thereto is limited to the strip-shaped electrodes 22a and 22b. A voltage may be applied in a certain voltage pattern to a series of strip-shaped electrodes 22.

Figure 19:
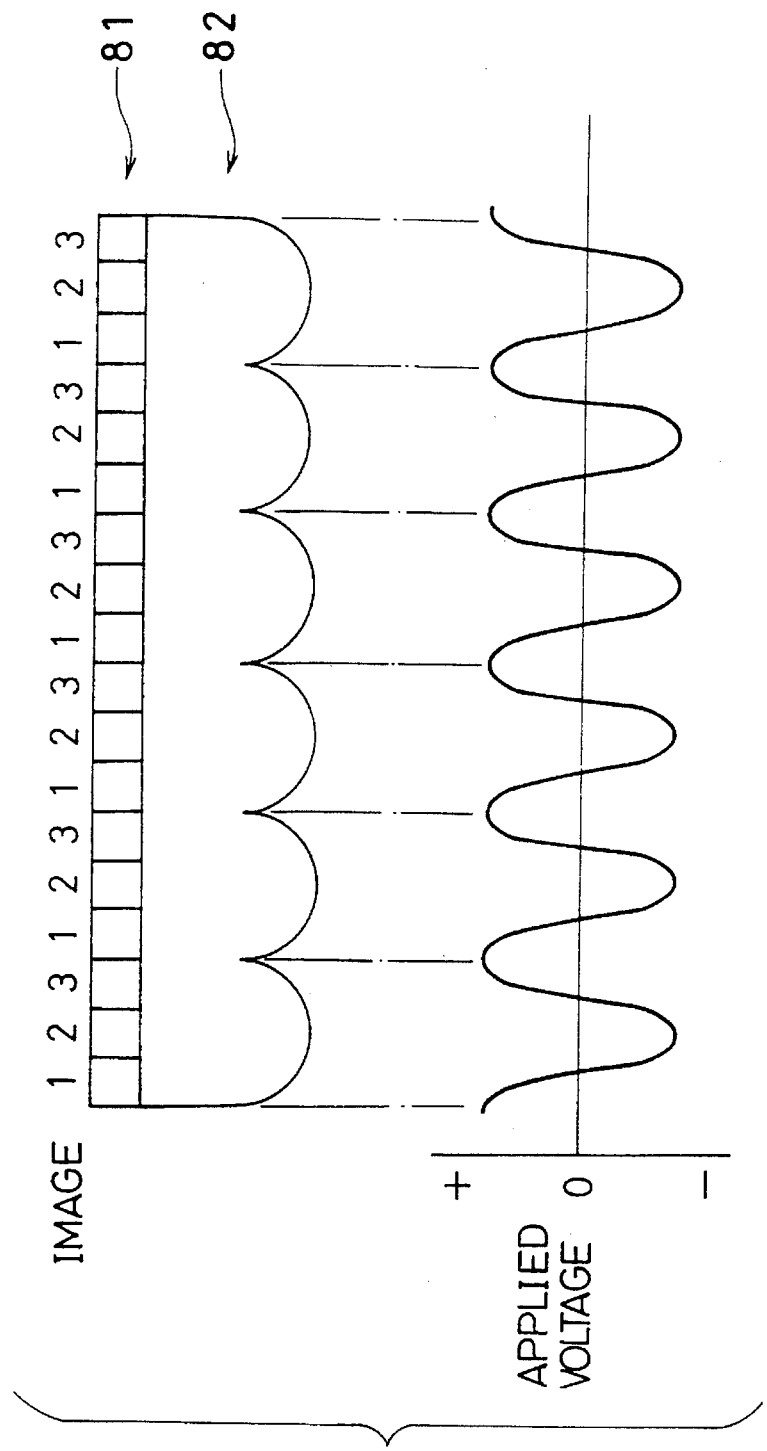
FIG. 19 is an explanatory view showing one correspondence between a change in parallax image number and control of the optical characteristic variable lens.

A shape, curvature and a thickness of the cylindrical face are controlled by a pattern shape of the voltage applied to the strip-shaped electrode 22. A period of the cylindrical face is controlled by a pattern period of the voltage applied to the strip-shaped electrode 22. A forming position of the cylindrical face is controlled by shifting the pattern of the voltage applied to the strip-shaped electrode 22. Thus, the shape and position of the cylindrical face formed on the surface of the transparent object 20 or the transparent film 21 can be controlled by the pattern of the voltage applied to the strip-shaped electrode An operation of the optical characteristic variable lens will next be explained with reference to FIGS. 19 and 20 when the number of displayed parallax images is changed. FIG. 19 shows the case of a two-eye type. In the case of the two-eye type, two different parallax images are alternately displayed on a display panel in a stripe shape. Accordingly, a surface shape of the optical characteristic variable lens is formed such that two pixels of the display panel correspond to one cylindrical face of the optical characteristic variable lens. FIG. 19 also shows the pattern of a voltage applied to the strip-shaped electrode at this time in a case in which the entire face electrode has a negative potential.

Figure 20:
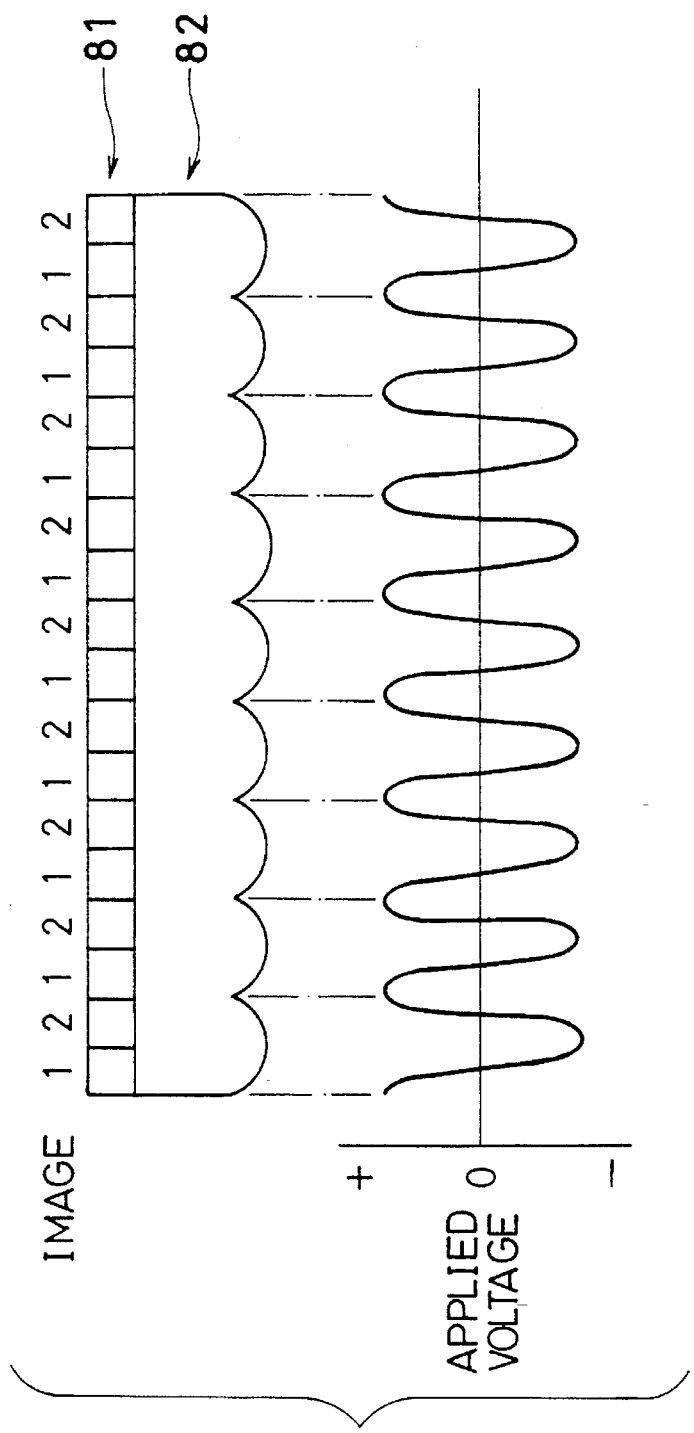
FIG. 20 is an explanatory view showing another correspondence between a change in parallax image number and control of the optical characteristic variable lens.

The two-eye type is changed to a three-eye type as shown in FIG. 20. In the case of the three-eye type, three different parallax images are repeatedly displayed on the display panel in a stripe shape. Accordingly, a surface shape of the optical characteristic variable lens is formed such that three pixels of the display panel correspond to one cylindrical face of the optical characteristic variable lens. FIG. 20 also shows the pattern of a voltage applied to the strip-shaped electrode at this time in a case in which the entire face electrode has a negative potential. Thus, it is possible to cope with a three-dimensional image display corresponding to an arbitrary number of parallax images by changing pitches of concave and convex portions of the surface shape of the optical characteristic variable lens. In FIGS. 19 and 20, in reality, each of the pitches of concave and convex portions of the surface shape of the optical characteristic variable lens is set to be slightly smaller than a pixel pitch of the display panel.

In the general three-dimensional display unit of a lenticular system, an observation position is determined by optical characteristics of the lenticular lens mounted to the three-dimensional display unit so that no observer can positively move the observation position. However, in the three-dimensional display unit in this embodiment, the optical characteristics of the optical characteristic variable lens can be changed by remote control using the remote controller so that the observer can freely set the observation position at his own will. For example, the optical characteristics of the optical characteristic variable lens include a focal length.

When the observation region is moved forward, backward, rightward or leftward in FIG. 12, moving direction and distance of the optical characteristic variable lens are transmitted to the optical characteristic variable lens control section 3 by the remote controller 4. Thus, the optical characteristic variable lens control section 3 calculates the pattern of a voltage applied to the strip-shaped electrode 22 shown in FIG. 13 and changes a shape of the optical characteristic variable lens through the driving circuit. In this embodiment, all control operations of the optical characteristics of the optical characteristic variable lens can be electrically performed so that no mechanical portion is required. The remote controller 4 can be set to a wired controller or a wireless controller using infrared rays, etc.

Figure 14A:
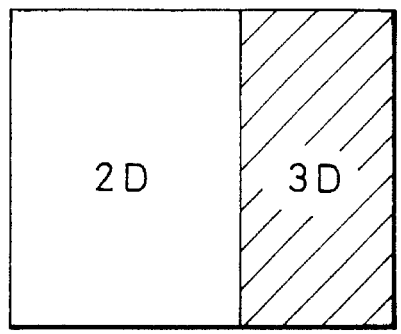
FIGS. 14a to 14c are views for explaining a mixing display of two-dimensional and three-dimensional images.

No convex and concave portions (or irregularities) are formed on a surface of the above optical characteristic variable lens in a region in which no voltage is applied to the optical characteristic variable lens. Accordingly, no lens action is caused in this region. Therefore, a normal two-dimensional image can be displayed in this region in which no voltage is applied to the optical characteristic variable lens. Accordingly, as shown in FIG. 14a, it is possible to display two-dimensional and three-dimensional images in a state in which these images are mixed with each other.

Figure 14B:
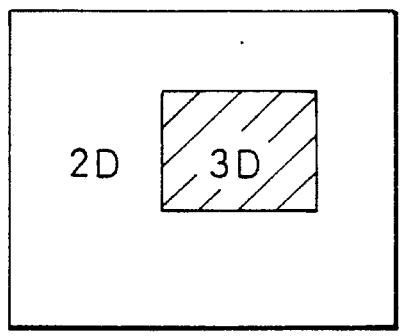
Figure 14C:
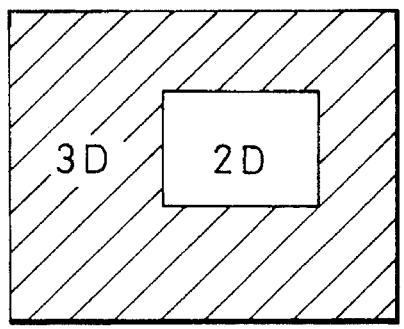

A strip-shaped electrode perpendicular to the strip-shaped electrode 22 can be used instead of the entire face electrode 23 in FIG. 13. In this case, images can be controlled in a vertical direction (up-and-down direction) on the screen. Accordingly, as shown in FIG. 14b, a three-dimensional image can be displayed as a window within a two-dimensional image. Further, as shown in FIG. 14c, a two-dimensional image can be displayed as a window within a three-dimensional image. In this case, it is necessary to scan the strip-shaped electrode at a high speed.

In the above description, the optical characteristic variable lens is used as a lenticular lens having no parallax in the vertical direction. However, when the above-mentioned perpendicular electrode arrangement is used, the optical characteristic variable lens can be used as a fly eye lens (a two-dimensional lens array) having a parallax in the vertical direction.

Figure 15:
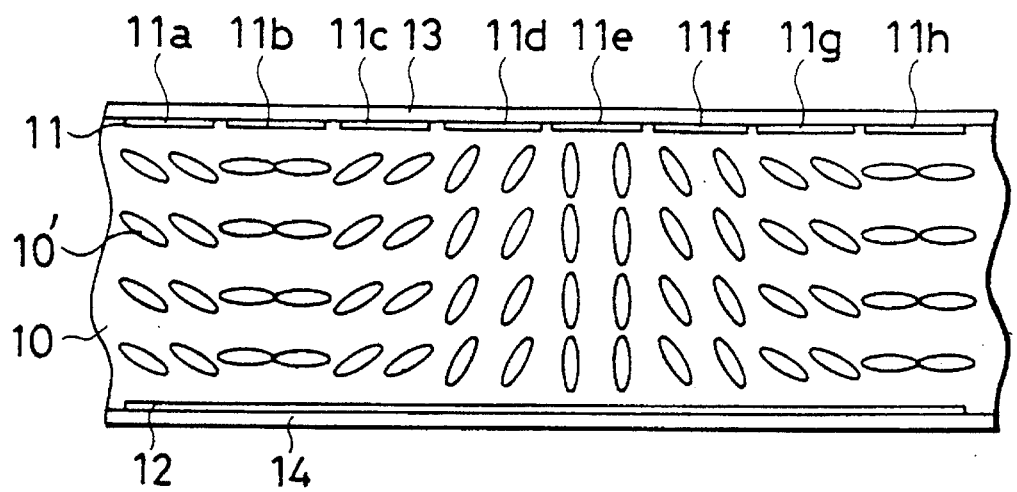
FIG. 15 is an enlarged cross-sectional view showing another constructional example of an optical characteristic variable lens used in the three-dimensional display unit shown in FIG. 12.

FIG. 15 is a cross-sectional view showing the structure of an optical characteristic variable lens in accordance with another embodiment of the present invention. FIG. 15 shows one portion of the optical characteristic variable lens using a liquid crystal.

In FIG. 15, an array 11 of strip-shaped electrodes 11a, 11b, 11c, - - - is formed on a glass substrate 13. An indium tin oxide (ITO) film, etc. in the electrode array 11 are constructed by a transparent film. FIG. 15 shows a cross section of each of the strip-shaped electrodes 11a, 11b, 11c, - - - and each of these strip-shaped electrodes longitudinally extends in a direction perpendicular to a paper face. A transparent entire face electrode 12 is formed on another glass substrate 14. The entire face electrode 12 is also formed by a transparent film made of ITO, etc.

When a liquid crystal panel is used as a display element and a pixel pitch is reduced by narrowing an electrode width, the number of scanning electrodes is increased and an electrode resistance is increased in a case of the same screen size. Accordingly, a response speed of the liquid crystal panel is reduced so that no pixel pitch can be extremely reduced. However, when the optical characteristic variable lens is constructed as shown in FIG. 15, the entire face electrode is formed on one side of the optical characteristic variable lens so that it is not necessary to perform a scanning operation. The optical characteristic variable lens is used in a steady state so that no high response speed is required for the liquid crystal panel in comparison with a case in which the liquid crystal panel is used for a display. Therefore, it is possible to realize a narrow electrode width and a small pixel pitch in comparison with the liquid crystal panel for a display.

Figure 17:
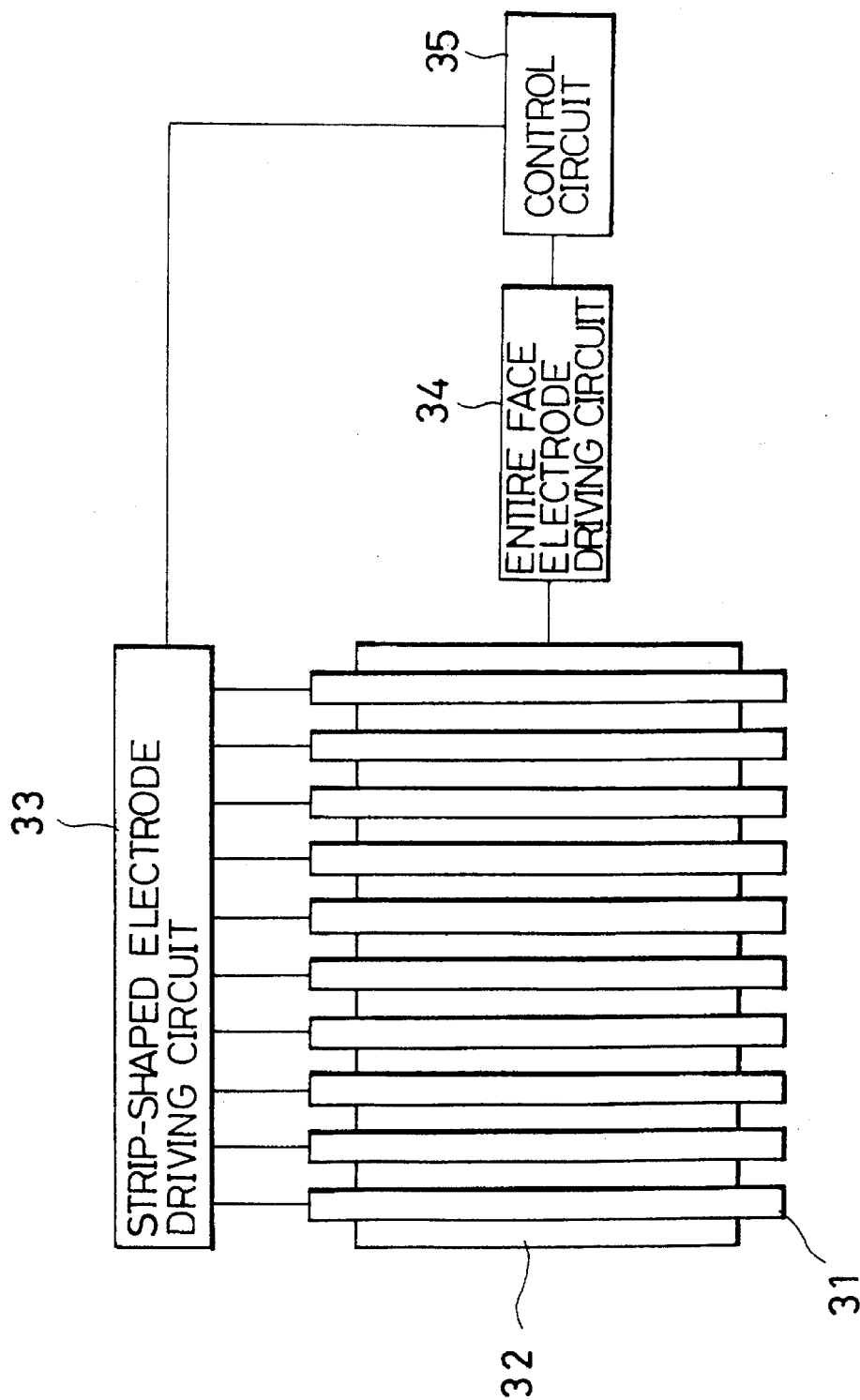
FIG. 17 is an explanatory view showing one electrode arrangement used for the optical characteristic variable lens shown in FIG. 15.

The strip-shaped electrodes 11a, 11b, 11c, - - - and the entire face electrode 12 are respectively connected to a liquid crystal driving circuit as shown in FIG. 17. In FIG. 17, a strip-shaped electrode 31 is connected to a strip-shaped electrode driving circuit 33 and an entire face electrode 32 is connected to an entire face electrode driving circuit 34. Operations of the strip-shaped electrode driving circuit 33 and the entire face electrode driving circuit 34 are controlled such that a desirable voltage is applied to each of the strip-shaped electrode 31 and the entire face electrode 32 by a control circuit 35.

A liquid crystal 10 is sealed between the electrode array 11 and the entire face electrode 12. A liquid crystal molecule 10' of the liquid crystal 10 is orientated in a uniform state in which the liquid crystal molecule is parallel or perpendicular to the glass substrates in an initial state.

A refractive index of the liquid crystal molecule 10' in the direction of a molecular axis is different from that in a direction perpendicular to the molecular axis. Therefore, the liquid crystal molecule 10' shows optical anisotropy. An inclination angle of the liquid crystal molecule 10' with respect to each of the glass substrates 13 and 14 is changed by a voltage applied between the electrode array 11 and the entire face electrode 12 so that the refractive index of an aggregation of liquid crystal molecules 10' is changed. Namely, a refractive index distribution of the optical characteristic variable lens can be controlled by controlling the voltage applied to the liquid crystal.

Figure 16:
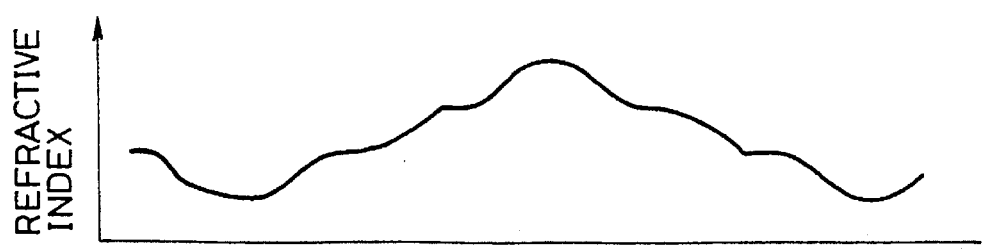
Figure 18:
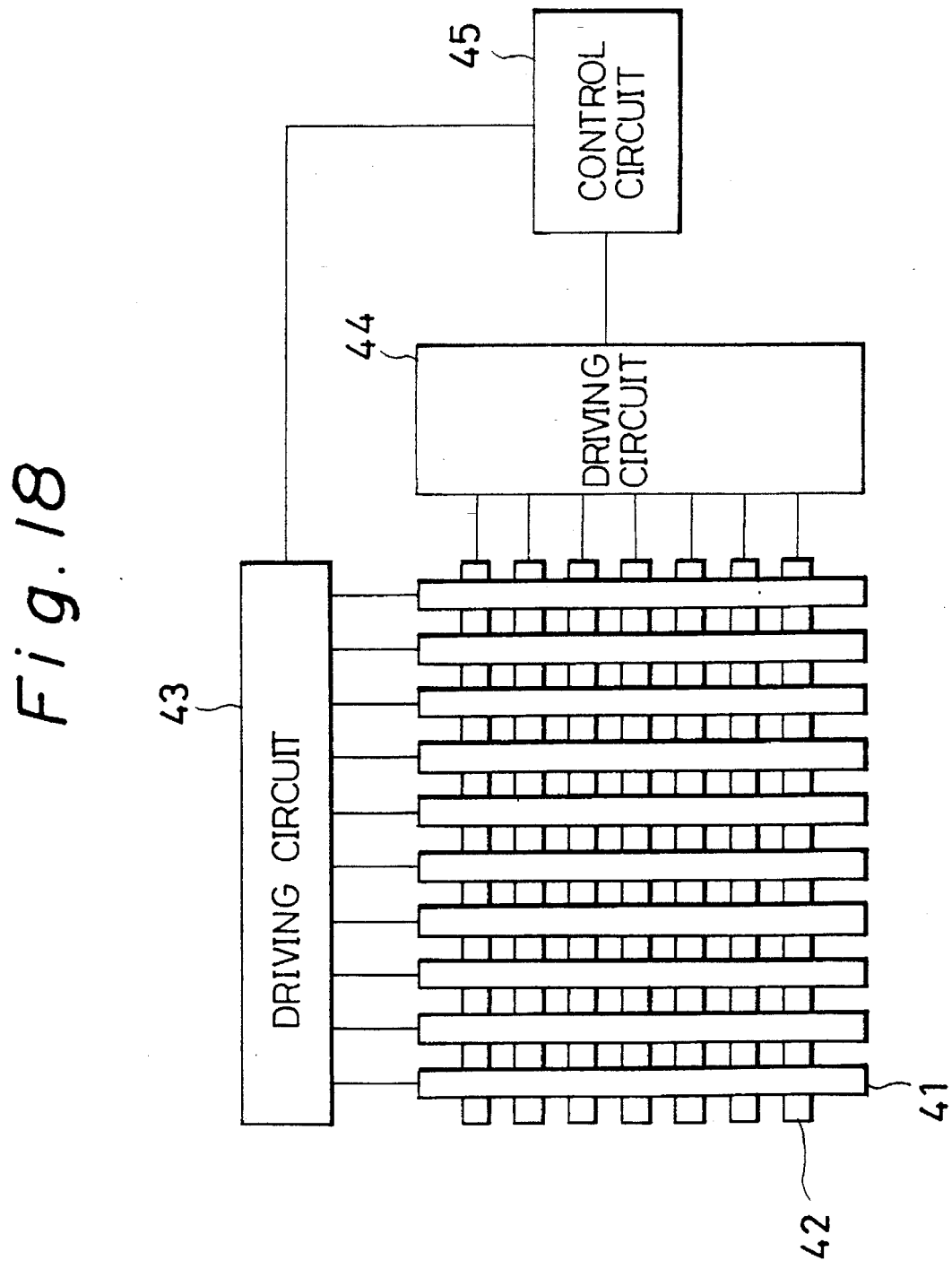
FIG. 18 is an explanatory graph showing a refractive index distribution of the optical characteristic variable lens shown in FIG. 15.

FIG. 19 shows one example of a pattern of the voltage applied to the liquid crystal molecule 10'. For example, the liquid crystal molecule 10' is set to be homogeneously orientated (in a direction parallel to a glass substrate face) in an initial state. In FIG. 18, the applied voltage is sequentially reduced in an order of electrodes 11*d* and 11*f*, electrodes 11*e* and 11*g*, and electrodes 11*b* and 11*h* around an electrode 11*e* as a center. The liquid crystal molecule 10' is orientated in parallel with the glass substrate face in a region for a weak electric field. However, the liquid crystal molecule 10' is orientated in a region for a strong electric field in a state in which the liquid crystal molecule is inclined a certain angle with respect to the glass substrate face. As a result, the refractive index distribution of an aggregation of liquid crystal molecules 10' is changed as shown in FIG. 16 so that converging characteristics similar to those of a cylindrical lens are obtained. At this time, a changing width of the refractive index of the aggregation of liquid crystal molecules 10' is prescribed between maximum and minimum refractive indices peculiar to the liquid crystal molecules 10'. A cylindrical lens array is constructed by repeatedly providing such a pattern of the applied voltage periodically in a horizontal direction.

When the pattern of the voltage applied to the electrode array 11 is changed, it is possible to control a distribution shape of the refractive index of the aggregation of liquid crystal molecules 10', an entire level of the refractive index, and a pitch of the refractive index distribution periodically repeated.

Optical characteristics of one cylindrical lens are prescribed by three items composed of curvature of a cylindrical lens face, a thickness of the cylindrical lens and a lens pitch. In the optical characteristic variable lens shown in FIG. 15, the curvature of the cylindrical lens face corresponds to a distribution shape of the refractive index. The lens thickness corresponds to an entire level of the refractive index. Further, the lens pitch corresponds to a pitch of the refractive index distribution.

In this second embodiment shown in FIG. 15, similar to the above-mentioned first embodiment shown in FIG. 12, it is possible to cope with a three-dimensional image display corresponding to an arbitrary number of parallax images. Further, an observation region can be moved forward, backward, rightward and leftward by a remote controller. In the first embodiment, this three-dimensional image display is provided and the observation region can be moved by changing a surface shape of the optical characteristic variable lens. However, in the second embodiment, this three-dimensional image display is provided and the observation region can be moved by changing a refractive index distribution of the optical characteristic variable lens. In this second embodiment, all control operations of optical characteristics of the optical characteristic variable lens can be electrically performed so that no mechanical portion is required.

When the liquid crystal panel is used as a display element, it is necessary to arrange two polarizing plates so that transmittance of light is considerably reduced. However, no polarizing plates are required in the optical characteristic variable lens in the present invention so that no light amount is reduced.

In the above-mentioned optical characteristic variable lens, no refractive index distribution is generated in a region in which no voltage is applied to the optical characteristic variable lens. Accordingly, no lens action is caused in this region. Therefore, a normal two-dimensional image can be displayed in this region in which no voltage is applied to the optical characteristic variable lens. Accordingly, as shown in FIG. 14*a*, it is possible to display two-dimensional and three-dimensional images in a state in which these images are mixed with each other.

A strip-shaped electrode perpendicular to the electrode array 11 can be used instead of the entire face electrode 12 in FIG. 15. In this case, as shown in FIG. 18, an arranging shape of this strip-shaped electrode is equal to a arranging shape used for a normal liquid crystal panel. In FIG. 18, driving circuits 43 and 44 are respectively connected to two sets of strip-shaped electrode groups 41 and 42 perpendicular to each other. Operations of the driving circuits 43 and 44 are controlled by a control circuit 45 such that a desirable voltage is applied to each of these strip-shaped electrodes. Thus, images can be controlled in a vertical direction (up-and-down direction) on the screen. Accordingly, as shown in FIG. 14*b*, a three-dimensional image can be displayed as a window within a two-dimensional image. Further, as shown in FIG. 14*c*, a two-dimensional image can be displayed as a window within a three-dimensional image. In this case, it is necessary to scan the strip-shaped electrodes at a high speed. However, when the above-mentioned perpendicular electrode arrangement is used, the optical characteristic variable lens can be used as a fly eye lens which also has a parallax in the vertical direction.

In accordance with a first construction of the present invention, a three-dimensional display unit comprises display means for simultaneously displaying a plurality of different parallax images and optical means attached to the display means and constructed by an array of cylindrical lenses. Each of the cylindrical lenses is formed such that a transparent substance having high flexibility is supported by transparent electrodes from both substance sides and optical characteristics of each of the cylindrical lenses can be changed by applying a voltage to the transparent substance to change at least one surface shape of the transparent substance.

Accordingly, no precise mechanical system is required when a space for regenerating a stereoscopic image is moved. The three-dimensional display unit has excellent responsibility and can be made compact. Further, it is possible to cope with an arbitrary three-dimensional image display from a two-eye type to a multiple-eye type by changing a pattern of the applied voltage. An observer can positively move the regenerating space of the stereoscopic image by using a remote controller in an observation distance direction in addition to a horizontal direction. Further, no lens action is provided in a region in which no voltage is applied to the transparent substance. Accordingly, the three-dimensional display unit can be also used as a normal two-dimensional image display unit. Therefore, it is possible to display two-dimensional and three-dimensional images on the same screen in a state in which these images are mixed with each other. The stereoscopic image can be brightly and easily observed since the three-dimensional display unit has no system for reducing a light amount such as a liquid crystal parallax barrier system.

For example, the above optical characteristics include a focal length.

In accordance with a seventh construction of the present invention, a three-dimensional display unit comprises display means for simultaneously displaying a plurality of different parallax images and optical means attached to the display means and constructed by an array of cylindrical lenses. Each of the cylindrical lenses is formed such that a transparent substance having a refractive index changed by a voltage applied to this transparent substance is supported by transparent electrodes from both substance sides and optical characteristics of each of the cylindrical lenses can be changed by applying the voltage to the transparent substance to provide a refractive index distribution for the transparent substance.

Accordingly, a stereoscopic image is displayed by separating parallax images from each other. At this time, a lens action is caused by providing the refractive index distribution instead of a change in shape of the optical means. Therefore, no structural function of the three-dimensional display unit is easily reduced in addition to the above effects of the three-dimensional display unit having the first construction. Further, the optical means has a flat surface so that it is possible to reduce influences of irregular reflection of peripheral light, etc. causing problems at an observation time.

In accordance with an eighth construction of the present invention, the optical means is constructed by a liquid crystal in the three-dimensional display unit. In this case, optical characteristics of the liquid crystal can be greatly changed at a smaller voltage.

In accordance with a ninth construction of the present invention, the optical means acts as a two-dimensional lens array in the three-dimensional display unit. In this case, perpendicular strip-shaped electrode groups are used as the transparent electrodes so that it is possible to display a stereoscopic image having a parallax in a vertical direction in addition to a horizontal direction.

Figure 21:
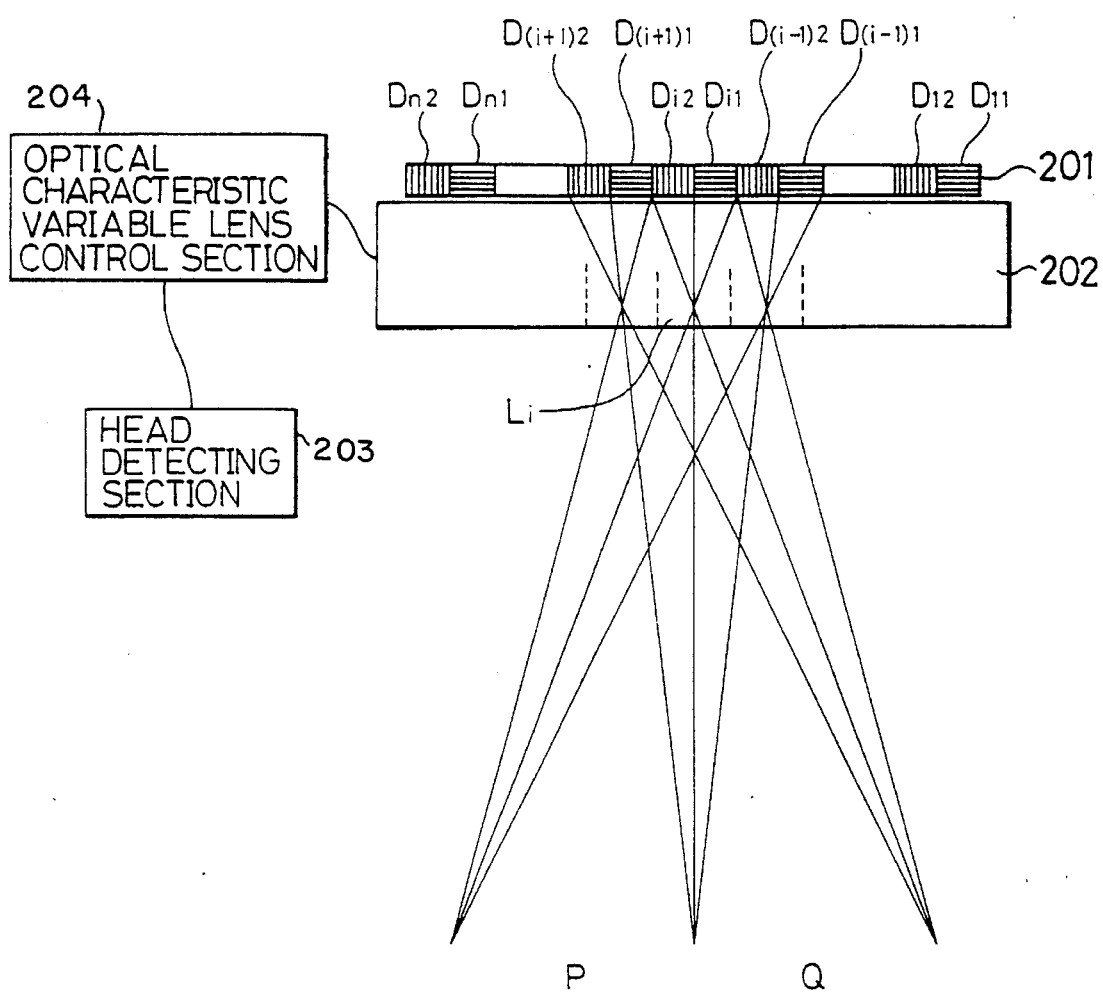
FIG. 21 is a cross-sectional view showing the basic construction of a three-dimensional display unit in accordance with another embodiment of the present invention.

FIG. 21 is a cross-sectional view showing the structure of a three-dimensional display unit in accordance with another embodiment of the present invention.

The three-dimensional display unit in this embodiment is of a two-eye type in which an optical characteristic variable lens is stuck to a flat display panel. The three-dimensional display unit is constructed such that a space for regenerating a stereoscopic image can be electrically controlled.

The three-dimensional display unit shown in FIG. 21 is constructed by a liquid crystal panel 201 as a display means, an optical characteristic variable lens 202 as an optical means, a head detecting section 203 as a detecting means, and an optical characteristic variable lens control section 204 as a control means. The optical characteristic variable lens 202 is arranged such that the optical characteristic variable lens 202 is closely attached to the liquid crystal panel 201. The optical characteristic variable lens control section 204 is connected to the optical characteristic variable lens 202 and the head detecting section 203.

Two different parallax images are displayed in the liquid crystal panel 201 every other pixel. One portion of a parallax image corresponding to a left-hand eye is displayed in a display pixel $D_{i1}$ of the liquid crystal panel 201. One portion of a parallax image corresponding to a right-hand eye is displayed in a display pixel $D_{i2}$ of the liquid crystal panel 201. Index i is set to a value from 1 to n.

These parallax images are similarly displayed on each of scanning lines and one portions of the same parallax image are connected to each other in a longitudinal direction of the liquid crystal panel. When a color liquid crystal panel is used as the liquid crystal panel 201, colors such as red, green and blue as one unit must be arranged in the longitudinal direction. If no colors are arranged in the longitudinal direction, image forming positions of respective color pixels are separated from each other by a lens action so that a shift in color is caused in a regenerated image.

The liquid crystal panel 201 can be replaced with another flat panel display. For example, the flat panel display can be constructed by using an electroluminescence (EL) panel or a plasma display.

The optical characteristic variable lens 202 is a lens having the same converging action as a lenticular lens. Optical characteristics of the optical characteristic variable lens 202 can be electrically controlled. In this embodiment, the optical characteristic variable lens 202 is constructed by an array of cylindrical lenses $L_i$.

FIG. 21 shows a cross section of a cylindrical lens $L_i$. A longitudinal direction of the cylindrical lens $L_i$ is in conformity with a direction perpendicular to a paper face. Further, the longitudinal direction of the cylindrical lens $L_i$ is set to be in conformity with an array direction of pixels in which the same parallax image is displayed in the liquid crystal panel 201. The optical characteristic variable lens 202 will be described later in detail.

The cylindrical lens $L_i$ within the optical characteristic variable lens 202 corresponds to a pair of display pixels $D_{i1}$ and $D_{i2}$ within the liquid crystal panel 201. The cylindrical lens $L_i$ is arranged such that the cylindrical lens is closely attached to these display pixels. Light is transmitted through the display pixels $D_{i1}$ and $D_{i2}$ and is separated into light portions by a converging action of the cylindrical lens $L_i$. These light portions are projected into display spaces P and Q in an observation region. Light is similarly separated and projected with respect to all the display pixels from 1 to n. Thus, the display space P for projecting the parallax image for the left-hand eye and the display space Q for projecting the parallax image for the right-hand eye are formed. An observer can observe a stereoscopic image when the left-hand and right-hand eyes are respectively located in the display spaces P and Q. Positions of the display spaces P and Q can be controlled by changing the relation in relative position between the display pixels $D_{i1}$, $D_{i2}$ and the cylindrical lens $L_i$.

The head detecting section 203 is arranged around the liquid crystal panel 201. The head detecting section 203 detects the spatial position of an observer's head and outputs position information of the observer's head. The following detecting systems are used in the head detecting section 203.

In a first detecting system, infrared ray emitting and receiving elements are used as the head detecting section 203. In this first detecting system, an infrared ray is emitted from the infrared ray emitting element and is reflected on an observer's eye pupil. This reflected infrared ray is received by the infrared ray receiving element. Thus, a position of the observer's eye pupil is detected.

In a second detecting system, an observer's face is photographed by a video camera at any time. An observer's eye pupil is recognized by processing an image of the observer's face so that a spatial position of the observer's eye pupil is detected. In this second detecting system, the head detecting section 203 is constructed by the video camera, an image processing-recognizing device and a position detector.

In a third detecting system, a magnetic field generator is attached to an observer's head. A magnetic field is generated from this magnetic field generator around the observer's head and is detected by using a plurality of magnetic field detectors arranged on a panel side so that a spatial position of the observer's head is detected. In the third detecting system, the head detecting section 203 is constructed by the magnetic field generator, the plural magnetic field detectors, a processor for processing signals from the magnetic field detectors, etc. The magnetic field detectors may be attached to the observer's head and the magnetic field generator may be arranged on the panel side.

Position information of the observer's head detected by the head detecting section 203 is transmitted to the optical characteristic variable lens control section 204.

The optical characteristic variable lens control section 204 controls a refractive index and a refractive index distribution of each of cylindrical lenses within the optical characteristic variable lens 202 on the basis of the head position information obtained by the head detecting section 203. Thus, an emitting direction of light emitted from each of the cylindrical lenses is changed so that the position of a space for regenerating a stereoscopic image is controlled.

FIG. 15 explained above shows one constructional example of the above optical characteristic variable lens. FIG. 16 shows the refractive index distribution of an aggregation of liquid crystal molecules 10'.

The relation between optical characteristics of a cylindrical lens and the regenerating position of a stereoscopic image will next be explained with reference to FIGS. 22 to 25.

Figure 22:
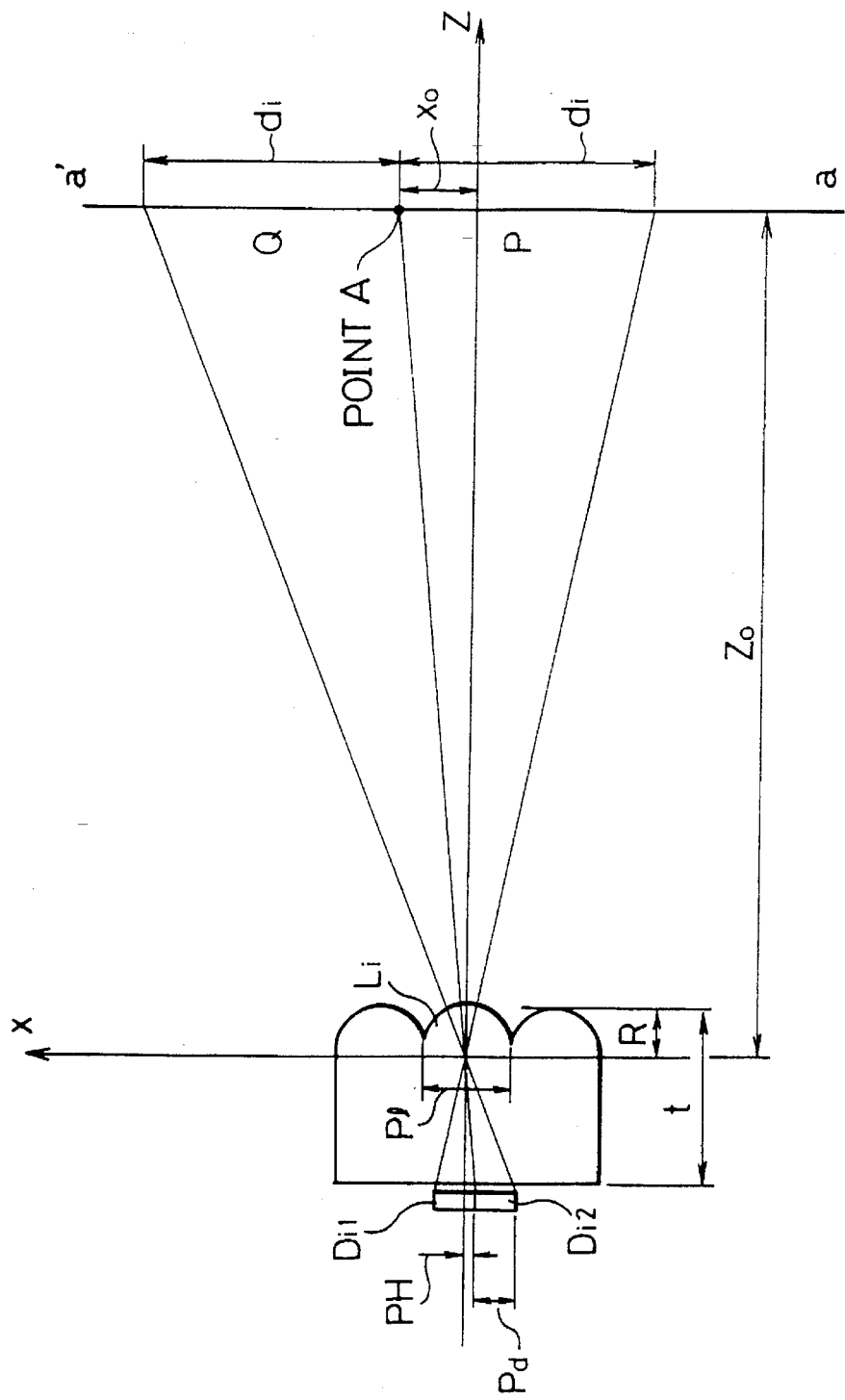
FIG. 22 is a view for explaining each of variables showing optical characteristics of a cylindrical lens used in the three-dimensional display unit shown in FIG. 21.

FIG. 22 shows variables for determining the optical characteristics of the cylindrical lens. The cylindrical lens $L_i$ corresponds to central pixels $D_{i1}$ and $D_{i2}$ of a liquid crystal panel. FIG. 15 shows a cross section of this cylindrical lens $L_i$. The cylindrical lens $L_i$ has a cylindrical face and a curvature center of this cylindrical lens is set to an origin. A longitudinal direction of the cylindrical face is set to a Y-axis. An arranging direction of the cylindrical lens perpendicular to the Y-axis is set to an X-axis. A Z-axis is perpendicular to the X-axis and the Y-axis and is set to an axis extending in an observing direction.

In the following description, reference numerals R and t respectively designate a curvature radius of the cylindrical lens face and a thickness of the cylindrical lens. Reference numerals P1 and n respectively designate a pitch of the cylindrical lens face and a refractive index of the cylindrical lens. Further, reference numeral Pd designates a width of each of display pixels $D_{i1}$ and $D_{i2}$ in the X-axis direction. Reference numeral PH designates a shift in the X-axis direction between a middle point of the display pixels $D_{i1}$ and $D_{i2}$ and a central axis of the cylindrical lens $L_i$ as the Z-axis. Further, reference numeral D designates a display pixel of the liquid crystal panel in the X-axis direction.

An a–a' plane is set to a plane parallel to an X-Y plane in an observation region and separated by a distance $z_0$ from the X-Y plane. Reference numeral $d_i$ designates a width of each of images P and Q projected onto the a–a' plane in the X-axis direction. Reference numeral $x_0$ designates a distance between the Z-axis and a middle point A of the projected images P and Q. The width $d_i$ of each of the projected images is preferably set to be equal to or wider than an average distance (about 65 mm) between eye pupils of a man. However, when this width is set to an excessively large value, light is dispersed so that the projected images are darkened.

If an operation of the three-dimensional display unit is controlled such that the point A is in conformity with a middle point of the left-hand and right-hand eyes of an observer, the observer can see a stereoscopic image even when the observer moves his head in a certain moving range. Spatial positions $(x_0, z_0)$ at the point A can be controlled by adjusting the above variables t, R, Pl and PH prescribing the optical characteristics of the cylindrical lens. Pd, D, n and $d_i$ are set to fixed values in advance.

Figure 23:
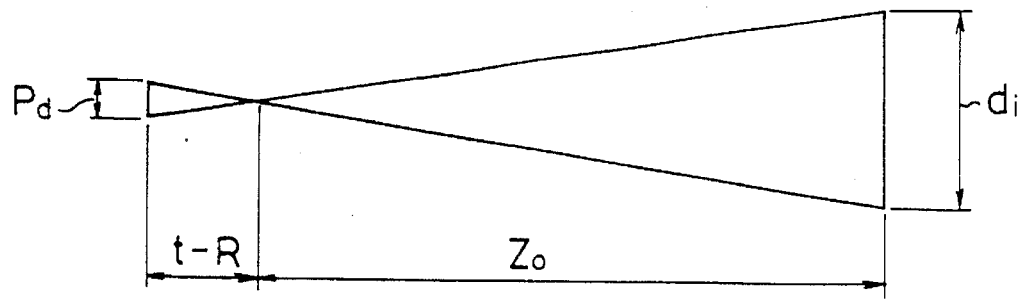
FIG. 23 is an explanatory view showing the relation between a display pixel and a projected image in the three-dimensional display unit shown in FIG. 21.

FIG. 23 shows the relation of an image projected from one display pixel onto the a–a' plane. This image shows a simple similar figure and satisfies the following formula (1).

$$Pd/di=(t-R)/z_0 \tag{1}$$

In contrast to this, a lenticular lens is suitably focused on a liquid crystal display face. A focusing condition of this lenticular lens is satisfied by the following formula (2).

$$1/t=(n-1)/n \cdot R \tag{2}$$

The lens thickness t and the curvature radius R of the cylindrical face can be calculated as follows from the above formulas (1) and (2).

$$t=(n \cdot z_0 \cdot Pd)/di \tag{3}$$

$$R=\{(n-1) \cdot z_0 \cdot Pd\}/di \tag{4}$$

In this case, t and R are calculated on the basis of the distance $z_0$ detected by the head position detecting section.

Figure 24:
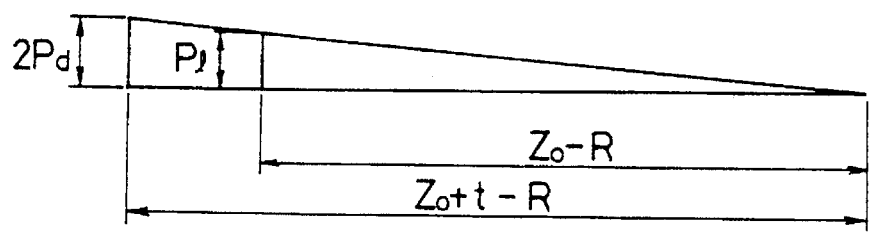
FIG. 24 is an explanatory view showing the relation between a pitch of the display pixel and the pitch of a lenticular lens in the three-dimensional display unit shown in FIG. 21.

FIG. 24 shows the relation between the lens pitch P1 and a width 2Pd of two display pixels since the two-eye type is used. This lens pitch P1 is set such that light transmitted through each of the display pixels is concentrated to a regenerating space P or Q. P1/2Pd is provided as follows.

$$P1/2Pd=(z_0-R)/(z_0+t-R) \tag{5}$$

In this formula (5), P1 is calculated as follows from the above formulas (1) and (3) to (5).

$$P1 =2Pd \cdot (di-(n-1) \cdot Pd)/(di+Pd) \tag{6}$$

Figure 25:
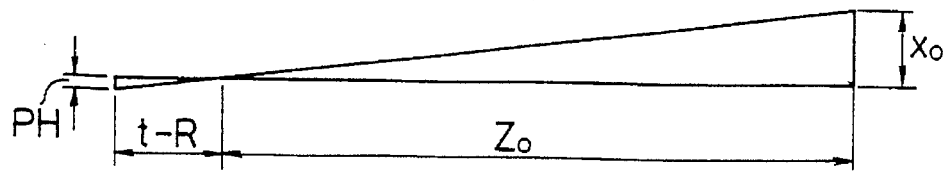
FIG. 25 is an explanatory view showing the relation between a position of the projected image and a shifting amount of a relative position of the display pixel and the lenticular lens in the three-dimensional display unit shown in FIG.

FIG. 25 shows the relation between the position $x_0$ of a projected image and the shifting amount PH of a relative position of a display pixel and the lenticular lens. This relation is provided to control a spatial position at the central point A of a projected pattern. PH/$x_0$ is provided as follows.

$$PH/x_0=(t-R)/z_0 \tag{7}$$

PH is represented by the following formula (8) from the above formulas (1) and (7).

$$PH=(x_0 \cdot pd)/di \tag{8}$$

Thus, the spatial position of the projected pattern at the point A can be controlled if the curvature radius R of the cylindrical lens face, the lens thickness t, the lens pitch P1, the relative shift PH of the display pixel and the cylindrical lens at a central point of the liquid crystal panel are controlled. The variables R, t, P1 and PH are calculated from the preset known width Pd of the display pixel of the liquid crystal panel, the width $d_i$ of each of the projected images P and Q projected onto the a–a' plane separated by the distance $z_0$ from the X-Y plane, the refractive index n of the cylindrical lens, and the positions $(x_0, z_0)$ of the observer's head calculated by the head position detecting section.

In the optical characteristic variable lens shown in FIG. 15, the curvature radius R of the cylindrical lens face corresponds to the shape of a refractive index distribution and is controlled by the pattern shape of a voltage applied to the electrode array 11. The lens thickness t corresponds to an entire level of the refractive index distribution and is controlled by using an entire pattern level of the voltage applied to the electrode array 11. The lens pitch P1 corresponds to a periodically changing pitch of the refractive index distribution and is controlled by using a pattern pitch of the voltage applied to the electrode array 11. The relative shift PH of the display pixel and the cylindrical lens at the central point of the liquid crystal panel corresponds to a periodically changing phase of the refractive index distribution and can be controlled by shifting the pattern of the voltage applied to the electrode array 11.

In this embodiment, all control operations of the optical characteristics of the cylindrical lens can be electrically performed so that no mechanical portion is required.

In the above-mentioned embodiment, the regenerating position of a stereoscopic image is controlled in conformity with an observer's position so that the stereoscopic image is observed in a wide range. However, only two different parallax images are displayed in the liquid crystal panel. Accordingly, no observed stereoscopic image is moved even when the observer moves. Namely, in this embodiment, the observation region is enlarged in the three-dimensional display unit of the two-eye type.

When the observer's head is moved, it is natural to move the observed stereoscopic image. Namely, it is desirable to provide a three-dimensional display unit of a multiple-eye type having a plurality of stereoscopic images. An embodiment corresponding to the multiple-eye type will next be explained.

Figure 28:
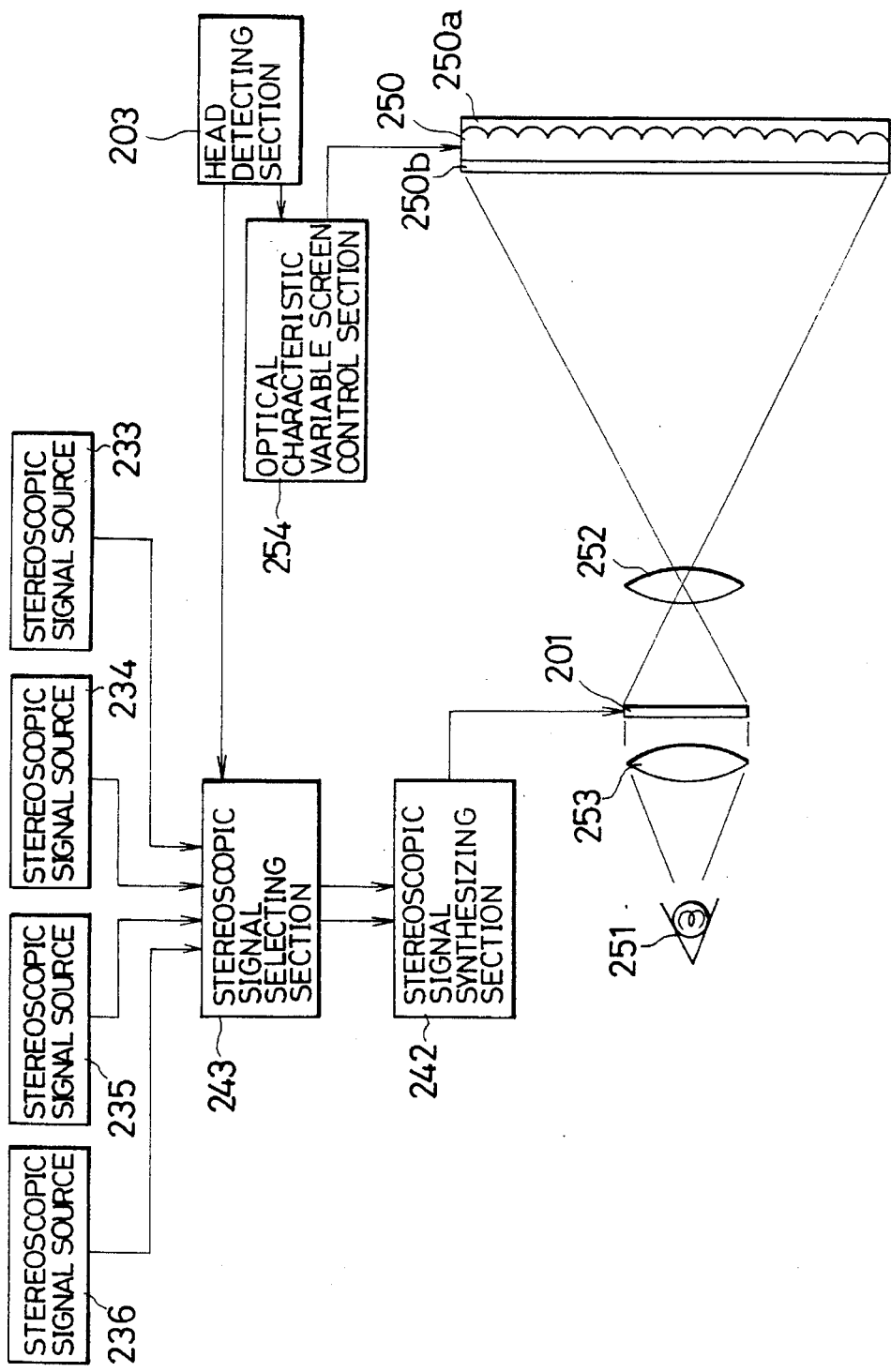
FIG. 28 is a cross-sectional view showing the basic structure of a three-dimensional display unit of a projecting type.

FIG. 28 shows the construction of a three-dimensional display unit in accordance with another embodiment of the present invention.

Figure 26:
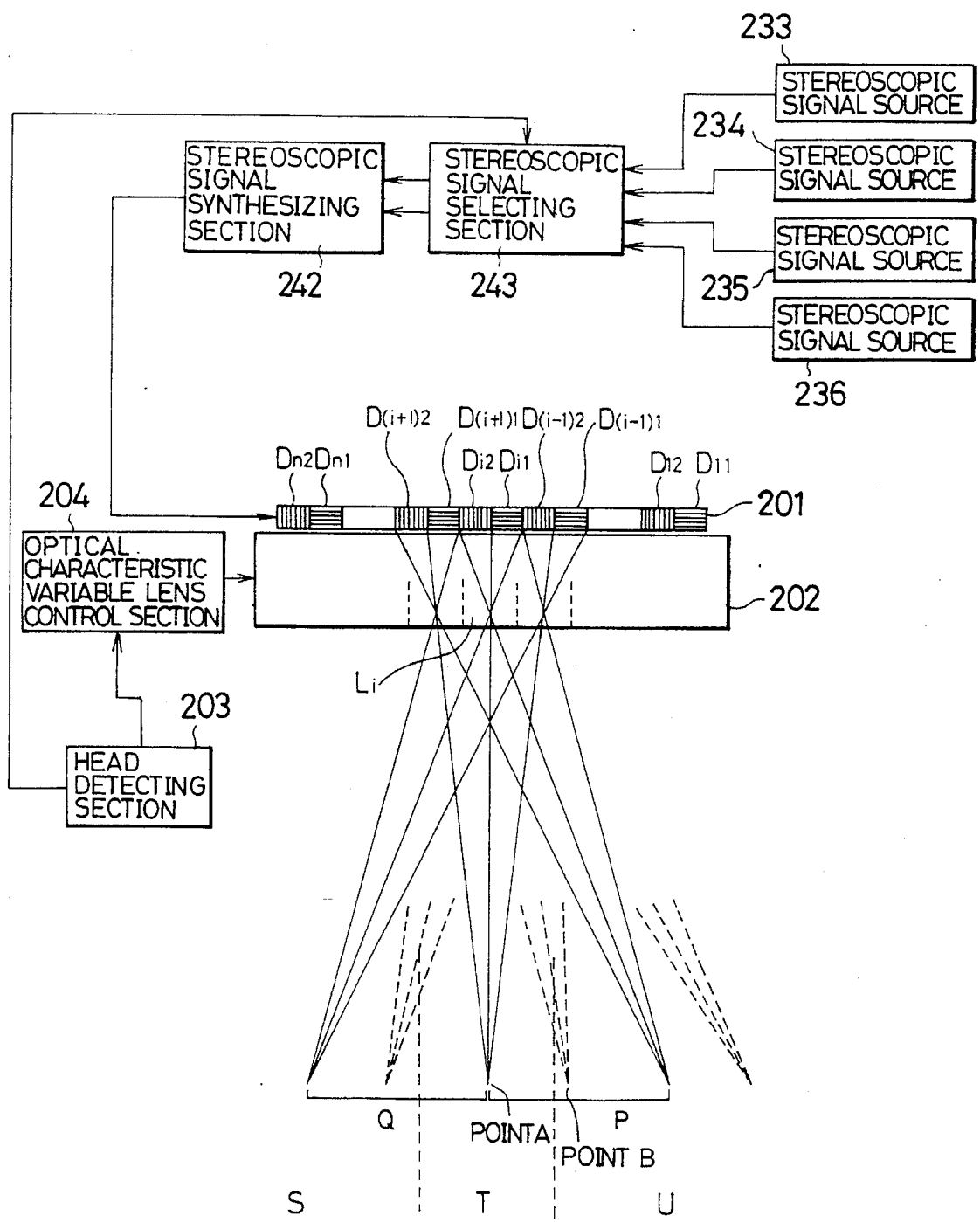
FIG. 26 is a cross-sectional view showing the basic structure of a three-dimensional display unit in accordance with another embodiment of the present invention.

The three-dimensional display unit shown in FIG. 26 is of a direct viewing type in which a lenticular lens is arranged on the front face of a liquid crystal panel. FIG. 26 particularly shows the case of a four-eye type display.

The three-dimensional display unit shown in FIG. 26 is constructed by a liquid crystal panel 201 as a display means, an optical characteristic variable lens 202 as an optical means, a head detecting section 203 as a detecting means, and an optical characteristic variable lens control section 204 as a control means. The three-dimensional display unit shown in FIG. 26 is also constructed by a stereoscopic signal synthesizing section 242, a stereoscopic signal selecting section 243 as a selecting means, and stereoscopic signal sources 233 to 236. The optical characteristic variable lens 202 is arranged such that the optical characteristic variable lens 202 is closely attached onto a front face of the liquid crystal panel 201. The optical characteristic variable lens control section 204 is connected to the optical characteristic variable lens 202 and the head detecting section 203. The stereoscopic signal synthesizing section 242 is connected to the liquid crystal panel 201. The stereoscopic signal selecting section 243 is connected to the stereoscopic signal synthesizing section 242. The stereoscopic signal sources 233 to 236 are connected to the stereoscopic signal selecting section 243.

In the three-dimensional display unit shown in FIG. 26, the optical characteristic variable lens 202 is stuck to the front face of the liquid crystal panel 201. In the Peal three-dimensional display unit, an illuminating light source for a display is arranged on a rear face of the liquid crystal panel 201, but is omitted in FIG. 26.

In the embodiment shown in FIG. 26, the liquid crystal panel is used as an image display panel. However, the three-dimensional display unit can be constructed by using an electroluminescence (EL) panel, a plasma display, a flat panel display of a light emitting diode (LED) array, etc. In this case, no illuminating light source for a display is required.

A color liquid crystal panel is normally used as the liquid crystal panel 201. At this time, an arranging direction of a color filter in the liquid crystal panel is set to be equal to a longitudinal direction (vertical direction) of the lenticular lens so as not to separate color images from each other by a lens action.

The optical characteristic variable lens 202 is constructed by an array of cylindrical lenses. The optical characteristic variable lens 202 shown in FIG. 26 shows a cross section of an array of elongated cylindrical lenses extending in a direction perpendicular to a paper face.

In the embodiment shown in FIG. 26, the three-dimensional display unit is of a four-eye type in which four different parallax images can be displayed. However, two different parallax images are simultaneously displayed in this four-eye type. Accordingly, the optical characteristic variable lens 202 used in this embodiment is equal to that used in the three-dimensional display unit of the normal two-eye type. Namely, a cylindrical lens $L_i$ within the optical characteristic variable lens 202 is arranged such that this cylindrical lens corresponds to a pair of display pixels $D_{i1}$ and $D_{i2}$. Index i is set to a value from 1 to n. Light is transmitted through the display pixels $D_{i1}$ and $D_{i2}$ and is separated into light portions in display spaces P and Q in an observation region by a converging operation of the cylindrical lens $L_i$. When a parallax image for a left-hand eye is displayed in the pixel $D_{i1}$ and a parallax image for a right-hand eye is displayed in the pixel $D_{i2}$, an observer can observe a stereoscopic image when the left-hand and right-hand eyes are respectively located in the display spaces P and Q.

In FIG. 26, the cylindrical lens $L_i$ has the same shape. However, a pitch of the pair of pixels $D_{i1}$ and $D_{i2}$ is different from a pitch of the cylindrical lens $L_i$. The pitch of the cylindrical lens is set to be slightly smaller than the pitch of the pair of pixels $D_{i1}$ and $D_{i2}$. Accordingly, a center of the pixel pair is shifted from that of the corresponding cylindrical lens in a peripheral portion of the liquid crystal panel. An amount of this shift is increased as this shift is caused in the peripheral portion of the liquid crystal panel. Incident angles of the transmitted light incident to the cylindrical lens from the respective pixels are different from each other by this shift in central and peripheral portions of the liquid crystal panel 201. Accordingly, the transmitted light from pixels in the peripheral portion of the liquid crystal panel 201 can be converged into the specified spaces P and Q in the observation region.

Figure 27:
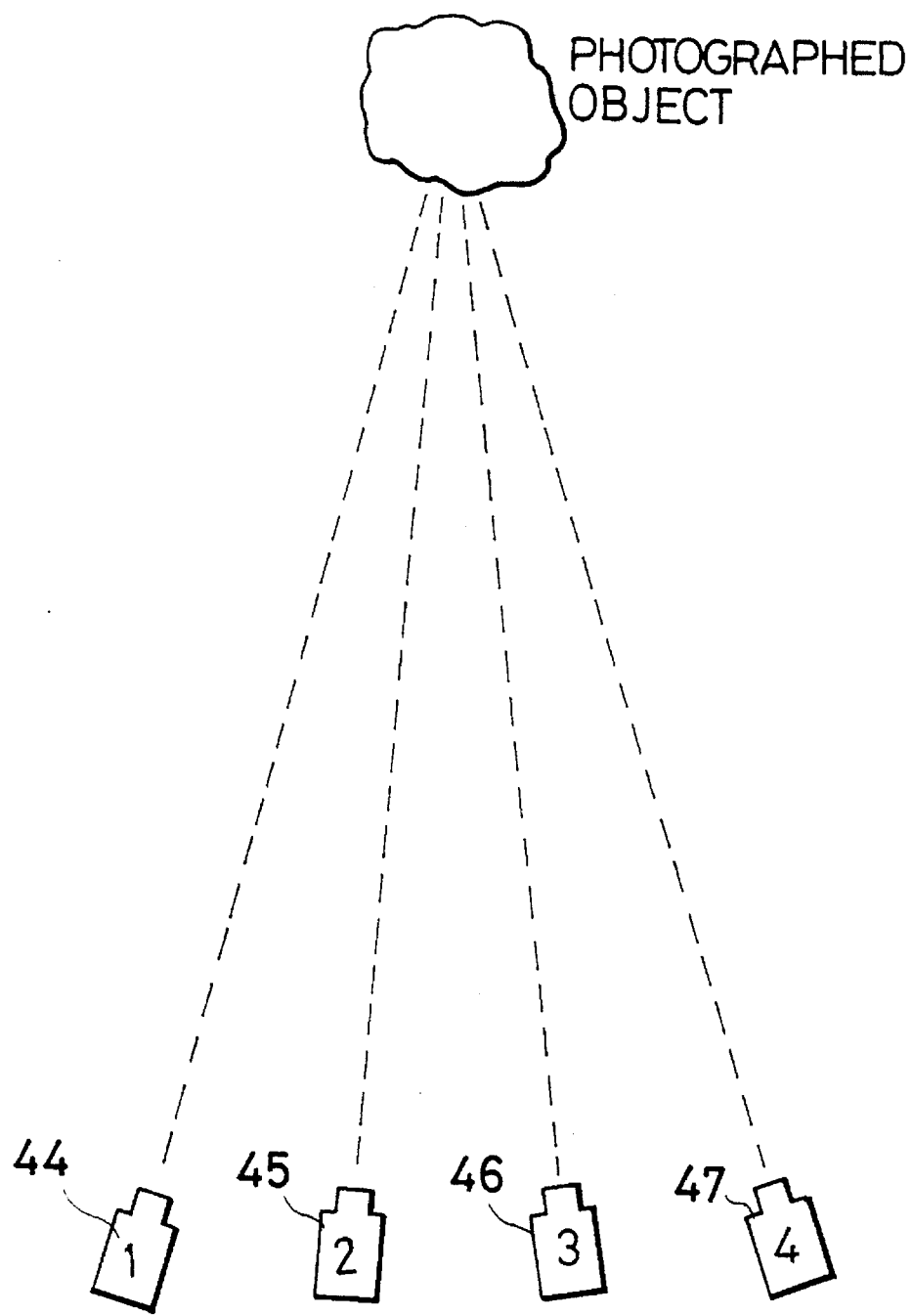
FIG. 27 is a view for schematically explaining one example of a photographing system used in the three-dimensional display unit shown in FIG. 26.

A means for obtaining parallax images displayed in the liquid crystal panel 201 may be constructed by a photographing system shown in FIG. 27. In this photographing system, for example, four video cameras are spaced from each other at a constant interval such that a central axis of each of the video cameras is directed to a photographed object. Thus, four different images are obtained. An image obtained by a camera 244 is set to an image 1 and is used for the stereoscopic signal source 233 shown in FIG. 26. Similarly, an image 2 obtained by a camera 245 is used for the stereoscopic signal source 234. An image 3 obtained by a camera 246 is used for the stereoscopic signal source 235. An image 4 obtained by a camera 247 is used for the stereoscopic signal source 236. A stereoscopic image can be observed when the image of a left-hand side camera is observed by a left-hand eye and the image of a right-hand side camera is observed by a right-hand eye with respect to two adjacent images of the above four images. In the four-eye type in this embodiment, it is possible to observe stereoscopic images in three different directions. The three different stereoscopic images are observed by respectively seeing the images 1 and 2, the images 2 and 3, and the images 3 and 4 by the left-hand and right-hand eyes. Computer graphics may be used as a means for generating four different images. Each of the stereoscopic signal sources may be operated in real time and stereoscopic signals of the stereoscopic signal sources may be recorded to a signal storing system such as an optical disk.

The head detecting section 203 is a device for detecting an observer's head, especially, a spatial position at a middle point of both eyes. There are some systems for detecting the observer's head. In a first detecting system, the head detecting section has an infrared ray emitting element and a near infrared ray is irradiated to the observer's head. A position of the observer's head is detected by measuring an intensity of the near infrared ray reflected on the observer's head.

In a second detecting system, the observer is photographed by a video camera or a charge coupled device (CCD) camera at any time. Eye pupils of the observer are recognized by image processing so that a spatial position of each of these eye pupils is detected. In this case, the head detecting section includes the video camera, an image processing-recognizing device and a position detector.

In a third detecting system, a magnetic field generator is attached to the observer's head and a spatial position of the magnetic field generator is detected by using a plurality of magnetic field detectors. In this case, the head detecting section includes the magnetic field generator, the plural magnetic field detectors, a processor fop processing signals from the magnetic field detectors, etc. In this third detecting system, the magnetic field detectors may be attached to the observer's head and the magnetic field generator may be arranged on a panel side.

A mechanical system, systems using supersonic waves and inertial force, etc. may be used as another detecting system.

The next description relates to a technique for controlling the regenerating position of a stereoscopic image in accordance with the observer's head position and changing the regenerated stereoscopic image.

When images are photographed and displayed by the photographing system shown in FIG. 27, an observation region is partitioned in advance by two planes perpendicular to the liquid crystal panel 201. Thus, the observation region is divided into three spaces S, T and U (see FIG. 26) determined by a camera arrangement. The spaces S and T are divided by a plane passing through a principal point of a lens of the camera 245 and perpendicular to the liquid crystal panel. The spaces T and U are divided by a plane passing through a principal point of a lens of the camera 248 and perpendicular to the liquid crystal panel.

Position information detected by the head detecting section 203 at a middle point of both eyes is transmitted to the optical characteristic variable lens control section 204. The optical characteristic variable lens control section 204 controls the positions of projected images P and Q displayed in a display pixel $D_{i1}$ or $D_{i2}$ of the liquid crystal panel 201 by controlling optical characteristics of the optical characteristic variable lens 202. The projecting positions of the projected images P and Q are controlled such that a boundary point A of the projected images P and Q is in conformity with the middle point of both the observer's eyes.

A converging operation of the optical characteristic variable lens 202 is similar to that in the above-mentioned embodiment shown in FIG. 21.

For example, four stereoscopic signal sources 233 to 236 obtained by the above photographing system as shown in FIG. 27 are connected to a stereoscopic signal selecting section 243. One of the four stereoscopic signal sources is allocated to a signal for the left-hand eye and another one of the four stereoscopic signal sources is allocated to a signal for the right-hand eye by position information of the observer's head. A stereoscopic signal synthesizing section 242 divides two signals selected by the stereoscopic signal selecting section 243 into signal portions in even and odd fields. Parallax images for the left-hand and right-hand eyes are displayed by the stereoscopic signal synthesizing section 242 in the display pixels $D_{i1}$ and $D_{i2}$ of the liquid crystal panel 201.

For example, when the middle point of both the observer's eyes is located within the space T and the boundary point A (point A in FIG. 26) is also located within the space T, an image 2 is displayed in the display pixel $D_{i1}$ of the liquid crystal panel 201 and an image 3 is displayed in the display pixel $D_{i2}$ of the liquid crystal panel 201. When the observer moves his head and the boundary point A is moved into the space U by the movement of the observer's head as shown by point A' in FIG. 26, the image 3 is displayed in the display pixel $D_{i1}$ of the liquid crystal panel 201 and an image 4 is displayed in the display pixel $D_{i2}$ so that the images are replaced.

Namely, images displayed in the liquid crystal panel 201 are replaced in accordance with a space including the boundary point A following the observer's position. The following Table 1 shows the relation between a position of the boundary point A and a displayed image.

TABLE 1

| position at point A | S | T | U |
| --- | --- | --- | --- |
| display image number of $D_{i1}$ | 1 | 2 | 3 |
| display image number of $D_{i2}$ | 2 | 3 | 4 |

The head position information detected by the head detecting section 203 is also transmitted to the stereoscopic signal selecting section 243. The stereoscopic signal selecting section 243 selects a combination of the stereoscopic signal sources shown in the Table 1 on the basis of this head position information and transmits a stereoscopic signal to the stereoscopic signal synthesizing section 242.

A size of the space T depends on a distance between cameras of the photographing system. Normally, the distance between the cameras is preferably set to be in conformity with an average distance between both eyes of a man. The distance between the cameras may be set to be half or smaller than the average distance between both the eyes so as to obtain a smoother change in images. In this case, if the number of cameras is not increased, stereoscopic images are changed so that an observable region is narrowed.

Thus, a stereoscopic image is regenerated in an optimum position in conformity with the position of the observer's head even when the observer moves his head. Further, the regenerated stereoscopic image is moved in conformity with the position of the observer's head. Accordingly, a very natural stereoscopic image can be observed.

The present invention can be also applied to the three-dimensional display unit of a projecting type. FIG. 28 is a cross-sectional view showing a structure of the three-dimensional display unit of the projecting type in another embodiment of the present invention.

In the three-dimensional display unit of the projecting type shown in FIG. 28, light is emitted from a light source 251 and is converged by a condenser lens 253. The converged light is then incident to a liquid crystal panel 201. This light is modulated by the liquid crystal panel 201 and is transmitted through the liquid crystal panel 201. The transmitted light is then focused and formed by a projecting lens 252 as an image on a diffusive layer 250b within an optical characteristic variable screen 250. Namely, an image displayed in the liquid crystal panel 201 is enlarged and is projected to the diffusive layer 250b.

The optical characteristic variable screen 250 is constructed by a variable lenticular lens array 250a having optical characteristics electrically controlled and the diffusive layer 250b. The variable lenticular lens array 250a has a structure shown in FIG. 15 or 13. The optical characteristics of the variable lenticular lens array 205a are controlled by an optical characteristic variable screen control section 254.

In the three-dimensional display unit of the projecting type, only the projecting lens 252 and the diffusive layer 250b are arranged between the variable lenticular lens array 250a and the liquid crystal panel 201 in comparison with the direct viewing type. Accordingly, there is no substantial difference between the projecting type and the direct viewing type.

Accordingly, the above method for controlling the regenerating position of a stereoscopic image and the above method for switching display images are similarly applied to the three-dimensional display unit of the projecting type. A head detecting section 203, a stereoscopic signal synthesizing section 242, a stereoscopic signal selecting section 243 and stereoscopic signal sources 233 to 236 have functions similar to those in the three-dimensional display unit of the direct viewing type. Accordingly, operations of these constructional sections and the stereoscopic signal sources are similar to those in the three-dimensional display unit of the direct viewing type.

In accordance with a fourteenth construction of the present invention, a three-dimensional display unit comprises display means for simultaneously displaying a plurality of different parallax images; optical means attached to the display means and constructed by an array of cylindrical lenses such that optical characteristics of each of the cylindrical lenses can be changed; detecting means for detecting a spatial position of an observer's head; and control means connected to the detecting means and controlling an operation of the optical means based on position information of the observer's head detected by the detecting means such that a stereoscopic image is regenerated in an optimum position of the observer's head.

Accordingly, the spatial position of the observer's head is detected by the detecting means so that an optimum projected image can be displayed to the observer by controlling and setting a regenerating position of the stereoscopic image to an optimum position at any time. A lens having optical characteristics electrically controlled is used as a means for controlling the regenerating position of the stereoscopic image. Therefore, it is not necessary to arrange a precise mechanical system and the three-dimensional display unit has excellent responsibility and is made compact. Further, the position of a controllable regenerating space of the stereoscopic image can be also controlled in an observing distance direction. Accordingly, a space movable in accordance with a movement of the observer's head is set to a three-dimensional space so that a degree of the observer's head movement is increased.

In accordance with a nineteenth construction of the present invention, a three-dimensional display unit comprises display means for simultaneously displaying a plurality of different parallax images; optical means attached to the display means and constructed by an array of cylindrical lenses such that optical characteristics of each of the cylindrical lenses can be changed; detecting means for detecting a spatial position of an observer's head; control means connected to the detecting means and controlling an operation of the optical means based on position information of the observer's head detected by the detecting means such that a stereoscopic image is regenerated in an optimum position of the observer's head; a plurality of stereoscopic signal sources for performing a multiple-eye display; and selecting means connected to the plural stereoscopic signal sources and the detecting means and selecting a stereoscopic signal displayed to the display means on the basis of the position information of the observer's head detected by the detecting means.

Accordingly, the spatial position of the observer's head is detected by the detecting means. A stereoscopic image display space formed by a two-eye type lenticular lens is moved in accordance with the detection of the spatial position. Further, the regenerated image is selected by the selecting means connected to the plural stereoscopic signal sources for performing a multiple-eye display. Thus, a stereoscopic image according to the observer's position is displayed. As a result, in addition of the effects of the fourteenth construction, a stereoscopic image changed smoothly and continuously can be displayed in conformity with the observer's head position so that a very natural stereoscopic image can be observed. Further, in addition to the above effects, the screen of the three-dimensional display unit can be large-sized by using a projector of a rear projecting type.

Figure 29A:
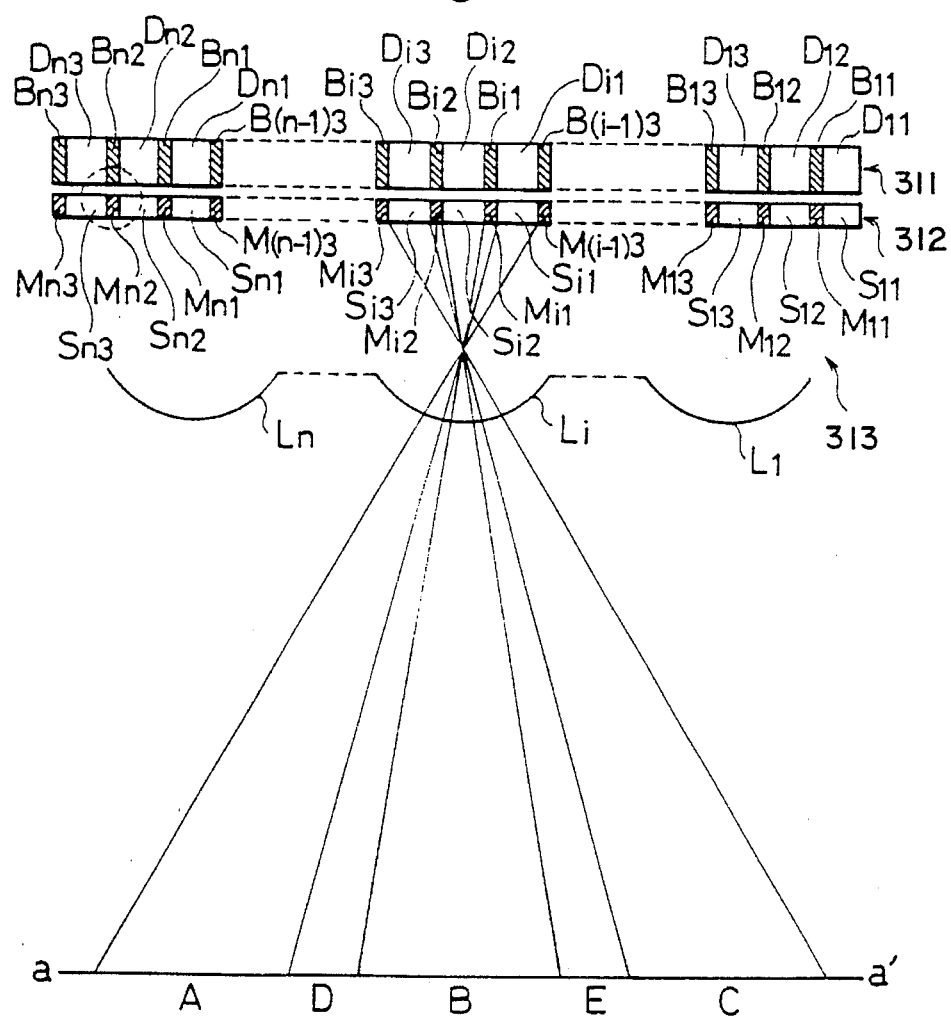
FIG. 29a is a cross-sectional view showing the construction of a three-dimensional display unit in accordance with another embodiment of the present invention.
Figure 29B:
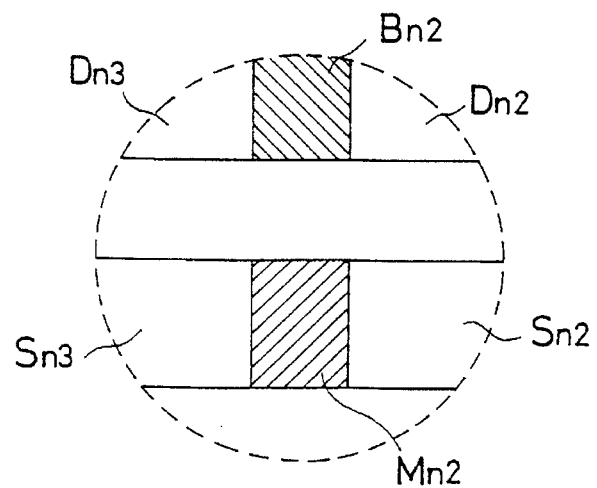

FIG. 29a is a cross-sectional view showing the construction of a three-dimensional display unit in accordance with another embodiment of the present invention. FIG. 29b is an enlarged view of a main portion of the three-dimensional display unit shown in FIG. 29a.

The three-dimensional display unit shown in FIG. 29a is of a direct viewing type and a three-eye type in which a lenticular lens is arranged on the front face of a liquid crystal panel.

The three-dimensional display unit shown in FIG. 29a has a liquid crystal panel display 311, a comb type diffusive mask 312 and a lenticular lens 313. The liquid crystal panel display 311 simultaneously displays a plurality of parallax images and emits light from each of pixels. The comb type diffusive mask 312 is attached to a surface of the liquid crystal panel display 311 and has an elongated diffusive plate formed in a band shape. One portion of light emitted from each of the pixels of the liquid crystal panel display 311 is incident to the elongated diffusive plate. An optical path of this incident light portion is changed by the elongated diffusive plate and this light portion is emitted from the elongated diffusive plate. The light portion emitted from the comb type diffusive mask 312 is incident to the lenticular lens 313 and is emitted by the lenticular lens 313 to a non-display space corresponding to a wiring portion of the liquid crystal panel display 311.

In the real three-dimensional display unit, an illuminating light source for a display is arranged on a rear face of the liquid crystal panel 311, but is omitted in FIG. 29a.

In the embodiment shown in FIG. 29a, the liquid crystal panel is used as an image display panel. The image display panel can be constructed by using an electroluminescence (EL) panel, a plasma display, a flat panel display of a light emitted diode (LED) array, etc. In this case, no light source for a display is required.

A color liquid crystal panel is used as the liquid crystal panel 311. An arranging direction of a color filter in the liquid crystal panel 311 is set to be equal to a longitudinal direction (vertical direction) of the lenticular lens 313 so as not to separate color images from each other by a converging action of the lenticular lens.

The lenticular lens 313 is formed by an array of cylindrical lenses. Each of FIGS. 29a and 29b shows a cross section of an array of elongated cylindrical lenses extending in a direction perpendicular to a paper face. The lenticular lens 313 is constructed by a plastic material such as acrylic, vinyl chloride, etc. The lenticular lens 313 is molded in a shape in which cylindrical portions each having a preset radius of curvature are arranged in a horizontal direction. A thickness of the lenticular lens 313 is set such that the lenticular lens 313 is focused on the liquid crystal panel 311.

The comb type diffusive mask 312 is constructed by small elongated diffusive plates each having the same width as the wiring portion of the liquid crystal panel 311 as a non-transmitting portion through which no light is transmitted. The elongated diffusive plates extend in the vertical direction and are arranged at the same pitch as the display pixels of the liquid crystal panel 311.

The comb type diffusive mask 312 is constructed by elongated slits each formed in a longitudinal stripe and arranged in the horizontal direction. One unopen portion of the slits is formed as an elongated diffusive plate and has the same width as the wiring portion of the liquid crystal panel 311. This unopen portion as the elongated diffusive plate is closely attached to the wiring portion such that the unopen portion is arranged on a front face of the wiring portion of the liquid crystal panel 311. The unopen portion is constructed b F a material such as plastic, glass, transparent ceramics, etc. It is preferable to set a thickness of the comb type diffusive mask 312 to be thin as much as possible. However, when the comb type diffusive mask 312 is excessively thin, no diffusive effects of the comb type diffusive mask 312 are lost. The thickness of the comb type diffusive mask 312 is determined by a diffusive degree of the elongated diffusive plate.

The embodiment shown in FIG. 29a relates to the three-eye type in which three different parallax images are displayed. One portion of each of the parallax images is displayed in each of display pixels $D_{i1}$, $D_{i2}$ and $D_{i3}$ of the liquid crystal panel 311. Index i is set to a value from 1 to n. A cylindrical lens $L_i$ within the lenticular lens 313 corresponds to one set of display pixels $D_{i1}$, $D_{i2}$ and $D_{i3}$. The cylindrical lens $L_i$ is arranged such that this cylindrical lens is closely attached to the display pixels $D_{i1}$, $D_{i2}$ and D$i3$. Light is transmitted through the display pixels $D_{i1}$, $D_{i2}$ and D$i3$ and is then transmitted through respective opening portions $S_{i1}$, $S_{i2}$ and $S_{i3}$ of the comb type diffusive mask 312. This light is separated and projected into each of display spaces A, B and C in an observation region by a converging action of the cylindrical lens $L_i$.

Each of distances between centers of these spaces is set to an average distance (about 65 mm) between man's eyes. For example, an observer can observe a stereoscopic image when the left-hand and right-hand eyes are respectively located in the spaces A and B.

One portion of the light transmitted through each of the display pixels $D_{i1}$, $D_{i2}$ and $D_{i3}$ is incident to each of unopen portions $M_{(i-1)3}$, $M_{i1}$, $M_{i2}$ and $M_{i3}$ of the comb type diffusive mask 312. Each of these unopen portions of the comb type diffusive mask 312 is constructed by an elongated diffusive plate. Light incident to this elongated diffusive plate is ideally emitted in all directions. Accordingly, light emitted from the elongated diffusive plates $M_{i1}$ and M$i2$ respectively reaches spaces D and E, Namely, a non-display space in the general example is set to a display space.

In this embodiment, a light intensity distribution on an observation plane a–a' is provided as shown in FIG. 30 when the observation plane a–a' is set within the observation region.

In FIG. 30, an overlapping region of two curves shows that lights from two directions overlap each other. Therefore, an entire light intensity is equal to a sum of light intensities in this overlapping region. Accordingly, FIG. 30 shows that light having intensity approximately equal to that in each of the spaces A, B and C reaches each of the spaces D and E. In such a state, no observer sees a black band as a non-display portion even when the observer moves his head and an observed stereoscopic image is changed from a combination of the spaces A and B to a combination of the spaces B and C.

The light intensity distribution shown in FIG. 30 can be also realized by changing a thickness and a curvature radius of the lenticular lens 313. In this case, no black band is formed, but an image is defocused.

Figure 31:
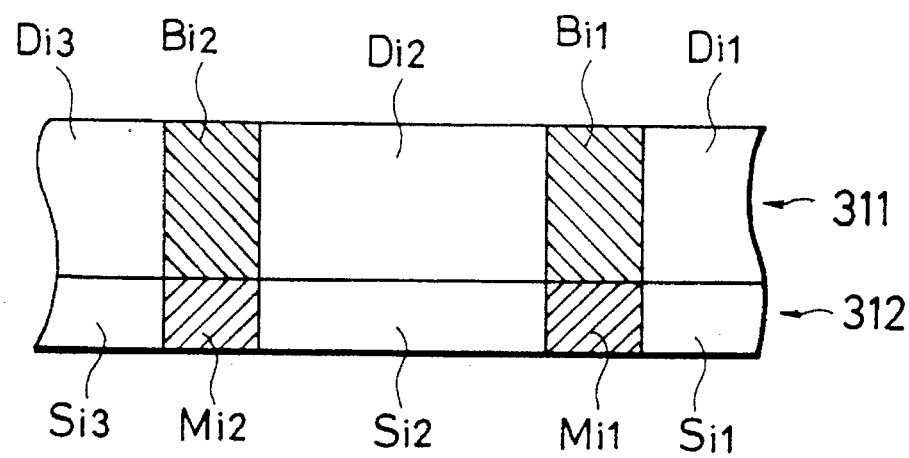
FIG. 31 is an enlarged cross-sectional view showing the construction of a three-dimensional display unit in accordance with another embodiment of the present invention.

FIG. 31 is a partially enlarged view of the three-dimensional display unit in the embodiment shown in FIGS. 29a and 29b. Elongated diffusive plates $M_{i1}$ and $M_{i2}$ are arranged in front of wiring portions $B_{i1}$ and $B_{i2}$ of the liquid crystal panel 311.

A three-dimensional display unit in accordance with another embodiment of the present invention will next be described with reference to each of FIGS. 32 to 34.

Figure 32:
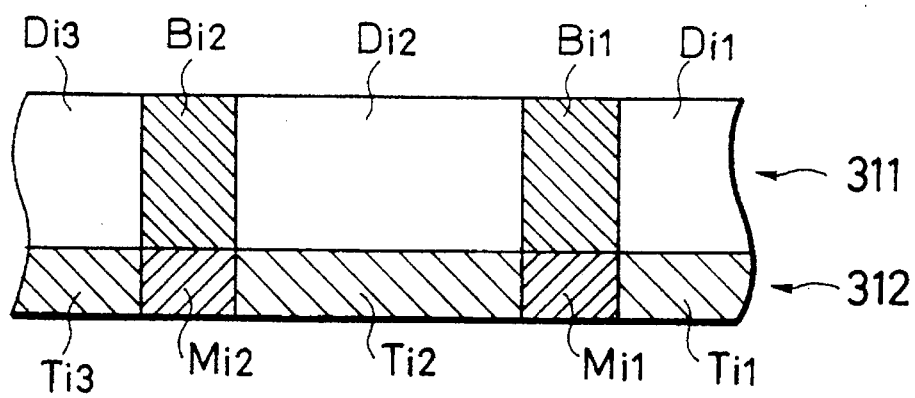
FIG. 32 is an enlarged cross-sectional view showing the construction of a three-dimensional display unit in accordance with another embodiment of the present invention.
Figure 33:
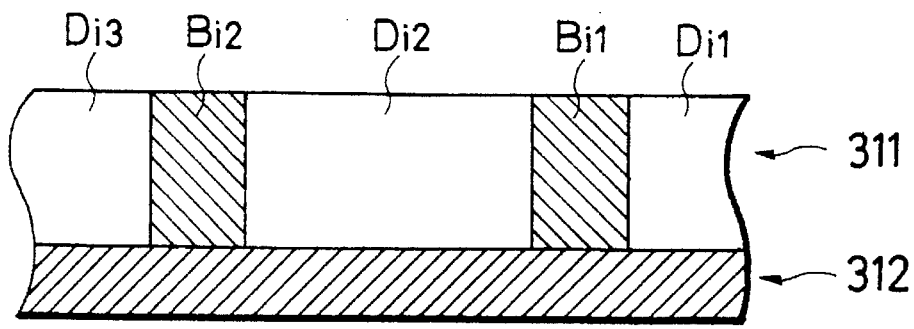
FIG. 33 is an enlarged cross-sectional view showing the construction of a three-dimensional display unit in accordance with another embodiment of the present invention.

Each of FIGS. 32 to 34 enlarges one portion of each of a liquid crystal panel and a comb type diffusive mask.

In FIG. 32, a transparent material such as glass, a plastic material, etc. is used in a light transmitting portion in which no elongated diffusive plate of a comb type diffusive mask 312 is formed. The elongated diffusive plate can be held and the comb type diffusive mask is easily molded as a whole by using the transparent material in the light transmitting portion. If the transparent material is set to be equal to the material of a lenticular lens 313, the above fourth object of the present invention can be achieved by reducing a thickness of the lenticular lens 313 designed for the three-dimensional display unit by a thickness d of the comb type diffusive mask 312. Accordingly, the lenticular lens 313 is easily designed.

Further, refractive indices of the comb type diffusive mask 312 and the lenticular lens 313 are set to be equal to each other. Accordingly, no light reflection is caused on a boundary face of the comb type diffusive mask 312 and the lenticular lens 313 so that light can be effectively utilized.

FIG. 33 shows a three-dimensional display unit in accordance with another embodiment of the present invention.

In the three-dimensional display unit shown in FIG. 33, a diffusive plate 314 having the same size as the screen size of a liquid crystal panel 311 is arranged on a front face of the liquid crystal panel 311 instead of the comb type diffusive mask.

In this embodiment, a stereoscopic image is defocused around a stereoscopic observable region. However, this three-dimensional display unit has a simplest structure for achieving an object of the present invention in which no non-display space is caused between display spaces. A thickness of the diffusive plate 314 is determined by a diffusive degree of a material used for the diffusive plate 314. In this case, a lenticular lens 313 is designed such that the lenticular lens 313 is focused on a surface of the diffusive plate 314.

FIG. 34 shows the construction of a three-dimensional display unit in accordance with another embodiment of the present invention.

The three-dimensional display unit shown in FIG. 34 is constructed such that a comb type diffusive mask is buried into a lenticular lens 313.

The three-dimensional display unit shown in FIG. 34 is of a two-eye type. A pitch of the lenticular lens 313 is set to be smaller than the pitch of a display pixel $D_{ij}$ of a liquid crystal panel 311. However, the pitch of a buried elongated diffusive plate is equal to the pitch of the display panel $D_{ij}$ of the liquid crystal panel 311. Namely, the pitch of the lenticular lens 313 is different from the pitch of the buried elongated diffusive plate.

In the above-mentioned embodiments shown in FIG. 29 to 33, a position of the comb type diffusive mask or the diffusive plate and a position of the lenticular lens must be independently aligned with respect to the liquid crystal panel. However, in this embodiment shown in FIG. 34, it is sufficient to align the lenticular lens with the liquid crystal panel.

Figure 35A:
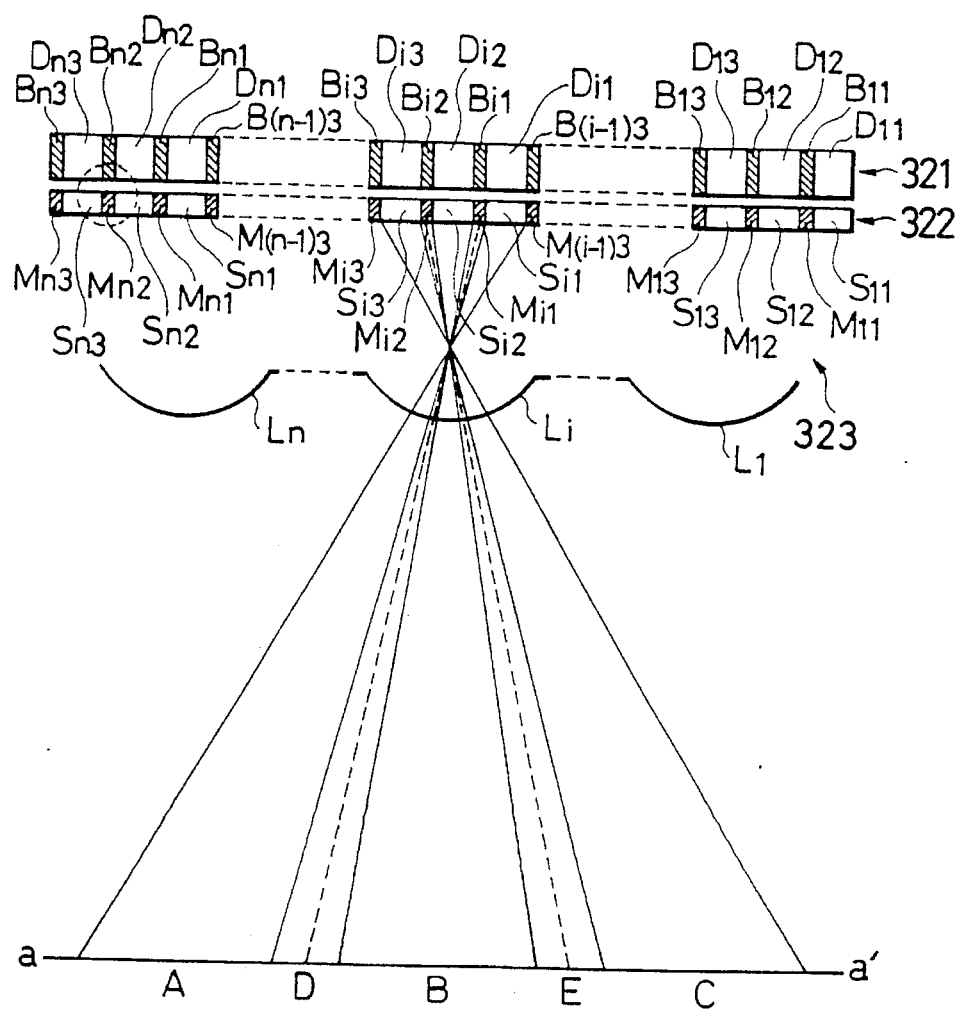
FIG. 35a is an enlarged cross-sectional view showing the construction of a three-dimensional display unit in accordance with another embodiment of the present invention.

FIG. 35a shows the construction of a three-dimensional display unit in accordance with another embodiment of the present invention.

Figure 35B:
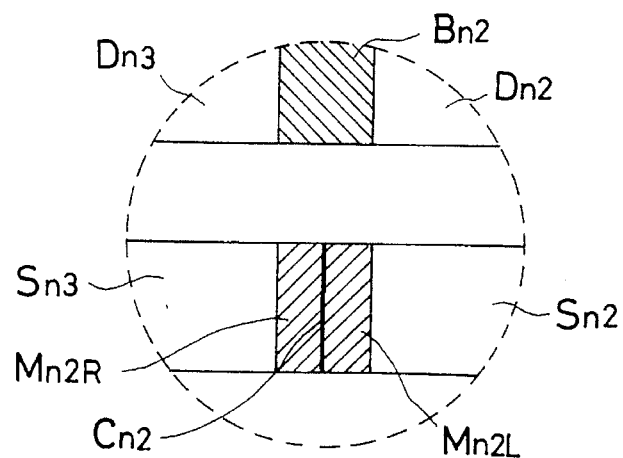

FIG. 35b is an enlarged view of one portion of the three-dimensional display unit shown in FIG. 35a.

FIG. 35a shows a three-eye type. The three-dimensional display unit of this three-eye type is constructed by a liquid crystal panel 321, a comb type diffusive mask 322 and a lenticular lens 323. Different from the above-mentioned embodiments, a light interrupting film $C_{ij}$ is arranged within an elongated diffusive plate $M_{ij}$ (j=i, 2, 3) in the comb type diffusive mask 322.

A function of the light interrupting film $C_{ij}$ will next be explained.

As shown in FIG. 30, a black band can be removed from each of the spaces D and E in the embodiment shown in FIG. 29a so that an obstacle in movement of the observation region can be reduced. However, light for each of the right-hand and left-hand eyes also reaches each of the spaces D and E so that no correct stereoscopic image can be seen in a hatching portion in FIG. 30.

As shown in FIG. 29a, this is because transmitted light on both sides of an elongated diffusive plate is incident to this elongated diffusive plate in the comb type diffusive mask 312. For example, transmitted light from the display pixel $D_{i1}$ and transmitted light from the display pixel $D_{i2}$ are incident to the elongated diffusive plate $M_{i1}$. These two transmitted lights are incident to the elongated diffusive plate at separate incident angles, but cannot be discriminated from each other when these lights are emitted from the elongated diffusive plate.

Namely, as shown in FIG. 30, an image observed in the space D is formed by mixing images observed in the spaces A and B with each other so that no correct stereoscopic image can be seen.

In the embodiment shown in FIGS. 35a and 35b, the light interrupting film $C_{ij}$ is arranged within the elongated diffusive plate $M_{ij}$ so that the elongated diffusive plate $M_{ij}$ is divided into two divisional portions $M_{ijL}$ and $M_{ijR}$.

Figure 36:
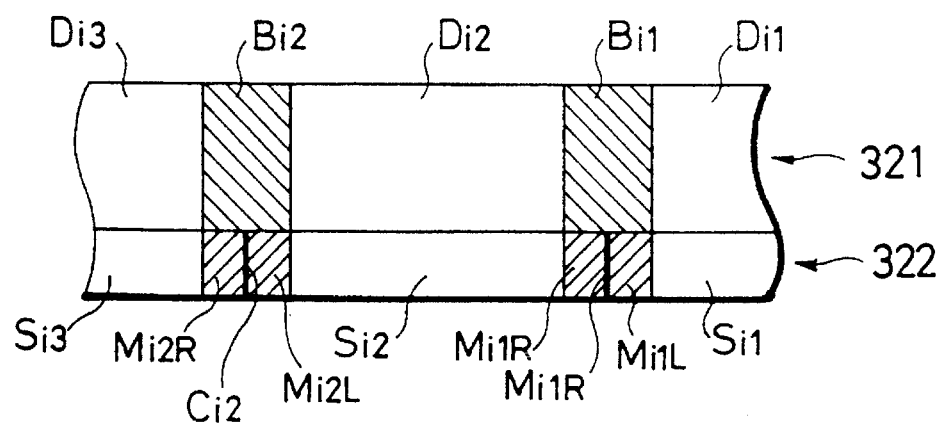
FIG. 36 is an enlarged cross-sectional view of the three-dimensional display unit shown in FIGS. 35a and 35b.

FIG. 36 is a partially enlarged view of each of the liquid crystal panel 321 and the comb type diffusive mask 322.

In FIG. 36, only transmitted light from a display pixel $D_{i1}$ is incident to the elongated diffusive plate $M_{i1L}$ and only transmitted light from a display pixel $D_{i2}$ is incident to the elongated diffusive plate $M_{i1R}$. Thus, light emitted from the elongated diffusive plates is separated into light corresponding to the transmitted light from the display pixel $D_{i1}$ and light corresponding to the transmitted light from the display pixel $D_{i2}$. Namely, an image portion observed in the space D and located on the left-hand side of a dotted line is ideally equal to an image observed in the space A. An image portion observed in the space D and located on the right-hand side of the dotted line is ideally equal to an image observed in the space B.

In this embodiment, when a certain observation plane a–a' is set within an observation region, a light intensity distribution on this observation plane a–a' is provided as shown in FIG.

Figure 37:
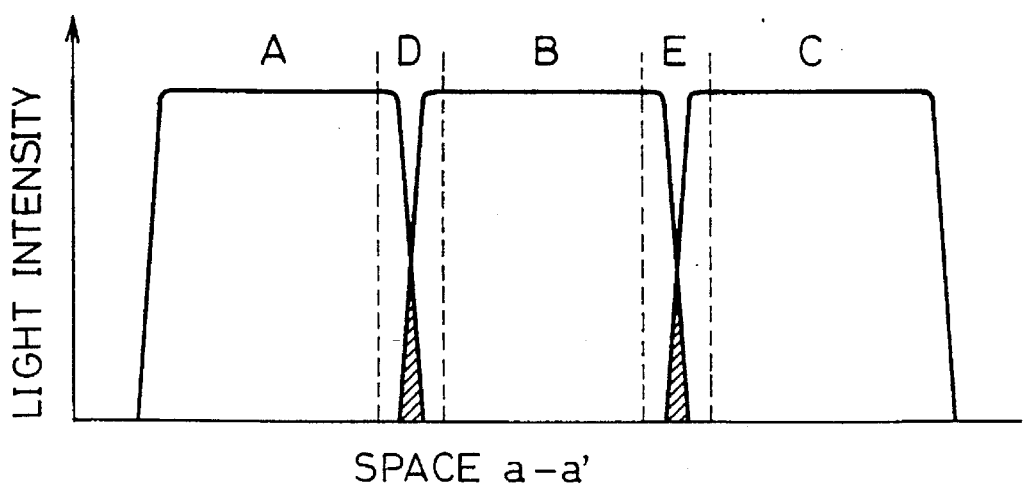
FIG. 37 is a view for explaining light intensity of the three-dimensional display unit shown in FIGS. 35a and 35b.

A mixing region of images for the right-hand and left-hand eyes shown by a hatching portion in FIG. 37 is greatly narrowed by a light interrupting function of the light interrupting film $C_{ij}$ in comparison with FIG. 30. Accordingly, it should be understood that a stereoscopic observable space is widened until regions of the spaces D and E.

The mixing region of images for the right-hand and left-hand eyes shown by the hatching portion still exists in FIG. 37. However, this mixing region is caused since an arc having an observing distance as a radius around an observer as a center is approximated by a straight line. To completely remove this mixing region, it is sufficient to form the entire three-dimensional display unit in an arc shape, or arrange the lenticular lens 323 or the liquid crystal panel 321 at an irregular pitch. However, it is sufficient to arrange only the comb type diffusive mask 322 to reduce an obstacle in movement of the observation region.

The construction of the three-dimensional display unit shown in FIGS. 35 to 37 can be also applied to the above embodiment shown in each of FIGS. 31 to 34. Namely, features of the three-dimensional display unit in each of these embodiments can be provided by arranging a light interrupting film formed by a diffusive material in a portion corresponding to a wiring portion of the liquid crystal panel. As a result, a black band can be removed from an image without defocusing this image.

As mentioned above, in the three-dimensional display unit of the present invention, a plurality of parallax images are displayed in a mixing state in a flat panel display every one pixel. One set of plural pixels correspond to one cylindrical lens constituting a lenticular lens. Thus, lights emitted from the respective pixels are separated from each other so that a projecting pattern of each of the parallax images is formed. At this time, one portion of light emitted from each of the pixels is incident to a diffusive plate formed in a band shape and arranged on the front face of a vertical wiring portion as a non-transmitting portion in the above flat panel display.

The above diffusive plate having the band shape is arranged on each of front faces of all vertical wiring portions as non-transmitting portions in the above flat panel display. Accordingly, the entire diffusive plate has the same pitch as the pixels of the flat panel display and is formed as a comb type diffusive mask having an unopen portion (diffusive plate) of a comb type.

An optical path of light incident to the diffusive plate is changed by the diffusive plate. Accordingly, in an observation region, light emitted from the diffusive plate reaches a space to which no light from a pixel can be transmitted when no diffusive plate is arranged. Thus, it is possible to reduce a non-display space corresponding to the wiring portion of the flat panel display. Accordingly, no observer sees a black band as an obstacle in stereoscopic observation when an observing position is moved.

In the three-dimensional display unit of the present invention, an opening portion of the above comb type diffusive mask is constructed by a transparent material so that the structure of the three-dimensional display unit is maintained and the three-dimensional display unit is easily molded.

When a refractive index of the above transparent material is set to be equal to the refractive index of a lenticular lens, a thickness of the lenticular lens is reduced by a thickness of the comb type diffusive mask. Thus, with respect to the emitted light not incident to the diffusive plate from the pixel of the flat panel display, it is possible to realize the same converging state as a case in which no comb type diffusive mask is arranged.

In another three-dimensional display unit of the present invention, plural parallax images are displayed in a mixing state every one pixel in the flat panel display. A diffusive plate is arranged on a front face of the flat panel display along an entire screen. Further, a lenticular lens is arranged on a front face of the diffusive plate. At this time, one set of plural pixels correspond to one cylindrical lens constituting the lenticular lens. Thus, lights emitted from the respective pixels are separated from each other so that a projecting pattern of each of the parallax images is formed.

An image on the above flat panel display is once projected onto the diffusive plate arranged between the flat panel display and the lenticular lens. A boundary between a certain pixel and an adjacent pixel becomes indefinite with respect to the projected image on the diffusive plate. Therefore, when the projecting pattern of each of the parallax images is formed, a boundary of lights separated by the lenticular lens also becomes indefinite. Accordingly, no observer sees a black band as an obstacle in stereoscopic observation when an observing position is moved.

The three-dimensional display unit of the present invention has an integral structure in which the above comb type diffusive mask and the lenticular lens are integrated with each other. Namely, when the lenticular lens is molded, the diffusive plate molded in a band shape in advance is buried onto a contact face side of the lenticular lens coming in contact with the flat panel display at the same pitch as a pitch of display pixels of the flat panel display. Otherwise, a diffusive substance is injected onto this contact face side such that the diffusive plate is formed in a band shape. Thus, the integral structure is obtained. An optical path of light emitted from the lenticular lens is equal to that in the above-mentioned three-dimensional display unit.

When the comb type diffusive mask and the lenticular lens have separate structures, it is necessary to independently align positions of the flat panel display and the comb type diffusive mask, and positions of the comb type diffusive mask and the lenticular lens. These aligning operations are easily performed by setting the flat panel display, the comb type diffusive mask and the lenticular lens to an integral structure.

Further, in the three-dimensional display unit of the present invention, a light interrupting film is inserted into the diffusive plate formed in a band shape and constituting the above comb type diffusive mask. The diffusive plate formed in a band shape is arranged at the same pitch as the pixel pitch of the flat panel display. Accordingly, the light interrupting film is also arranged at the same pitch as the pixel pitch of the flat panel display. One diffusive plate formed in a band shape is separated into two plate portions by this light interrupting film. In an observation region, light emitted from the diffusive plate reaches a space to which no light from a pixel is transmitted when no diffusive plate is arranged. This emitted light reaches this space by the lenticular lens. Thus, a non-display space corresponding to a wiring portion of the flat panel display is reduced. At this time, since the diffusive plate is separated into the two plate portions, incident light for a left-hand eye from a right-hand side of the diffusive plate is converged onto a left-hand side of this space. Further, incident light fop a right-hand eye from a left-hand side of the diffusive plate is converged onto a right-hand side of this space. Accordingly, the incident lights for the left-hand and right-hand eyes are separately converged onto the left-hand and right-hand sides of this space. Namely, the lenticular lens makes light reach a space to which no light from a display pixel is transmitted when no masking means is arranged. Further, lights emitted from adjacent display pixels are allocated to different spaces by the lenticular lens.

Accordingly, no observer sees a black band as an obstacle in stereoscopic observation when an observing position is moved. Further, a stereoscopic observable region is enlarged in a horizontal direction. Namely, effects equivalent to reduction of the wiring portion of the flat panel display in size in the horizontal direction and enlargement of a display pixel portion in the horizontal direction can be obtained by arranging the light interrupting film within the diffusive plate.

Further, in the three-dimensional display unit of the present invention, the light interrupting film is inserted into the diffusive plate and is arranged at the same pitch as the pixel pitch of the flat panel display. Features of the above three-dimensional display unit can be added by this inserted light interrupting film.

In accordance with a third construction of the present invention, a three-dimensional display unit comprises display means having a plurality of pixels and a non-transmitting portion and simultaneously displaying a plurality of parallax images and emitting light from each of the pixels; masking means attached to a surface of the display means and arranged at the same pitch as a pitch of the respective pixels in accordance with the non-transmitting portion of the display means; the masking means having an unopen portion constructed such that one portion of light emitted from each of the pixels is incident to the unopen portion and is emitted from the unopen portion by changing an optical path of the incident light by the unopen portion; and lens means constructed by an array of cylindrical lenses each having the same shape and attached to a surface of the masking means. Accordingly, the size of a non-display space can be reduced so that no observer sees a black band as an obstacle in stereoscopic observation when an observing position is moved.

In accordance with a fourth construction of the present invention, the unopen portion of the masking means has a light interrupting film for reducing the size of a non-display space corresponding to the non-transmitting portion of the display means. Accordingly, the unopen portion is divided into two portions so that lights incident to the unopen portion from two different pixels can be separated from each other when these lights are emitted from the unopen portion. Thus, it is possible to enlarge an observation region for a stereoscopic image.

Figure 38A:
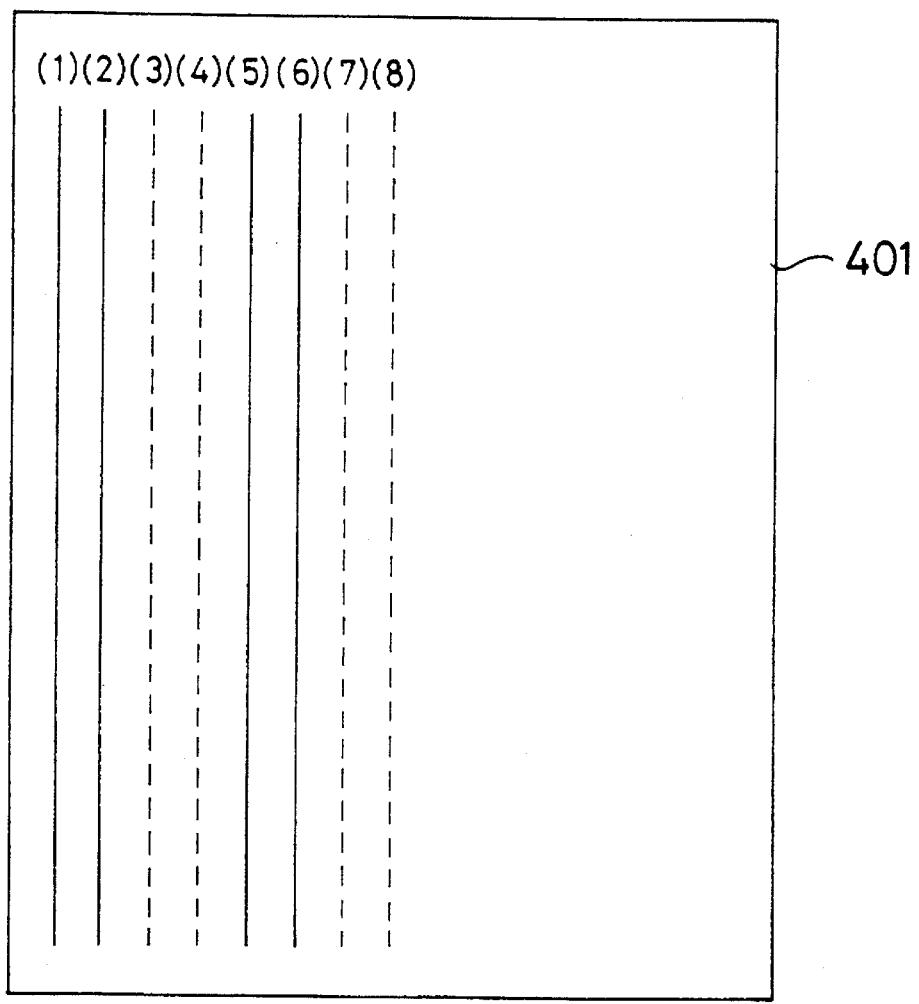
FIGS. 38a and 38b are views showing the schematic construction of a three-dimensional display unit of a two-eye type in accordance with another embodiment of the present invention.
Figure 38B:
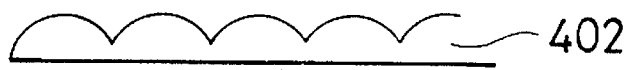

FIG. 38*a* is a plan view showing the structure of a liquid crystal panel 401 as a display means used in a three-dimensional display unit of the present invention. FIG. 38*b* is a plan view showing the structure of a lenticular lens 402 as an optical means. In FIGS. 38*a* and 38*b*, the three-dimensional display unit is of a two-eye type as one example.

FIG. 38a shows a display state of the liquid crystal panel 401 at a certain time for a vertical scanning period. In FIG. 38a, a main scanning line provided by applying a voltage having a positive polarity to the liquid crystal panel 401 is shown by a solid line. A main scanning line provided by applying a voltage having a negative polarity to the liquid crystal panel 401 is shown by a dotted line. One portion of an image for a right-hand eye is displayed by first, third, fifth, - - - , main scanning lines. One portion of an image for a left-hand eye is displayed by second, fourth, sixth, - - - , main scanning lines.

In the following description, the number of parallax images displayed in the liquid crystal panel is set to N showing an N-eye type. In this case, one portion of a certain parallax image is displayed in the liquid crystal panel 401 every N-main scanning lines. One portion of another parallax image is also displayed every N-main scanning lines adjacent to the previous main scanning lines. Thus, N-parallax images are cut and are sequentially connected and are simultaneously displayed in the liquid crystal panel.

The following first explanation relates to a three-dimensional display unit of a direct viewing type in which the lenticular lens is directly stuck to a display face of the liquid crystal panel.

Figure 39:
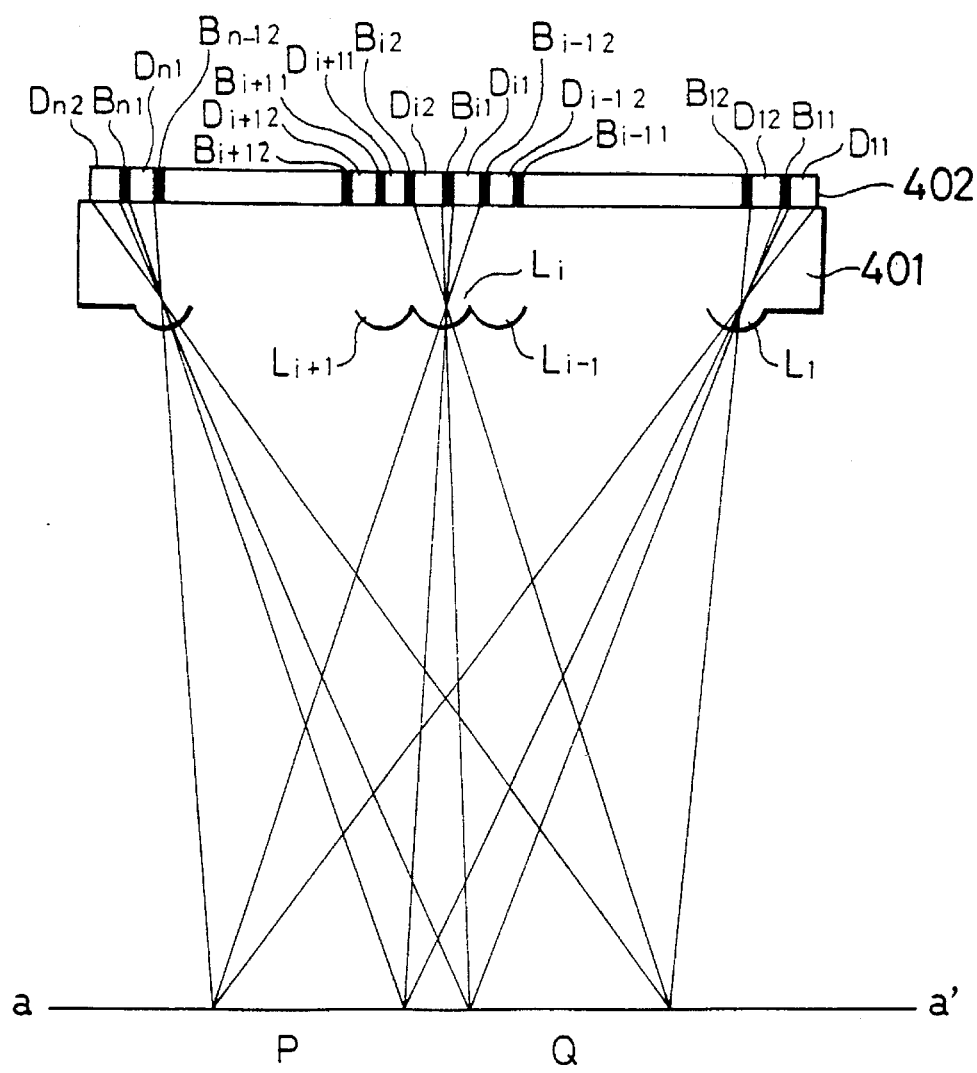
FIG. 39 is a cross-sectional view showing a structure of the three-dimensional display unit shown in FIGS. 38a and 38b.

FIG. 39 is a cross-sectional view showing the structure of a three-dimensional display unit of a two-eye type in a lenticular system of a direct viewing type.

One portion of a parallax image corresponding to a left-hand eye is displayed in a display pixel $D_{i1}$ of a liquid crystal panel 401. One portion of a parallax image corresponding to a right-hand eye is displayed in a display pixel $D_{i2}$ of the liquid crystal panel 401. A cylindrical lens $L_i$ is arranged such that the cylindrical lens corresponds to a pair of display pixels $D_{i1}$ and $D_{i2}$.

Light is transmitted through the display pixels $D_{i1}$ and $D_2$ and is separated into light portions in display spaces P and Q within an observation region by a converging action of the cylindrical lens $L_i$. Light is similarly separated into light portions in the display spaces P and Q with respect to each of values of index i from 1 to n. Thus, the parallax image for the left-hand eye is converged into the display space P and the parallax image for the right-hand eye is converged into the display space Q. A stereoscopic image can be observed when the left-hand and right-hand eyes are respectively located in the display spaces P and Q.

The lenticular lens 402 is constructed by an array of cylindrical lenses. The lenticular lens 402 is normally formed by a plastic material such as acrylic, vinyl chloride, etc.

The liquid crystal panel 401 is arranged in a longitudinal position such that a main scanning line is in conformity with a longitudinal direction of each of the cylindrical lenses within the lenticular lens 402.

When information of different parallax images is displayed every main scanning line, signal processing is simplified since it is sufficient to switch signal sources every main scanning line. Therefore, information of different parallax images is displayed every main scanning line in many cases.

The next description relates to a case in which the number N of parallax images is set to an even number. In this embodiment, polarities of a voltage applied to the liquid crystal panel on a main scanning line are inverted every N-parallax images.

Since the three-dimensional display unit shown in FIGS. 38a and 38b is of the two-eye type, one cylindrical lens corresponds to two main scanning lines. In the case of an N-eye type, one cylindrical lens corresponds to N-main scanning lines.

Figure 40:
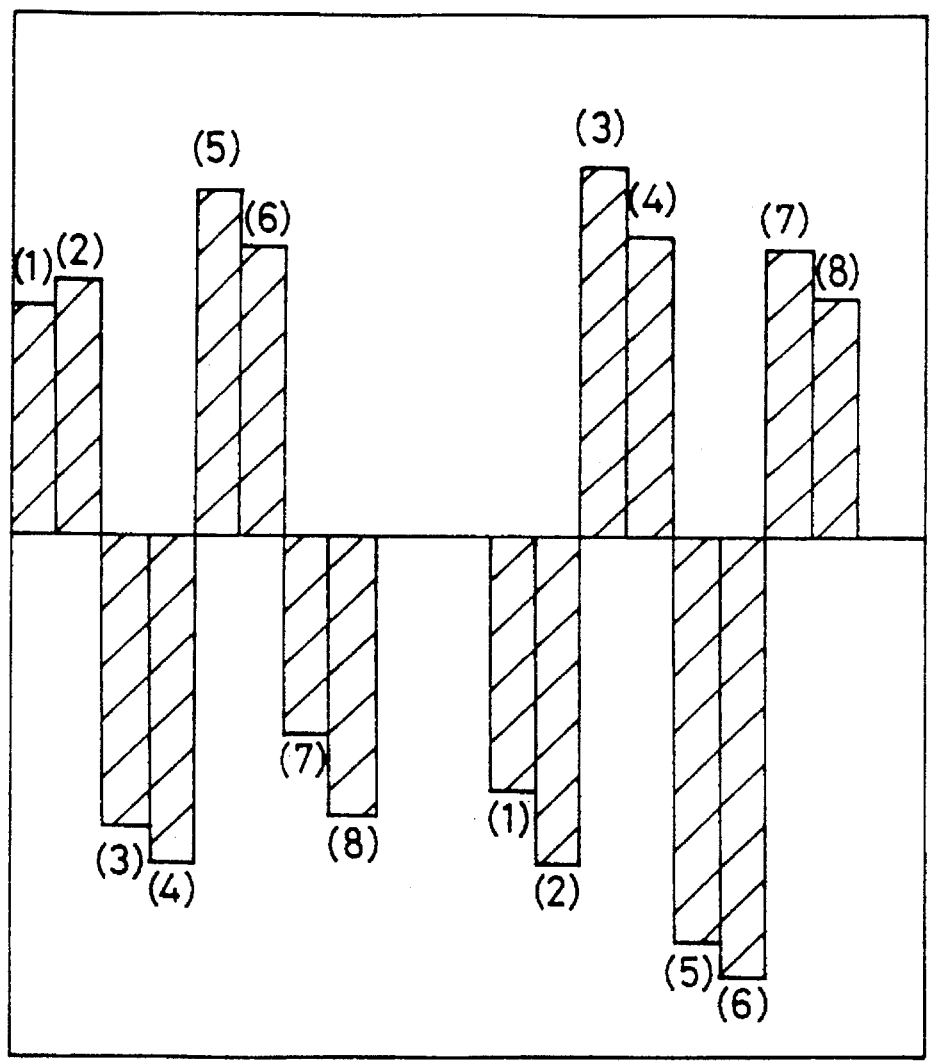
FIG. 40 is an explanatory view showing a polarity inverting pattern of a liquid crystal panel shown in FIGS. 38a and 38b.

FIG. 40 shows a polarity inverting system in this embodiment. In the case of the N-eye type such as the two-eye type, polarities of the applied voltage are inverted every N-main scanning lines such as two main scanning lines. In a certain vertical scanning period (frame), first and second main scanning lines show a positive polarity. Third and fourth main scanning lines show a negative polarity. Fifth and sixth main scanning lines show the positive polarity. Seventh and eighth main scanning lines show the negative polarity. The driving voltage is applied to the liquid crystal panel in such a polarity inverting order. Further, in the next vertical scanning period, the driving voltage having a polarity inverse to that provided in the vertical scanning period just before the next vertical scanning period is applied to the liquid crystal panel on the same main scanning line. Namely, the first and second main scanning lines show a negative polarity. The third and fourth main scanning lines show a positive polarity. The fifth and sixth main scanning lines show the negative polarity. The seventh and eighth main scanning lines show the positive polarity. The driving voltage is applied to the liquid crystal panel in such a polarity inverting order.

Figure 41A:
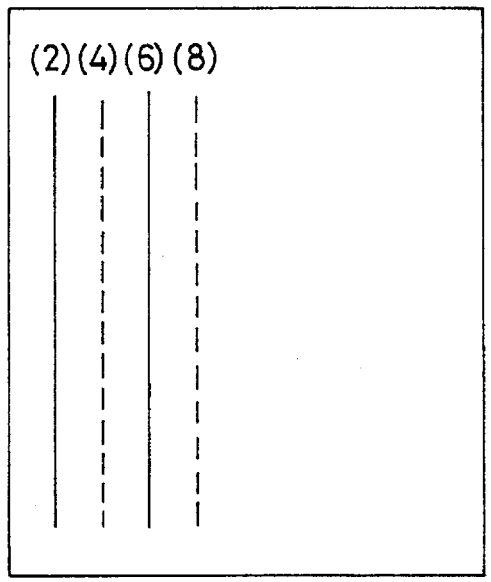
FIGS. 41a and 41b are views for explaining images for left-hand and right-hand eyes respectively projected to the left-hand and right-hand eyes of an observer from the liquid crystal panel shown in FIGS. 38a and 38b.
Figure 41B:
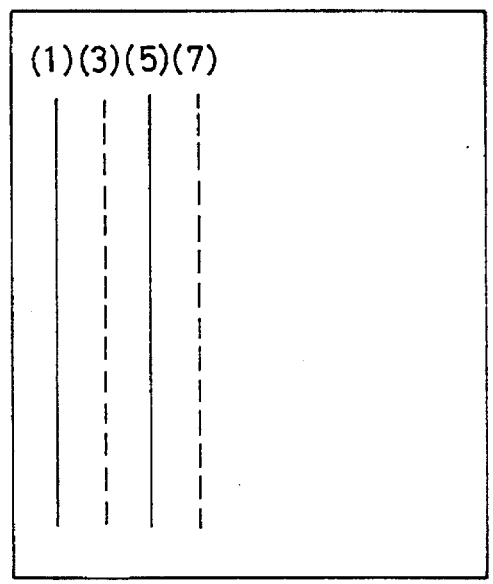

FIGS. 41a and 41b respectively show images for left-hand and right-hand eyes in the display state shown in FIGS. 38a and 38b in which these images are separated and projected by the converging action of the lenticular lens 402. Similar to FIGS. 38a and 38b, a main scanning line with respect to the applied voltage having a positive polarity is shown by a solid line. A main scanning line with respect to the applied voltage having a negative polarity is shown by a dotted line.

As shown in FIGS. 40 and 41, main scanning lines provided by different polarities are alternately mixed with each other within one image with respect to the images for the left-hand and right-hand eyes. Accordingly, one image is not constructed by main scanning lines provided by the same polarity. With respect to a change with the passage of time, polarities of the applied voltage on each of the main scanning lines are inverted every one vertical scanning period so that no voltage having the same polarity is applied to the liquid crystal panel at any time.

In this embodiment, a phase on a main scanning line for periodically displaying a parallax image in accordance with the cylindrical lens may not be necessarily in conformity with a phase for periodically inverting the polarities of the applied voltage on the main scanning line.

The three-eye type will next be explained as one example in which the number N of parallax images showing the N-eye type is set to an odd number.

Figure 42A:
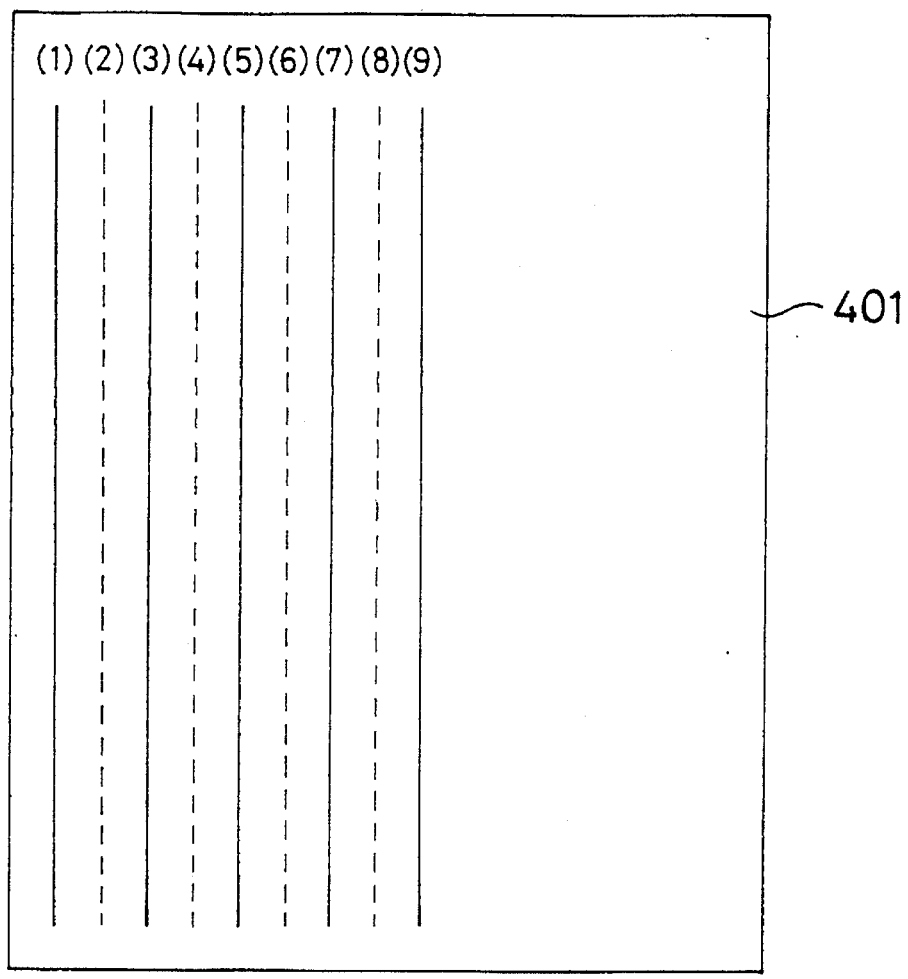
FIGS. 42a and 42b are views showing the schematic construction of a three-dimensional display unit of a three-eye type in accordance with another embodiment of the present invention.
Figure 42B:

FIG. 42a shows a display state of a liquid crystal panel 401 at a certain time for a vertical scanning period. A main scanning line provided by a positive polarity is shown by a solid line. A main scanning line provided by a negative polarity is shown by a dotted line. One portion of a parallax image C is displayed on first, fourth, seventh, - - - , main scanning lines. One portion of a parallax image B is displayed on second, fifth, eighth, - - - , main scanning lines. One portion of a parallax image A is displayed on third, sixth, ninth, - - - , main scanning lines. FIG. 42b is a cross-sectional view of a lenticular lens 402 arranged on a front face of the liquid crystal panel 401. Since the three-dimensional display unit shown in FIGS. 42a and 42b is of the three-eye type, one cylindrical lens corresponds to three main scanning lines.

Figure 43:
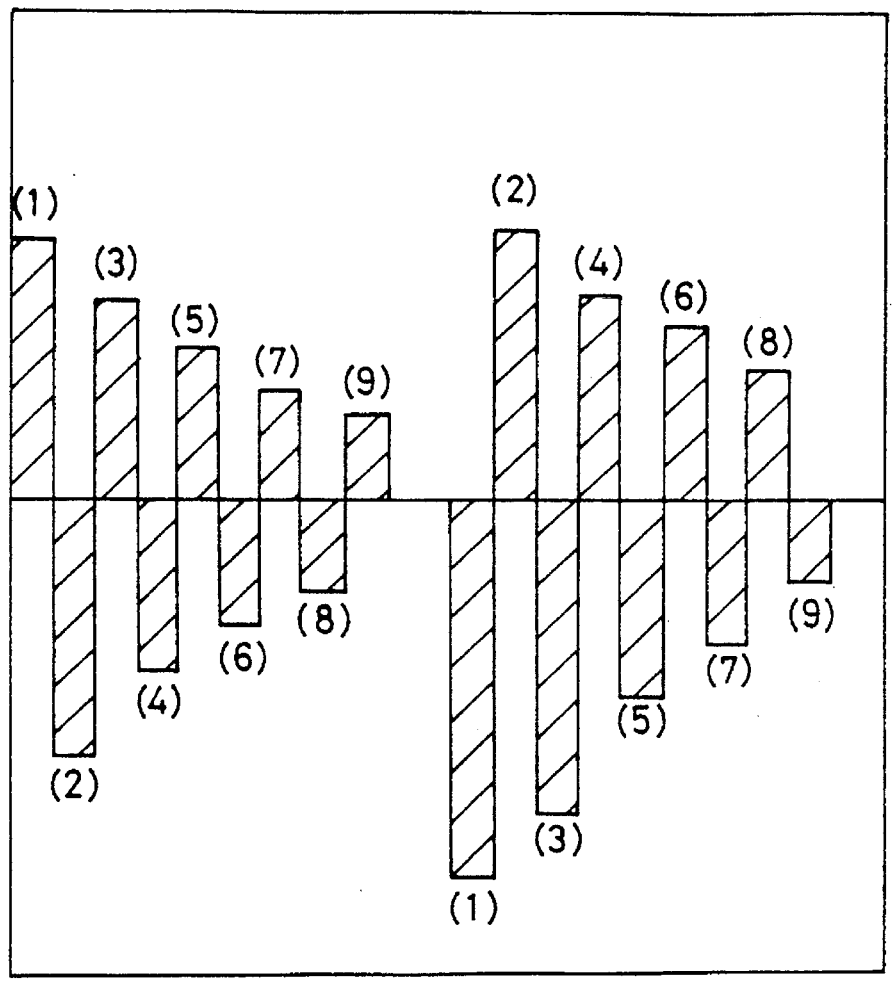
FIG. 43 is a view fop explaining a polarity inverting pattern of a liquid crystal panel shown in FIGS. 42a and 42b.

FIG. 43 shows a polarity inverting pattern when the number N of parallax images is set to an odd number.

Polarities of the applied voltage are inverted every one main scanning line. In a certain vertical scanning period (frame), the driving voltage is applied to the liquid crystal panel such that first, third, fifth, - - -, main scanning lines show a positive polarity and second, fourth, sixth, - - -, main scanning lines show a negative polarity. In the next vertical scanning period, the driving voltage having a polarity inverse to that provided in the vertical scanning period just before the next vertical scanning period is applied to the liquid crystal panel on the same main scanning line. Namely, the driving voltage is applied to the liquid crystal panel such that the first, third, fifth, - - -, main scanning lines show the negative polarity and the second, fourth, sixth, - - -, main scanning lines show the positive polarity.

Figure 44A:
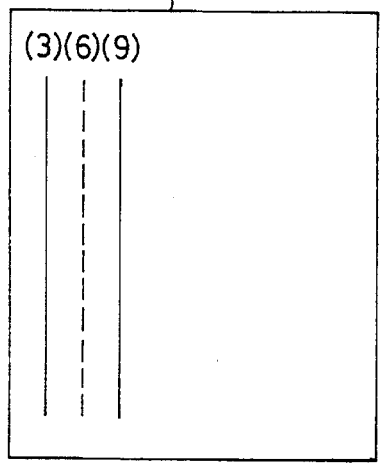
FIGS. 44a, 44b and 44c are views for respectively explaining parallax images A, B and C projected from the liquid crystal panel shown in FIGS. 42a and 42b.
Figure 44B:
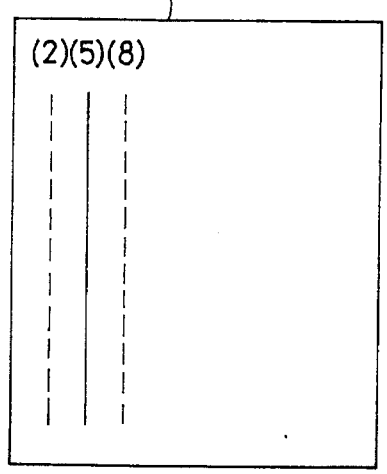
Figure 44C:
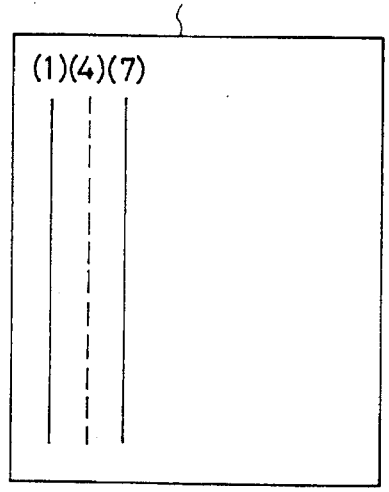

FIGS. 44a, 44b and 44c respectively show parallax images A, B and C in the display state shown in FIGS. 42a and 42b in which the parallax images are separated and projected by a converging action of the lenticular lens 402. Similar to FIGS. 42a and 42b, a main scanning line provided by a positive polarity is shown by a solid line and a main scanning line provided by a negative polarity is shown by a dotted line.

As shown in FIGS. 43 and 44, main scanning lines provided by different polarities are alternately mixed with each other within one image with respect to the parallax images A, B and C. Accordingly, one image is not constructed by main scanning lines provided by the same polarity. With respect to a change with the passage of time, polarities of the applied voltage on each of the main scanning lines are inverted every one vertical scanning period so that no voltage having the same polarity is applied to the liquid crystal panel at any time.

Similar effects can be obtained by inverting the polarities of the applied voltage every other main scanning line even when the number of parallax images is equal to an odd number except for 3.

When the number N of parallax images is set to an odd number, similar to the above case of the even number, similar effects can be also obtained by inverting the polarities of the applied voltage every N-main scanning lines.

The present invention can be also applied to a three-dimensional display unit of a projecting type.

Figure 45:
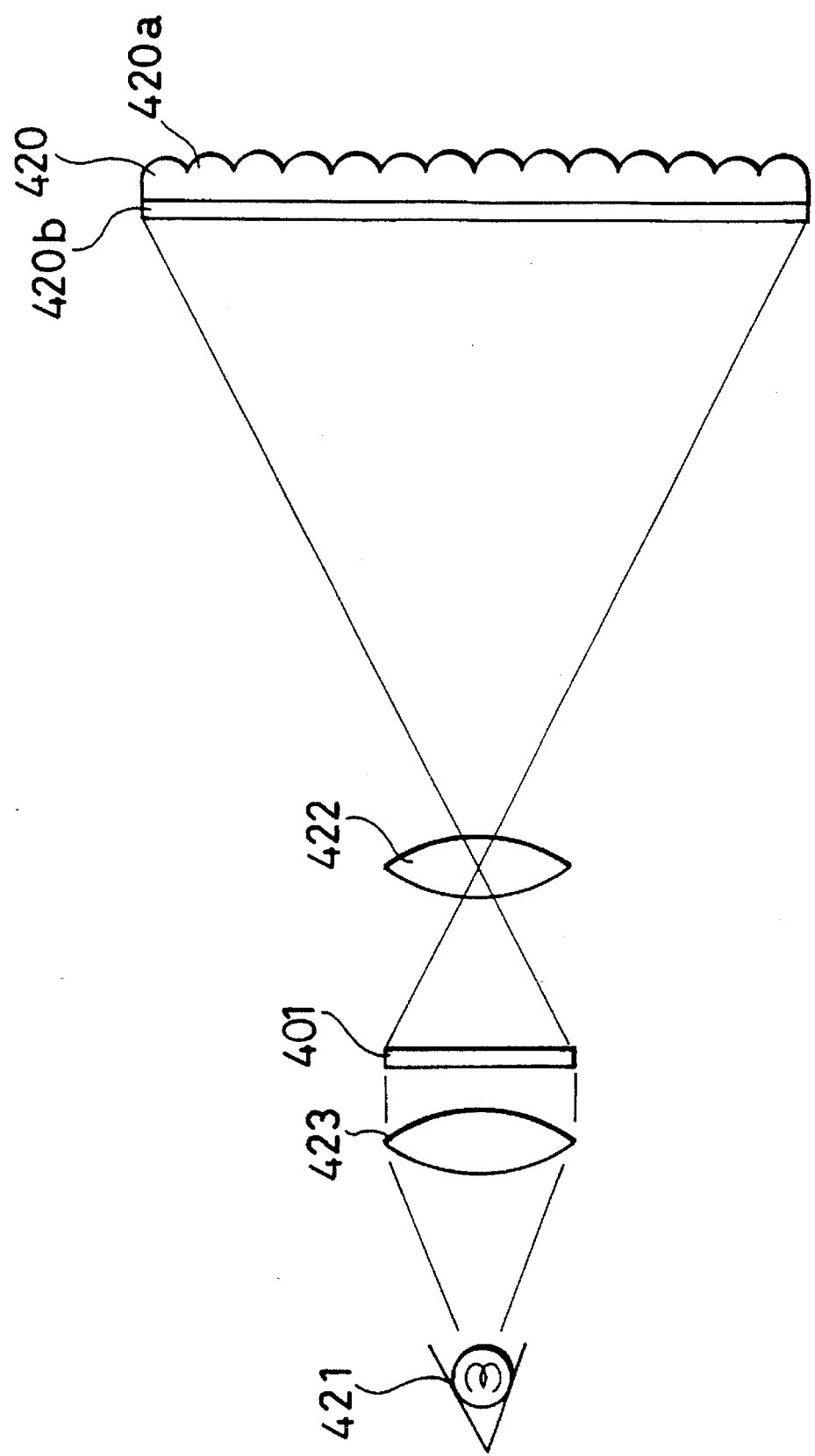
FIG. 45 is a schematic constructional view showing the basic structure of a three-dimensional display unit in accordance with another embodiment of the present invention.

FIG. 45 is a cross-sectional view showing a structure of the three-dimensional display unit of the projecting type.

In the three-dimensional display unit of the projecting type shown in FIG. 45, light is emitted from a light source 421 and is converged by a condenser lens 425. The converged light is incident to a liquid crystal panel 401. The incident light is modulated by the liquid crystal panel 401 and is transmitted through this liquid crystal panel 401. The transmitted light is then focused and formed by a projecting lens 422 as an image on a diffusive layer 420b within a lenticular screen 420. Thus, an image displayed in the liquid crystal panel 401 is enlarged and projected to the diffusive layer 420b of the lenticular screen 420.

The lenticular screen 420 is constructed by an array 420a of cylindrical lenses and the diffusive layer 420b.

In the projecting type, only the projecting lens 422 is inserted between the liquid crystal panel 401 and the lenticular lens 420 in comparison with the directing viewing type. Accordingly, there is no substantial difference between the projecting type and the direct viewing type with respect to a basic function of the three-dimensional display unit.

Similar to the direct viewing type, when the liquid crystal panel 401 is arranged in a longitudinal position in the projecting type and the number N of parallax images is set to an even number, the polarities of an applied voltage are inverted every N-main scanning lines. In contrast to this, when the number N of parallax images is set to an odd number, the polarities of the applied voltage are inverted every one main scanning line or every N-main scanning lines. Thus, effects similar to those obtained by the direct viewing type can be obtained.

As mentioned above, in the three-dimensional display unit of the present invention, each of plural parallax images reproduced and projected in a stereoscopic observation space are constructed by alternately mixing main scanning lines provided by an applied voltage having different polarities. Accordingly, one image is not constructed by main scanning lines provided by the same polarity. Namely, an image is averaged in space and time even when the applied voltage is slightly changed by a difference between voltage polarities and a difference in brightness between images is caused by this polarity difference. Accordingly, no flicker phenomenon is caused and no difference in brightness between parallax images incident to right-hand and left-hand eyes is caused. Further, the voltage polarities on one main scanning line are inverted every vertical scanning period (frame). Accordingly, electrolysis of liquid crystal molecules can be restrained so that life of a liquid crystal panel can be increased.

In accordance with a fifth construction of the present invention, a three-dimensional display unit comprises display means for simultaneously displaying a predetermined number of different parallax images, and optical means constructed by an array of cylindrical lenses such that a longitudinal direction of each of the cylindrical lenses is equal to a vertical direction. The display means scans a main scanning line thereof in the vertical direction such that this main scanning line is in conformity with the longitudinal direction of each of the cylindrical lenses. The polarities of a voltage applied to the display means are inverted on the main scanning line every predetermined number of parallax images. The voltage having a polarity inverse to that in the previous frame is repeatedly applied to the display means in the next frame every main scanning line. Accordingly, it is possible to provide a three-dimensional display unit with high quality and reduced fatigue.

In accordance with a sixth construction of the present invention, the display means inverts the voltage polarities every one main scanning line when the number of different parallax images is equal to an odd number. The voltage having a polarity inverse to that in the previous frame is repeatedly applied to the display means in the next frame every main scanning line. Accordingly, it is possible to provide a three-dimensional display unit with high quality and reduced fatigue.

Many widely different embodiments of the present invention may be constructed without departing from the spirit and scope of the present invention. It should be understood that the present invention is not limited to the specific embodiments described in the specification, except as defined in the appended claims.

What is claimed is:

1. A three-dimensional display unit comprising:

a display means for simultaneously displaying a plurality of different parallax images; and an optical means attached to said display means and formed by an array of cylindrical lenses such that a transparent substance having high flexibility is supported by transparent electrodes from both substance sides, and optical characteristics of each of said cylindrical lenses can be changed by applying a voltage to said transparent electrodes to change at least one surface shape of said transparent substance.

2. A three-dimensional display unit as claimed in claim 1, wherein said optical characteristics of each of said cylindrical lenses include a focal length.

3. A three-dimensional display unit as claimed in claim 1, wherein said display means includes a plurality of pixels each emitting a light, non-penetrating portion, a masking means having an open portion and an unopen portion receiving a part of said emitted light and changing an optical path of said received part of said emitted light, said masking means attached to a surface of said display means and arranged at the same pitch as a pitch of the respective pixels in accordance with said non-penetrating portion, and said optical means is attached to a surface of said masking means.

4. A three-dimensional display unit as claimed in claim 3, wherein said unopen portion of the masking means has a light shielding film for reducing the size of a non-display space corresponding to said non-penetrating portion of said display means.

5. A three-dimensional display unit, as claimed in claim 1, wherein each of said cylindrical lenses has a vertical direction, and said display means has a scanning means for scanning main scanning lines thereof in the same direction as a longitudinal direction of each of said cylindrical lenses, voltages applied to said main scanning lines are reversed in polarity at every predetermined number of said main scanning lines of the same frame and at the same position in each respective frame.

6. A three-dimensional display unit, as claimed in claim 5, wherein said voltages applied to said main scanning lines are reversed in polarity at every main scanning line of the same frame when the number of different parallax images is an odd number.

7. A three-dimensional display unit comprising:

a display means for simultaneously displaying a plurality of different parallax images;

an optical means attached to said display means and constructed by an array of cylindrical lenses such that optical characteristics of each of said cylindrical lenses can be changed;

a detecting means for detecting a spatial position of an observer's head;

a control means connected to said detecting means and controlling an operation of said optical means based on said detected spatial position of the observer's head such that a stereoscopic image is regenerated in an optimum position of the observer's head;

a plurality of stereoscopic signal sources for performing a multiple-eye display; and a selecting means connected to said stereoscopic signal sources and said detecting means for selecting one of said stereoscopic signal sources to display to said display means on the basis of said detected spatial position of the observer's head.

8. A three-dimensional display unit, as claimed in claim 7, wherein said optical means includes a liquid crystal.

9. A three-dimensional display unit as claimed in claim 7, wherein a projecting lens and a diffusive layer are arranged between said display means and said optical means.

10. A three-dimensional display unit, comprising:

a display means for simultaneously displaying a plurality of different parallax images; and an optical means, attached to the display means and formed by an array of cylindrical lenses, such that a transparent substance is supported by transparent electrodes from both substance sides, and optical characteristics of each of the cylindrical lenses can be changed by a voltage applied to said transparent electrodes to provide a refractive index distribution of said transparent substance, wherein said display means includes a plurality of pixels, each emitting a light, a non-penetrating portion, a masking means having an open portion and an unopen portion receiving a part of said emitted light and changing an optical path of said received part of said emitted light, said masking means being attached to a surface of said display means and arranged at the same pitch as a pitch of the respective pixels in accordance with said non-penetrating portion, and wherein said optical means is attached to a surface of said masking means.

11. A three-dimensional display unit, as claimed in claim 10, wherein said unopen portion of the masking means has a light-shielding film for reducing the size of a non-display space, corresponding to said non-penetrating portion of said display means.

12. A three-dimensional display unit, comprising:

a display means for simultaneously displaying a plurality of different parallax images; and an optical means, attached to the display means and formed by an array of cylindrical lenses, such that a transparent substance is supported by transparent electrodes from both substance sides, and optical characteristics of each of the cylindrical lenses can be changed, by a voltage applied to said transparent electrodes, to provide a refractive index distribution of said transparent substance, wherein each of said cylindrical lenses has a vertical direction, and said display means has a scanning means for scanning main scanning lines thereof in the same direction as a longitudinal direction of each of said cylindrical lenses, voltages applied to said main scanning lines are reversed in polarity at every predetermined number of said main scanning lines of the same frame and at the same position of every frame.

13. A three-dimensional display unit, as claimed in claim 12, wherein said voltages applied to said main scanning lines are reversed in polarity at every main scanning line of the same frame when the number of different parallax images is an odd number.

14. A three-dimensional display unit, comprising:

a display means for simultaneously displaying a plurality of different parallax images;

an optical means, attached to the display means and constructed by an array of cylindrical lenses, such that optical characteristics of each of the cylindrical lenses can be changed;

a detecting means for detecting a spatial position of an observer's head; and a control means, connected to said detecting means and controlling an operation of said optical means, based on said spatial position, of the observer's head, detected by said detecting means, such that a stereoscopic image is regenerated in an optimum position of the observer's head, wherein said display means includes a plurality of pixels each emitting a light, a non-penetrating portion, a masking means having an open portion and an unopen portion receiving a part of said emitted light and changing an optical path of said received part of said emitted light, said masking means being attached to a surface of said display means and being arranged at the same pitch as a pitch of the respective pixels in accordance with said non-penetrating portion, and wherein said optical means is attached to a surface of said masking means.

15. A three-dimensional display unit, as claimed in claim 14, wherein said unopen portion of the masking means has a light-shielding film for reducing the size of a non-display space, corresponding to said non-penetrating portion of said display means.

16. A three-dimensional display unit, comprising:

a display means for simultaneously displaying a plurality of different parallax images;

an optical means, attached to the display means and constructed by an array of cylindrical lenses, such that optical characteristics of each of the cylindrical lenses can be changed;

a detecting means for detecting a spatial position of an observer's head; and a control means, connected to said detecting means and controlling an operation of said optical means, based on said spatial position, of the observer's head, detected by said detecting means, such that a stereoscopic image is regenerated in an optimum position of the observer's head, wherein each of said cylindrical lenses has a vertical direction, and said display means has a scanning means for scanning main scanning lines thereof in the same direction as a longitudinal direction of each of said cylindrical lenses, voltages applied to said main scanning lines are reversed in polarity at every predetermined number of said main scanning lines of the same frame and at the same position of every frame.

17. A three-dimensional display unit, as claimed in claim 16, wherein said voltages applied to said main scanning lines are reversed in polarity at every main scanning line of the same frame when the number of different parallax images is an odd number.

18. A three-dimensional display unit, comprising:

a display means for simultaneously displaying a plurality of different parallax images;

an optical means, attached to the display means and constructed by an array of cylindrical lenses, such that optical characteristics of each of the cylindrical lenses can be changed;

a detecting means for detecting a spatial position of an observer's head; and a control means, connected to said detecting means and controlling an operation of said optical means, based on said spatial position, of the observer's head, detected by said detecting means, such that a stereoscopic image is regenerated in an optimum position of the observer's head, and further comprising a projecting lens and a diffusive layer, arranged between said display means and said optical means.

* * * * *